US008237880B1

(12) United States Patent
Fan

(10) Patent No.: US 8,237,880 B1
(45) Date of Patent: Aug. 7, 2012

(54) ACTIVE MATRIX DISPLAYS HAVING ENABLING LINES

(76) Inventor: Nongqiang Fan, Issaquah, WA (US)

( * ) Notice: Subject to any disclaimer, the term of this patent is extended or adjusted under 35 U.S.C. 154(b) by 1059 days.

(21) Appl. No.: 11/426,162

(22) Filed: Jun. 23, 2006

Related U.S. Application Data

(60) Provisional application No. 60/693,595, filed on Jun. 25, 2005, provisional application No. 60/708,334, filed on Aug. 14, 2005.

(51) Int. Cl.
*G02F 1/136* (2006.01)
*G02F 1/1343* (2006.01)
*G09G 3/36* (2006.01)

(52) U.S. Cl. ............................ 349/50; 349/139; 345/87

(58) Field of Classification Search .............. 349/40–53, 349/139; 345/87
See application file for complete search history.

(56) References Cited

U.S. PATENT DOCUMENTS 4,792,210 A * 12/1988 Maurice .......................... 349/43
5,504,348 A * 4/1996 Yoshida et al. ................. 257/59
5,835,073 A 11/1998 Van Doremalen
6,084,579 A * 7/2000 Hirano .......................... 345/205
6,243,062 B1 6/2001 den Boer
6,738,035 B1 5/2004 Fan
6,791,522 B2 9/2004 Yi
6,864,940 B2 * 3/2005 Shimada et al. .............. 349/143
6,867,551 B2 3/2005 Okuda
7,247,357 B2 * 7/2007 Shiba et al. .................. 428/1.51
2003/0174152 A1 * 9/2003 Noguchi ....................... 345/690
2006/0007071 A1 * 1/2006 Yamazaki et al. .............. 345/76

* cited by examiner

*Primary Examiner* — Mark Robinson
*Assistant Examiner* — Charles Chang

(57) ABSTRACT

An active matrix display includes a matrix of pixel elements, an array of column conducting lines, an array of row conducting lines crossing the array of column conducting lines, and an array of enabling lines crossing the array of column conducting lines. A column conducting line is electrically connected to a column of pixel elements. A row conducting line is electrically connected to a row of pixel elements. An enabling line is electrically connected to one or more rows of pixel elements. A pixel element includes a capacitive element, a nonlinear element, and a switching transistor. The nonlinear element is electrically connected the capacitive element. The switching transistor has a gate configured to receive an electric signal from an enabling line and has a semiconductor channel electrically connected to the capacitive element.

49 Claims, 45 Drawing Sheets

400

ACTIVE MATRIX DISPLAYS HAVING ENABLING LINES

RELATED APPLICATIONS

This application claims the benefit of U.S. Provisional Application No. 60/693,595, filed on Jun. 25, 2005, and U.S. Provisional Application No. 60/708,334, filed on Aug. 14, 2005.

The present application is related to the following concurrently filed and commonly owned U.S. patent application Ser. No. 11/426,147 titled "METHOD OF DRIVING ACTIVE MATRIX DISPLAYS"; Ser. No. 11/426,171 titled "METHOD OF DRIVING ACTIVE MATRIX DISPLAYS HAVING NONLINEAR ELEMENTS IN PIXEL ELEMENTS"; and Ser. No. 11/426,177 titled "ACTIVE MATRIX DISPLAYS HAVING NONLINEAR ELEMENTS IN PIXEL ELEMENTS." All of these applications are hereby incorporated by reference herein in their entirety.

BACKGROUND

The present invention relates generally to active matrix displays, and more particularly to active matrix displays having nonlinear elements in pixel elements.

FIG. 1 shows a section of a conventional active matrix display. The conventional active matrix display in FIG. 1 includes a matrix of pixel elements (e.g., 50AA-50LA, 50AB-50LB, and 50AC-50LC), an array of column conducting lines (e.g., 30A, 30B, and 30C), and an array of row conducting lines (e.g., 40A-40L) crossing the array of column conducting lines. A row conducting line (e.g., 40A) is electrically coupled to one row of pixel element (e.g., 50AA-50AC). A pixel element (e.g., 50AB) includes a switching transistor 52 having a gate electrically connected to a row conducting line (e.g., 40A) and a capacitive element 54 having a terminal electrically connected to a column conducting line (e.g., 30B) through a semiconductor channel of the switching transistor 52.

In operation, during a predetermined time period, a row of pixel elements (e.g., 50AA-50AC) is selected for charging by applying a selection signal on a row conducting line (e.g., 40A). During the next predetermined time period, next row of pixel elements (e.g., 50BA-50BC) is selected for charging by applying a selection signal on the next row conducting line (e.g., 40B).

When charging a row of pixel elements (e.g., 50AA-50AC), each pixel element is charged with a data signal on a column conducting line. For example, the pixel elements 50AA, 50AB, and 50AC are charged respectively with the column conducting lines 30A, 30B, and 30C. When charging the next row of pixel elements (e.g., 50BA-50BC), each pixel element in this next row is also charged with a data signal on a column conducting line. For example, the pixel elements 50BA, 50BB, and 50BC are charged respectively with the column conducting lines 30A, 30B, and 30C.

During the predetermined time period for charging a row of pixel elements, the switching transistors in the pixel elements needs to be fast enough to change their conducting states. A switching transistor may need to change from the non-conducting state to the conducting state or change from the conducting state to the non-conducting state. When an active matrix display has a total of N rows, if the time period for charging all N rows of pixel elements progressively is a frame time period $T_0$, the allocated predetermined time period for charging one row of pixel elements can be less than $T_0/N$. For high resolution displays in which N is quite large (e.g, N is larger or equal to 512), the allocated predetermined time period can become quite short such that it put on stringent demand on the switching speed of the switching transistors. For lowering the manufacturing cost, it is desirable to reduce the switching speed requirement for the switching transistors by finding new forms of active matrix displays and by finding new method for driving these active matrix displays. Also, it is desirable to improve the display quality of those active matrix displays that use nonlinear elements, such as thin film diodes (TFD) or metal-insulator-metal diodes, as the switching elements for pixel elements.

SUMMARY

In one aspect, an active matrix display includes a matrix of pixel elements, an array of column conducting lines, an array of row conducting lines crossing the array of column conducting lines, and an array of enabling lines crossing the array of column conducting lines. A pixel element includes a resistive element, a nonlinear element, a capacitive element, and a switching transistor. The resistive element has a first terminal electrically connected to a row conducting line and has a second terminal. The nonlinear element has a first terminal electrically connected to a column conducting line and has a second terminal electrically connected to the second terminal of the resistive element. The capacitive element has a first terminal electrically connected to the second terminal of the resistive element and has a second terminal. The switching transistor has a gate configured to receive an electric signal from an enabling line and has a semiconductor channel electrically connected to the capacitive element.

Implementations of the active matrix display may include one or more of the following features. The semiconductor channel of the switching transistor can be electrically connected between the column conducting line and the first terminal of the nonlinear element. The semiconductor channel of the switching transistor can be electrically connected between the second terminal of the nonlinear element and the second terminal of the resistive element.

Implementations of the active matrix display may include one or more of the following features. In one implementation, the semiconductor channel of the switching transistor can be electrically connected between the second terminal of the resistive element and first terminal of the capacitive element. In one implementation, the pixel element can also includes a secondary switching transistor having a gate electrically connected to an enabling line and having a semiconductor channel electrically connected between the second terminal of the nonlinear element and the second terminal of the resistive element. In one implementation, the pixel element can also includes a secondary switching transistor having a gate electrically connected to an enabling line and having a semiconductor channel electrically connected between the column conducting line and the first terminal of the nonlinear element. The gate of the secondary switching transistor and the gate of the switching transistor can be connected to a same enabling line or different enabling lines.

Implementations of the active matrix display may include one or more of the following features. The semiconductor channel of the switching transistor can be electrically connected between the second terminal of the capacitive element and a common voltage. The semiconductor channel of the switching transistor can be electrically connected between the second terminal of the capacitive element and the first terminal of the resistive element. The semiconductor channel of the switching transistor can be electrically connected between the second terminal of the capacitive element and a row conducting line. In one implementation, the first terminal of the resistive element is electrically connected to the row conducting line through the semiconductor channel of the switching transistor, and the semiconductor channel of the switching transistor is electrically connected between the second terminal of the capacitive element and the row conducting line.

Implementations of the active matrix display may include one or more of the following features. The first terminal the capacitive element can be electrically connected to the column conducting line through both the semiconductor channel of the switching transistor and the nonlinear element. In one implementation, a pixel element can include a pixel-sub-circuit electrically connected to the first terminal of the capacitive element. The second terminal of the capacitive element in the pixel element can be electrically connected to a common voltage. The second terminal of the capacitive element in the pixel element can be electrically connected to the first terminal of the resistive element. The second terminal of the capacitive element in the pixel element can be electrically connected to a row conducting line.

Implementations of the active matrix display may include one or more of the following features. The first terminal the capacitive element can be electrically connected to the column conducting line through the nonlinear element and the second terminal the capacitive element can be electrically connected to the semiconductor channel of the switching transistor. In one implementation, a pixel element can include a pixel-sub-circuit electrically connected to the second terminal of the capacitive element. In one implementation, a pixel element can include a secondary switching transistor having a gate electrically connected to an enabling line and having a semiconductor channel electrically connected between the column conducting line and the first terminal of the capacitive element. The gate of the secondary switching transistor and the gate of the switching transistor can be connected to a same enabling line or different enabling lines.

Implementations of the active matrix display may include one or more of the following features. A pixel element can include a liquid crystal cell associated with the capacitive element. The enabling line in the array of enabling lines can be electrically connected to multiple pixel elements positioned in a plurality of rows. The active matrix display can include an array of enabling drivers. An enabling driver is operable to apply an enabling signal to an enabling line. The active matrix display can include an array of enabling drivers. An enabling driver is operable to apply an enabling signal to multiple pixel elements positioned in a plurality of rows. The active matrix display can include an array of selection drivers. A selection driver is operable to apply a predetermined voltage to a row conducting line. The active matrix display can include electronic circuitry for applying a predetermined voltage to a row conducting line. The active matrix display can include an array of data drivers. A data driver is operable to apply a predetermined current to a column conducting line. The active matrix display can include electronic circuitry for applying a predetermined current to a column conducting line.

In another aspect, an active matrix display includes a matrix of pixel elements, an array of column conducting lines, an array of row conducting lines crossing the array of column conducting lines, and an array of enabling lines crossing the array of column conducting lines. A column conducting line is electrically connected to a column of pixel elements. A row conducting line is electrically connected to a row of pixel elements. An enabling line is electrically connected to one or more rows of pixel elements. A pixel element includes a capacitive element, a nonlinear element, and a switching transistor. The capacitive element has a first terminal and a second terminal. The nonlinear element is electrically connected the capacitive element. The switching transistor has a gate configured to receive an electric signal from an enabling line and has a semiconductor channel electrically connected to the capacitive element.

Implementations of the active matrix display may include one or more of the following features. The nonlinear element in the pixel element can be configured to receive a signal from a column conducting line. A pixel element can include a resistive element electrically connected to the nonlinear element and configured to receive a signal from a row conducting line. A pixel element can include a liquid crystal cell associated with the capacitive element. The active matrix display can include an array of enabling drivers. An enabling driver is operable to apply an enabling signal to an enabling line. The active matrix display can include an array of enabling drivers. An enabling driver is operable to apply an enabling signal to multiple pixel elements positioned in a plurality of rows. The active matrix display can include an array of selection drivers. A selection driver is operable to apply a predetermined voltage to a row conducting line. The active matrix display can include an array of data drivers. A data driver is operable to apply a predetermined current to a column conducting line.

In another aspect, a pixel element in an active matrix display includes a resistive element, a nonlinear element, a capacitive element, and a switching transistor. The active matrix display includes a matrix of the pixel elements, an array of column conducting lines, an array of row conducting lines crossing the array of column conducting lines, and an array of enabling lines crossing the array of column conducting lines. In the pixel element, the resistive element has a first terminal electrically connected to a row conducting line and has a second terminal. The nonlinear element has a first terminal electrically connected to a column conducting line and has a second terminal electrically connected to the second terminal of the resistive element. The capacitive element has a first terminal electrically connected to the second terminal of the resistive element and has a second terminal. The switching transistor has a gate configured to receive an electric signal from an enabling line and has a semiconductor channel electrically connected to the capacitive element.

Implementations of the pixel element may include one or more of the following features. The pixel element can include a liquid crystal cell associated with the capacitive element. The capacitive element can be electrically connected to the nonlinear element through a semiconductor channel of the switching transistor. The capacitive element can be connected to the semiconductor channel of the switching transistor through the nonlinear element. The capacitive element is electrically connected to the resistive element through the semiconductor channel of the switching transistor. In one implementation, the pixel element can also include a secondary switching transistor having a gate electrically connected to an enabling line. The resistive element can be electrically connected to the column conducting line through both a semiconductor channel of the secondary switching transistor and the nonlinear element. The gate of the secondary switching transistor and the gate of the switching transistor can be connected to a same enabling line or different enabling lines.

Implementations of the pixel element may include one or more of the following features. The capacitive element can be electrically connected to a common voltage through the semiconductor channel of the switching transistor. The capacitive element can be electrically connected to a row conducting line through the semiconductor channel of the switching transistor. In one implementation, the first terminal of the resistive element can be electrically connected to the row conducting line through the semiconductor channel of the switching transistor, and the capacitive element can be electrically connected to the row conducting line through the semiconductor channel of the switching transistor.

Implementations of the invention may include one or more of the following advantages. The implementations may reduce the manufacturing dependence on switching transistors in the active matrix display and may consequently lower the manufacturing cost. Additional advantages of the invention will be set forth in the description which follows, and in part will be obvious from the description, or may be learned by practice of the invention. The advantages of the invention may be realized by means of the instrumentalities and combinations particularly pointed out in the claims.

BRIEF DESCRIPTION OF THE DRAWINGS

The present invention will be understood more fully from the detailed description and accompanying drawings of the invention set forth herein. However, the drawings are not to be construed as limiting the invention to the specific embodiments shown and described herein. Like reference numbers are designated in the various drawings to indicate like elements.

DETAILED DESCRIPTION

FIGS. 2A-2D are implementations of active matrix displays that have enabling lines and nonlinear elements in pixel elements. In FIG. 2A-FIG. 2D, a section of the active matrix display includes a matrix of pixel elements (e.g., 50AA-AC, 50BA-BC, . . . , and 50LA-50LC), an array of column conducting lines (e.g., 30A, 30B, and 30C), and an array of row conducting lines (e.g., 40A-40L) crossing the array of column conducting lines, and an array of enabling lines (e.g., 60A, . . . , 60E, . . . , 60I, . . . ) crossing the array of column conducting lines. A pixel element (e.g., 50AB) includes a resistive element 55, a nonlinear element 51, a switching transistor 52, and a capacitive element 54. The resistive element 55 has a first terminal electrically connected to a row conducting line (e.g., 40A). The nonlinear element 51 has a first terminal electrically connected to a column conducting line (e.g., 30B) and a second terminal electrically connected to a second terminal of the resistive element 55. The switching transistor 52 has a gate electrically connected to an enabling line (e.g., 60A). The capacitive element 54 has a first terminal electrically connected to the second terminal of the resistive element 55 through a semiconductor channel of the switching transistor 52.

The section of the active matrix display in FIGS. 2A-2D includes an array of enabling drivers (e.g., 62ATD, 62ETH, and 62ITL). An enabling driver can apply an enabling signal to multiple pixel elements positioned in a plurality of rows. For example, the enabling driver 62ATD for rows A to D can apply an enabling signal to the pixel elements 50AA-AC, 50BA-BC, 50CA-CC, and 50DA-DC. The enabling driver 62ETH for rows E to H can apply an enabling signal to the pixel elements 50EA-EC, 50FA-FC, 50GA-GC, and 50HA-HC. The enabling driver 62ITL for rows I to L can apply an enabling signal to the pixel elements 50IA-IC, 50JA-JC, 50KA-KC, and 50LA-LC.

The section of the active matrix display in FIGS. 2A-2D includes an array of selection drivers (e.g., 42A-42L). A selection driver (e.g., 42A) can apply a selection voltage to a row conducting line (e.g., 40A).

The section of the active matrix display in FIG. 2A-FIG. 2D includes an array of data drivers (e.g., 70A-70C). A data driver (e.g., 70B) can apply a predetermined current to a column conducting line (e.g., 30B).

Figure 1:
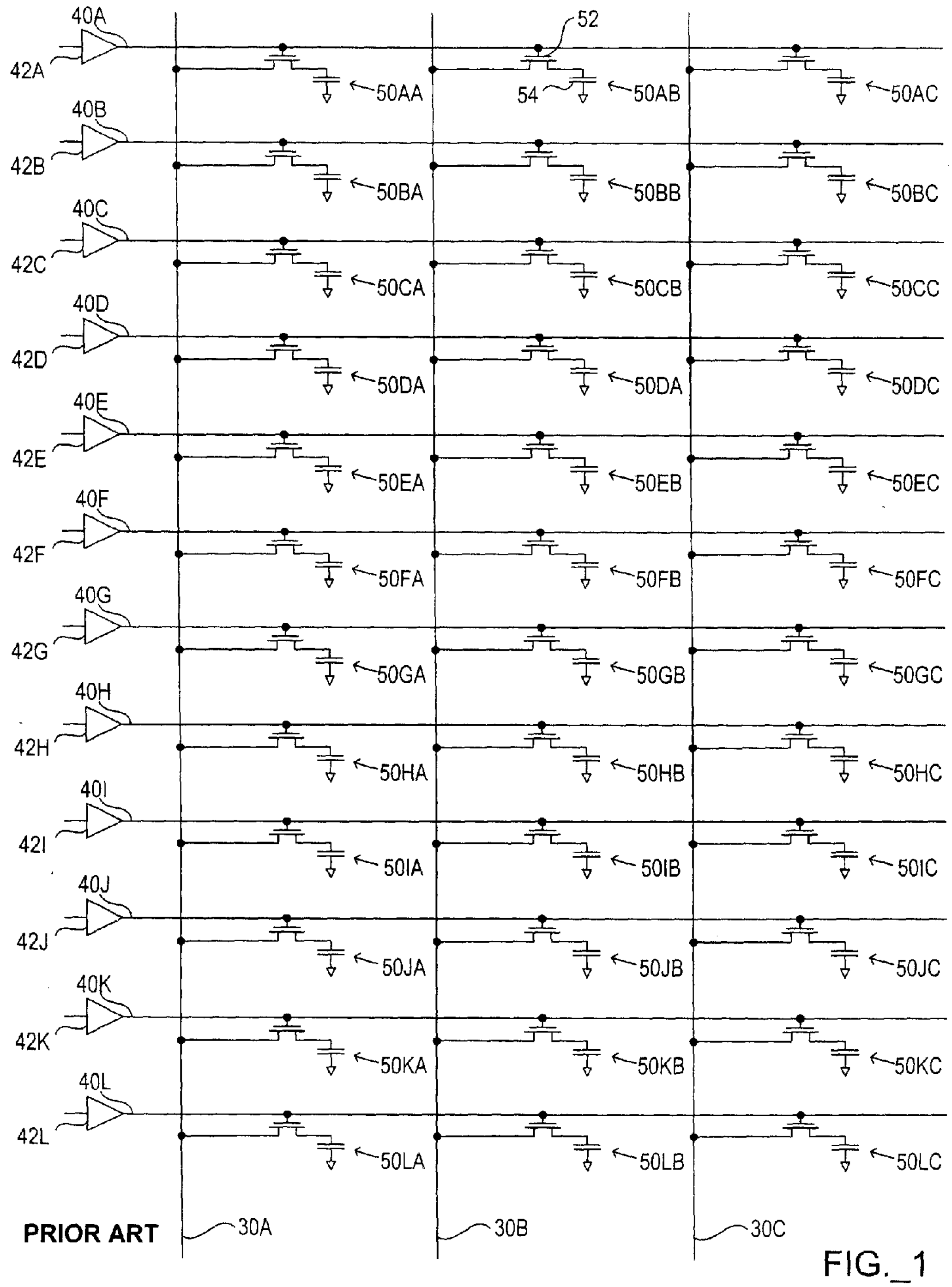
FIG. 1 shows a section of a conventional active matrix display.
Figure 2A:
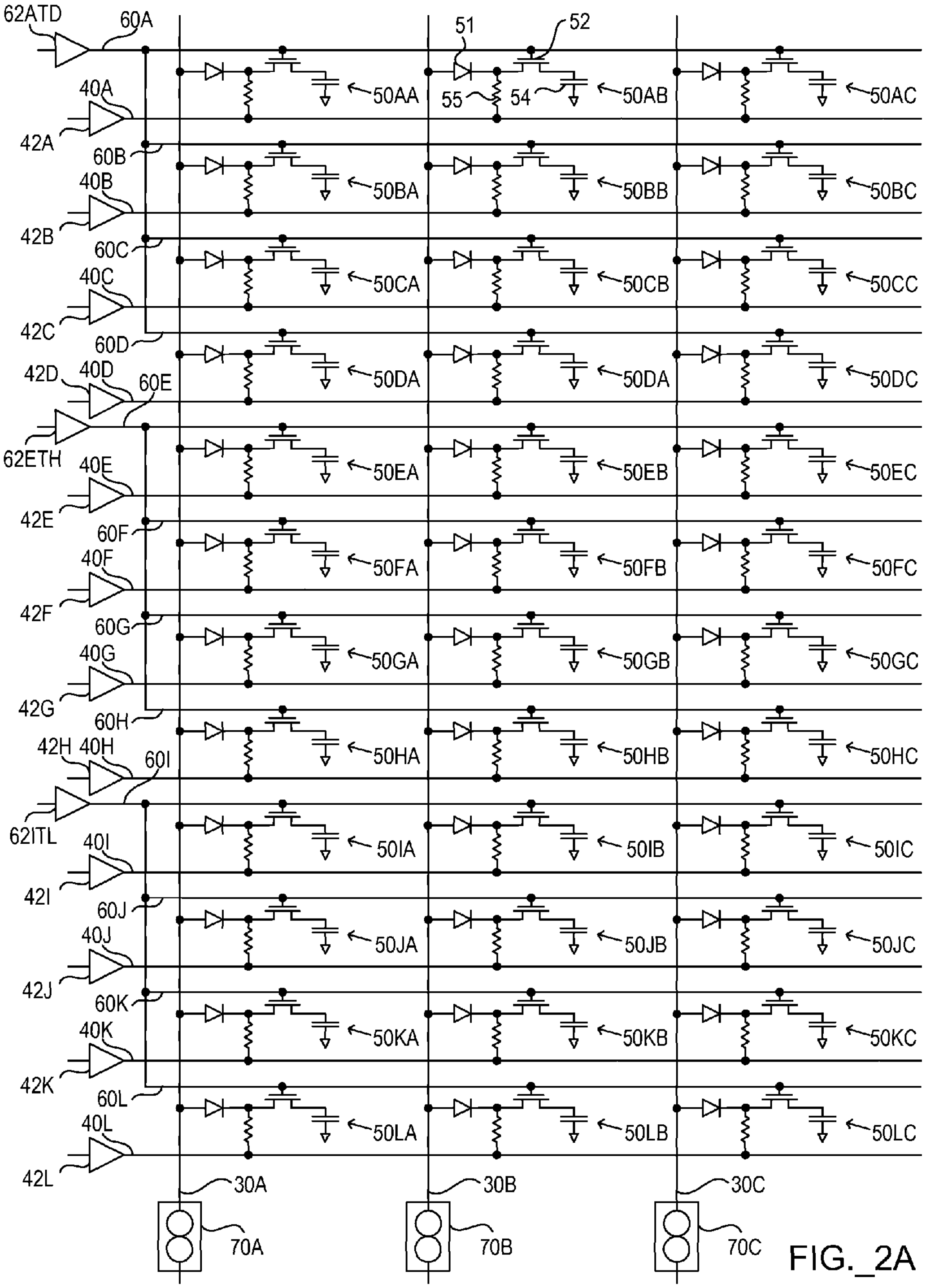
FIGS. 2A-2D are implementations of active matrix displays that have enabling lines and nonlinear elements in pixel elements.
Figure 2B:
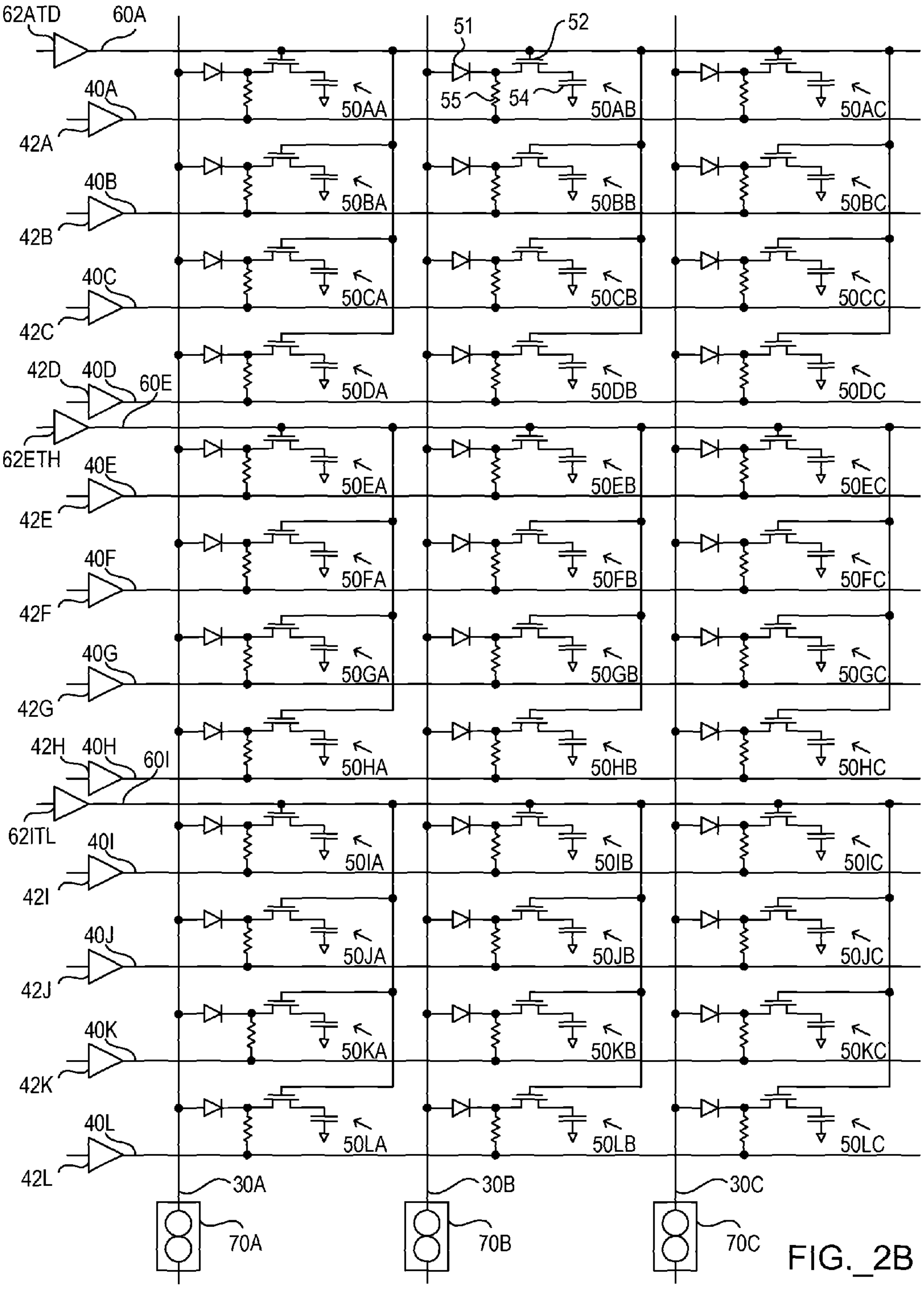
Figure 2C:
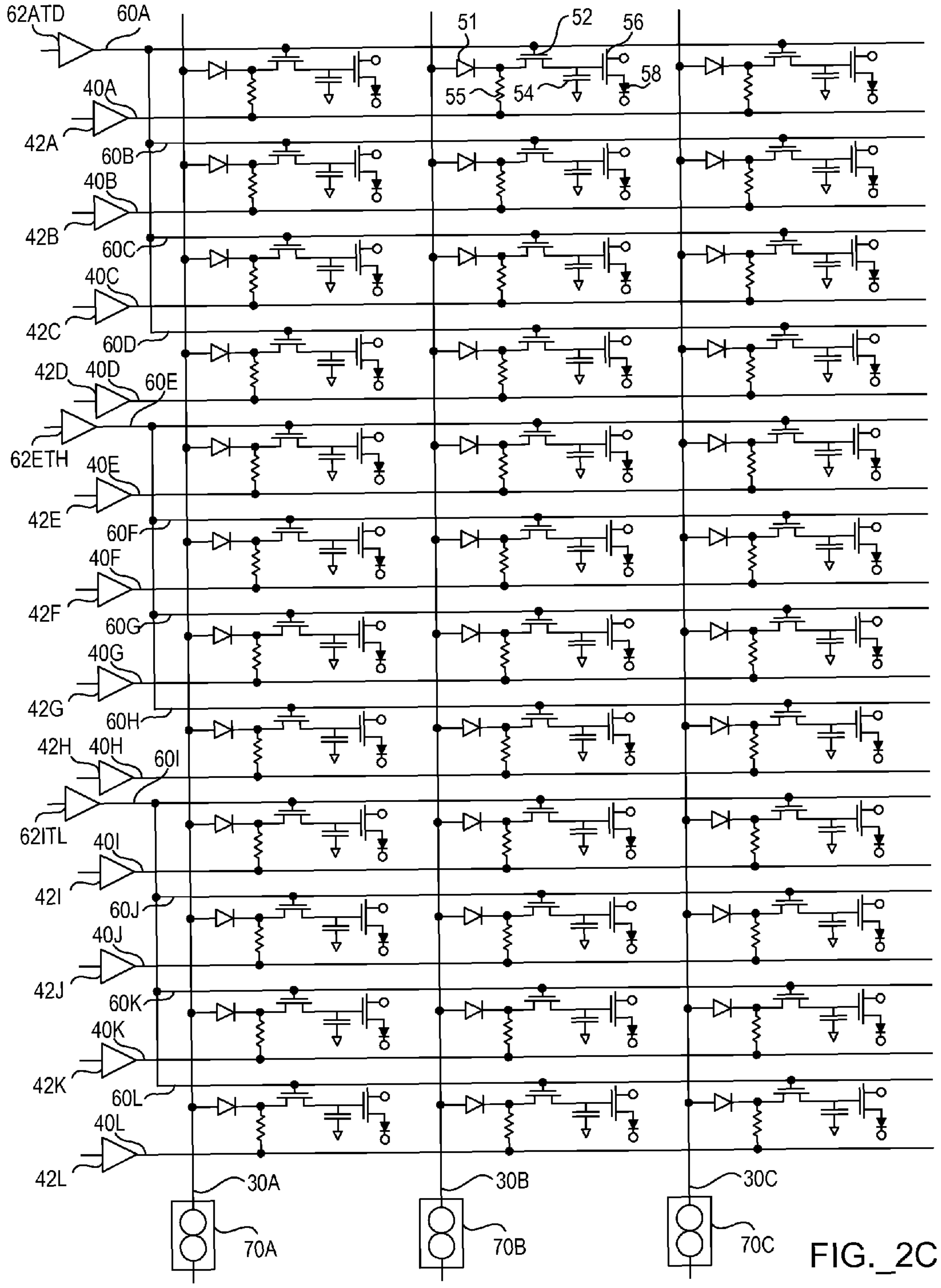

In FIG. 2A and FIG. 2C, the array of enabling lines includes enabling lines 60A, 60B, 60C, 60D, 60E, 60F, 60G, 60H, 60I, 60J, 60K, and 60L. A row of pixel elements (e.g., 50AA-50AC) is electrically connected to a corresponding enabling line (e.g., 60A).

Figure 2D:
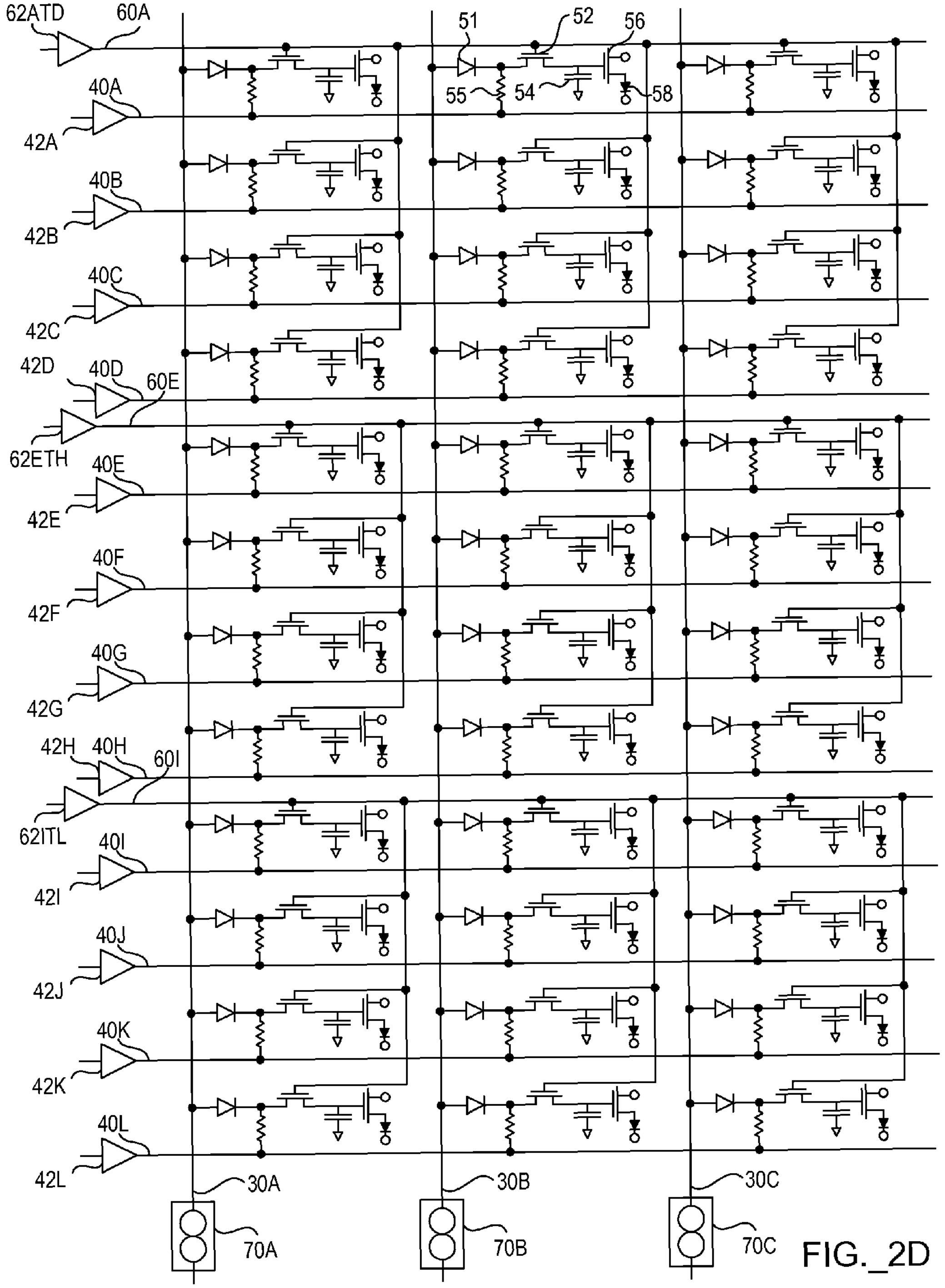
Figure 3A:
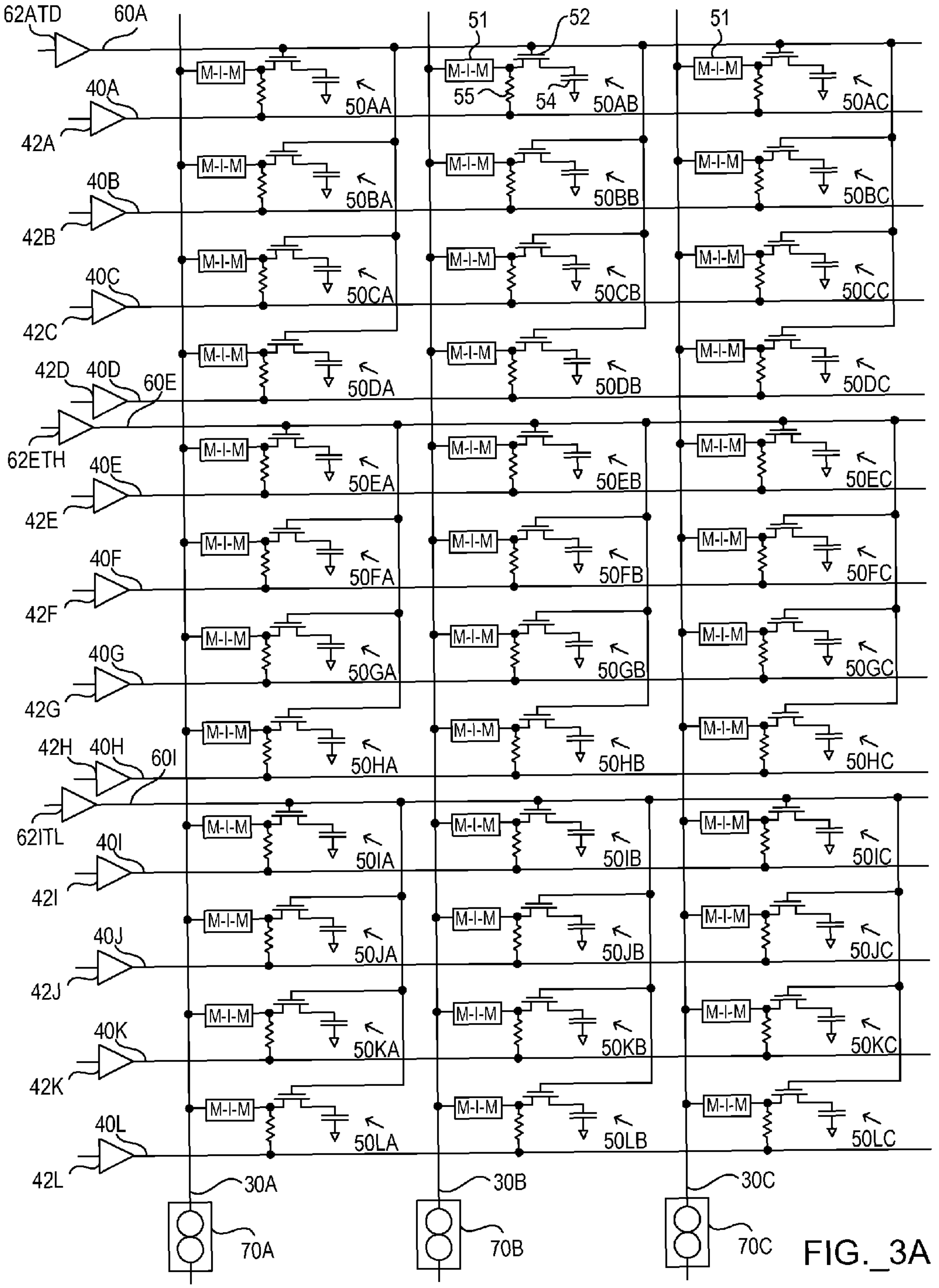
FIGS. 3A-3D are implementations of active matrix displays in which the nonlinear elements in the pixel elements are metal-insulator-metal diodes.
Figure 3B:
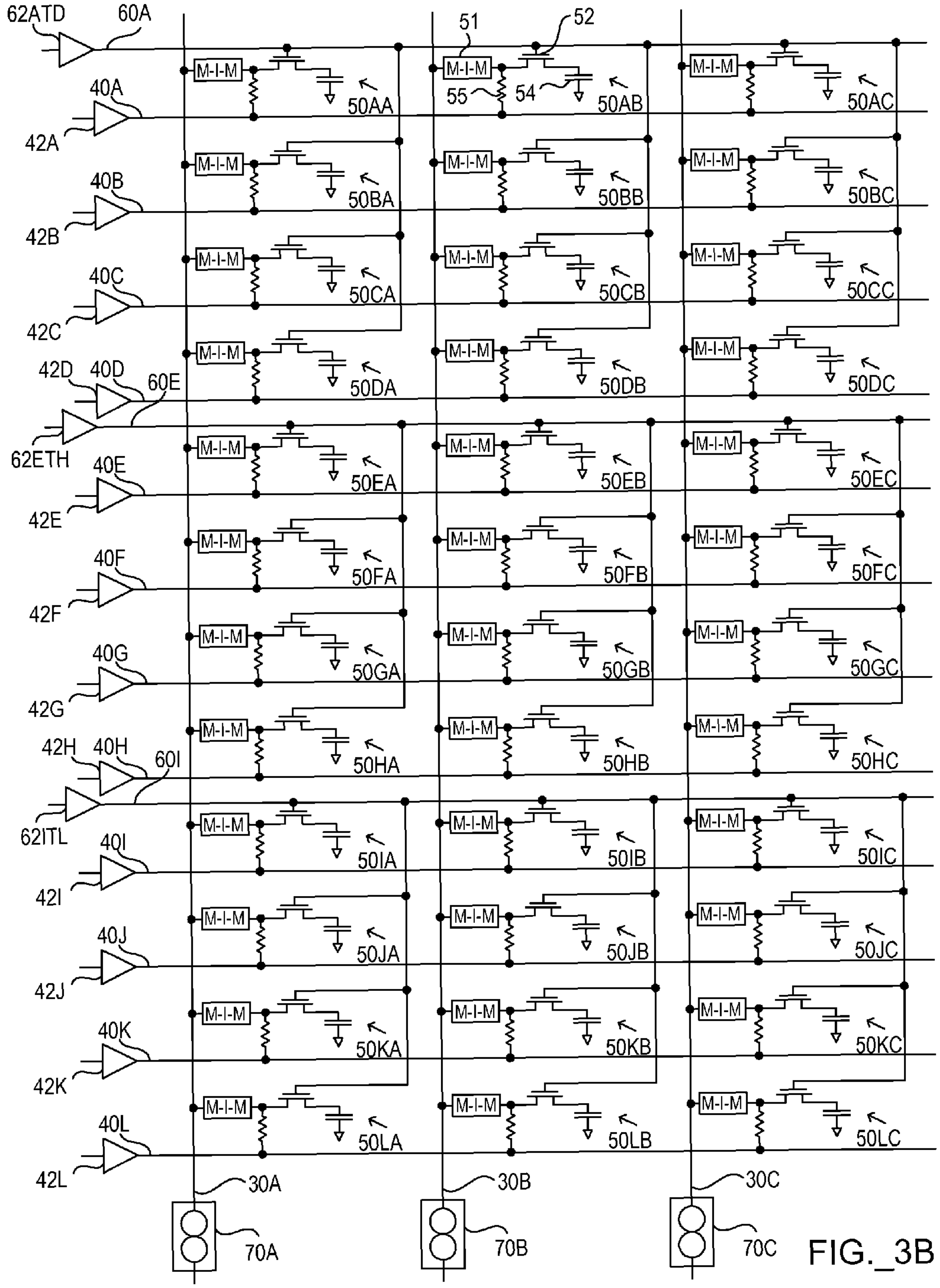
Figure 3C:
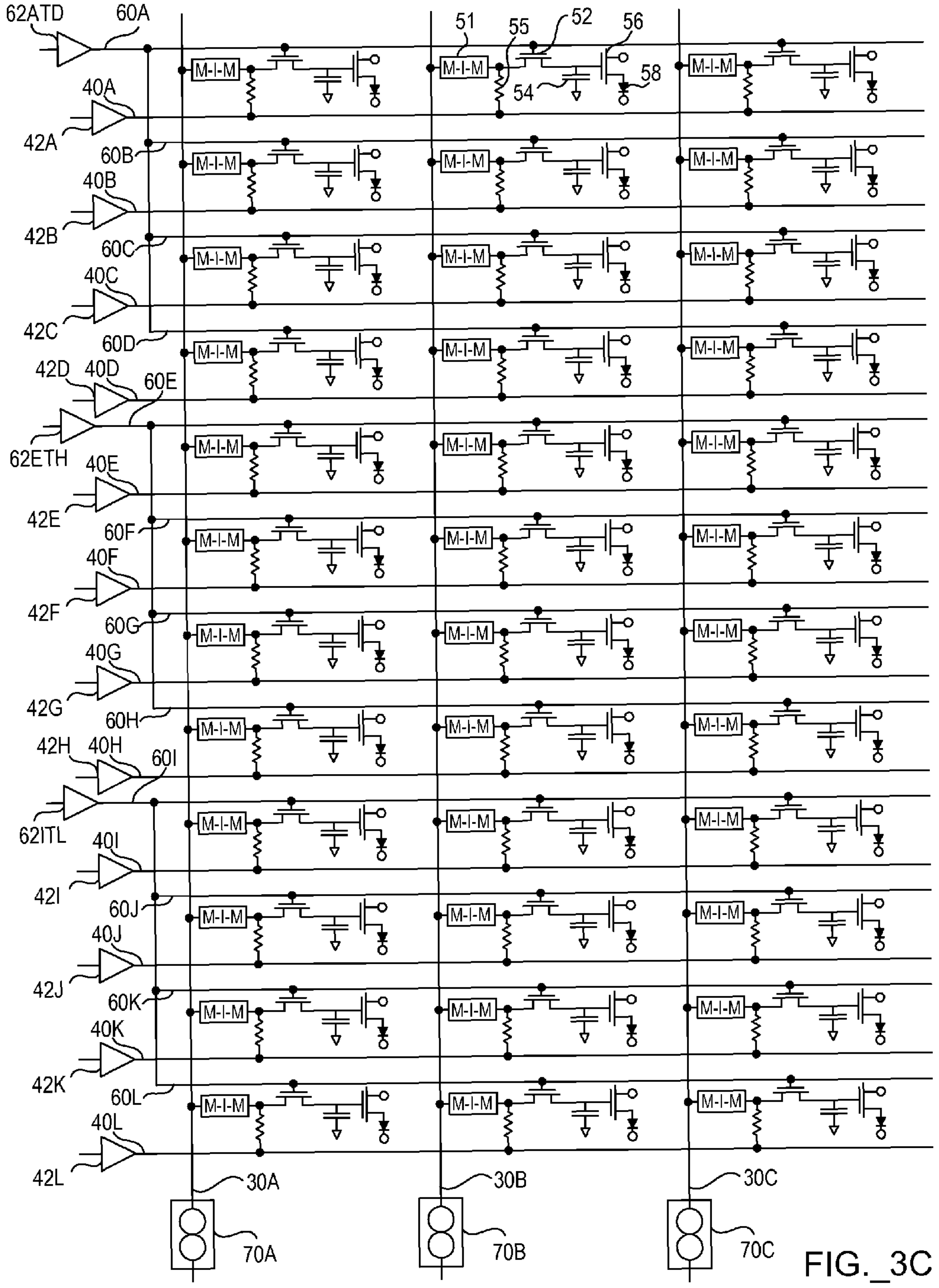
Figure 3D:
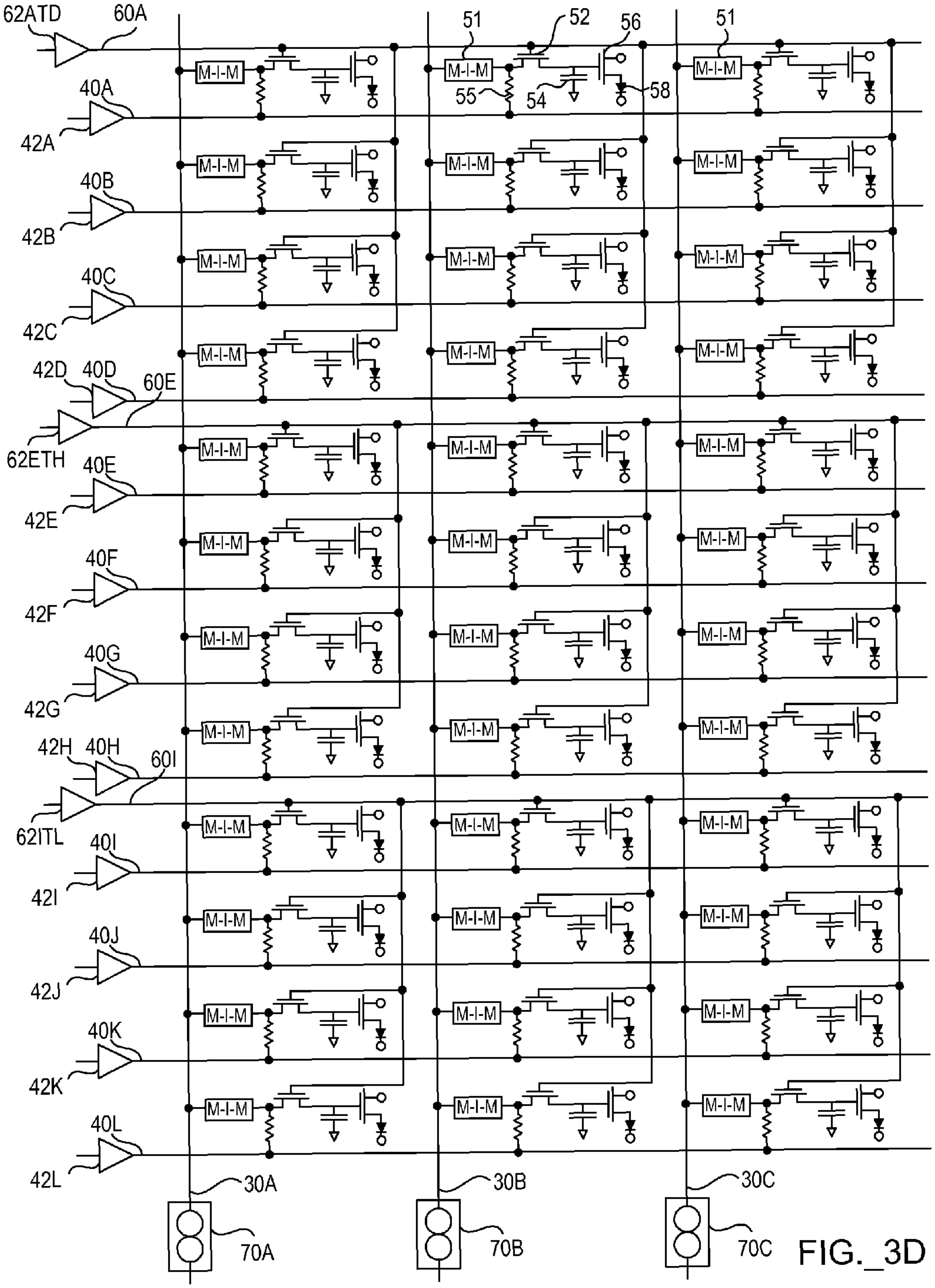

In FIG. 2B and FIG. 2D, the array of enabling lines includes enabling lines 60A, 60E, and 60I. Multiple rows of pixel elements (e.g., 50AA-AC, 50BA-BC, 50CA-CC, and 50DA-DC) are electrically connected to a corresponding enabling line (e.g., 60A).

In FIG. 2A and FIG. 2B, a pixel element (e.g., 50AB) includes a resistive element 55, a nonlinear element 51, a switching transistor 52, and a capacitive element 54. The switching transistor 52 has a gate electrically connected to an enabling line (e.g., 60A). The capacitive element 54 is electrically connected to a column conducting line (e.g., 30B) through both a semiconductor channel of the switching transistor 52 and the nonlinear element 51. In liquid crystal displays, the capacitive element 54 can be associated with a liquid crystal cell.

In FIG. 2C and FIG. 2D, a pixel element (e.g., 50AB) includes a resistive element 55, a nonlinear element 51, a switching transistor 52, a capacitive element 54, a driving transistor 56, and a light emitting diode 58. The switching transistor 52 has a gate electrically connected to an enabling line (e.g., 60A). The capacitive element 54 is electrically connected to a column conducting line (e.g., 30B) through both a semiconductor channel of the switching transistor 52 and the nonlinear element 51. The capacitive element 54 is electrically connected to the gate of the driving transistor 56. The light emitting 58 diode is electrically connected to a semiconductor channel of the driving transistor 56.

In operation, during a first predetermined time period T1, a first group of multiple rows of pixel elements (including pixel elements 50AA-50AC, 50BA-50BC, 50CA-50CC, and 50DA-50DC) are enabled as the enabled pixel elements when an enabling signal is applied to these pixel elements from an enabling driver 62ATD. During a second predetermined time period T2, a second group of multiple rows of pixel elements (including pixel elements 50EA-50EC, 50FA-50FC, 50GA-50GC, and 50HA-50HC) are enabled as the enabled pixel elements when an enabling signal is applied to these pixel elements from an enabling driver 62ETH. During a third predetermined time period T3, a third group of multiple rows of pixel elements (including pixel elements 50IA-50IC, 50JA-50JC, 50KA-50KC, and 50LA-50LC) are enabled as the enabled pixel elements when an enabling signal is applied to these pixel elements from an enabling driver 62ITL.

During the first predetermined time period T1, the switching transistors 52 in the enabled pixel elements 50AA-50AC, 50BA-50BC, 50CA-50CC, and 50DA-50DC are in the conducting state. The first predetermined time period T1 is further divided into four sub-time-periods T1(1), T1(2), T1(3), and T1(4). In one implementation, each of the four sub-time-periods has a duration that is one fourth of the duration of T1. During sub-time-periods T1(1), a first row of pixel elements 50AA-50AC is selected as the selected pixel elements for charging. During sub-time-periods T1(2), a second row of pixel elements 50BA-50BC is selected for charging. During sub-time-periods T1(3), a third row of pixel elements 50CA-50CC is selected for charging. During sub-time-periods T1(4), a fourth row of pixel elements 50DA-50DC is selected for charging.

During sub-time-periods T1(1), a selection voltage $V_{on}$ is applied to the row conducting line 40A to provide a forward biasing voltage for the nonlinear elements in the selected pixel elements 50AA-50AC and these nonlinear elements are driven into the conducting state. Deselect voltages are applied to the row conducting lines 40B-40L to provide reverse biasing voltages for the nonlinear elements in the non-selected pixel elements (i.e., 50BA-50BC, 50CA-50CC, . . . and 50LA-50LC) and these non-selected pixel elements are maintained at the non-conducting state. During sub-time-periods T1(1), the capacitive elements 54 in the selected pixel elements 50AA, 50AB, and 50AC are charged respectively with data drivers 70A, 70B, and 70C.

When the data driver 70A applies a predetermined current $I_d$(AA) to the column conducting line 30A, most of this current passes through the nonlinear element 51 in the pixel element 50AA, because only the nonlinear element 51 in the pixel element 50AA is forward biased and the nonlinear elements in other pixel elements that connected to the column conducting line 30A are reverse biased. In the case that the sum of the leakage currents in these reverse biased nonlinear elements is significantly small, the predetermined current $I_d$(AA) from the data driver 70A essentially all passes through the nonlinear element 51 in the pixel element 50AA. If voltage drops on the row conducting line 40A can be neglected, the voltage applied to the first terminal of the capacitive element 54 in the pixel element 50AA is now of the value $V_{on}+R_0I_d$(AA), and the capacitive element 54 can now be charged to a targeted voltage. Here, $R_0$ is the resistance of the resistive element 55. Similarly, when the data driver 70B applies a predetermined current $I_d$(AB) to the column conducting line 30B, a voltage of the value $V_{on}+R_0I_d$(AB) can be applied to the first terminal of the capacitive element 54 in the pixel element 50AB. When the data driver 70C applies a predetermined current $I_d$(AC) to the column conducting line 30C, a voltage of the value $V_{on}+R_0I_d$(AC) can be applied to the first terminal of the capacitive element 54 in the pixel element 50AC. In the above, it is assumed that the leakage currents in the reverse biased nonlinear elements can be neglected and the voltage drops on the row conducting lines can be neglected.

During sub-time-periods T1(2), a selection voltage $V_{on}$ is applied to the row conducting line 40B to provide a forward biasing voltage for the nonlinear elements in the selected pixel elements 50BA-50BC. Deselect voltages are applied to the row conducting lines 40A and 40C-40L to provide reverse biasing voltages for the nonlinear elements in the non-selected pixel elements (i.e., 50AA-50AC, 50CA-50CC, . . . , and 50LA-50LC). During sub-time-periods T1(2), the capacitive elements 54 in the selected pixel elements 50BA, 50BB, and 50BC are charged respectively with data drivers 70A, 70B, and 70C.

During sub-time-periods T1(3), a selection voltage $V_{on}$ is applied to the row conducting line 40C to provide a forward biasing voltage for the nonlinear elements in the selected pixel elements 50CA-50CC. Deselect voltages are applied to the row conducting lines 40A-40B and 40D-40L to provide reverse biasing voltages for the nonlinear elements in the non-selected pixel elements (i.e., 50AA-50AC, 50BA-50BC, 50DA-50DC, . . . , and 50LA-50LC). During sub-time-periods T1(3), the capacitive elements 54 in the selected pixel elements 50CA, 50CB, and 50CC are charged respectively with data drivers 70A, 70B, and 70C.

During sub-time-periods T1(4), a selection voltage $V_{on}$ is applied to the row conducting line 40D to provide a forward biasing voltage for the nonlinear elements in the selected pixel elements 50DA-50DC. Deselect voltages are applied to the row conducting lines 40A-40C and 40E-40L to provide reverse biasing voltages for the nonlinear elements in the non-selected pixel elements (i.e., 50AA-50AC, 50BA-50BC, 50CA-50CC, 50EA-50EC, . . . , and 50LA-50LC). During sub-time-periods T1(4), the capacitive elements 54 in the selected pixel elements 50DA, 50DB, and 50DC are charged respectively with data drivers 70A, 70B, and 70C.

At the end of sub-time-period T1(4) (i.e., the end of T1), a disabling signal is applied to the first group of multiple rows of pixel elements (including pixel elements 50AA-50AC, 50BA-50BC, 50CA-50CC, and 50DA-50DC) and the switching transistors 52 in these pixel elements are changed to the non-conducting state; consequently, the voltages on the capacitive elements 54 in these pixel elements can then be maintained.

With similar operation principle, during the second predetermined time period T2, the second group of multiple rows of pixel elements (including pixel elements 50EA-50EC, 50FA-50FC, 50GA-50GC, and 50HA-50HC) are charged. During the third predetermined time period T3, the third group of multiple rows of pixel elements (including pixel elements 50IA-50IC, 50JA-50JC, 50KA-50KC, and 50LA-50LC) are charged.

FIGS. 3A-3D are implementations of active matrix displays in which the nonlinear elements 51 in the pixel elements (e.g., 50AA-AC, 50BA-BC, . . . , and 50LA-50LC) are metal-insulator-metal diodes. In general, the nonlinear elements 51 can be metal-insulator-metal diodes, PN diodes, PIN diodes, Schottky diodes, one or more serially connected diodes and resistors, or other kinds of two terminal non-linear devices. Certain kinds of three terminal devices can also be used as the nonlinear elements 51.

Figure 4A:
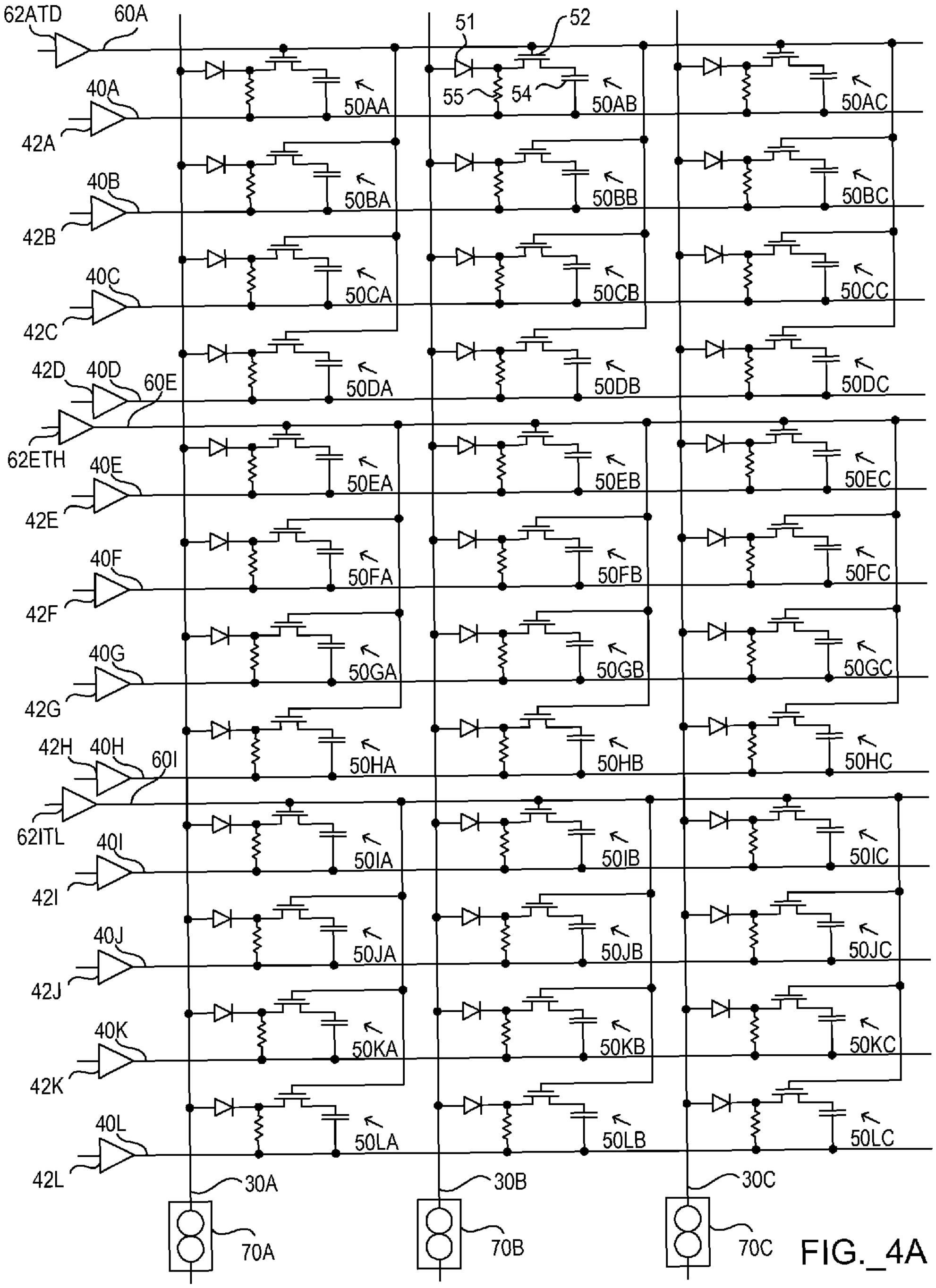
FIGS. 4A-4B are implementations of active matrix displays in which the capacitive element in a pixel element has a terminal connected to a row conducting line that is also connected to the resistive element.
Figure 4B:
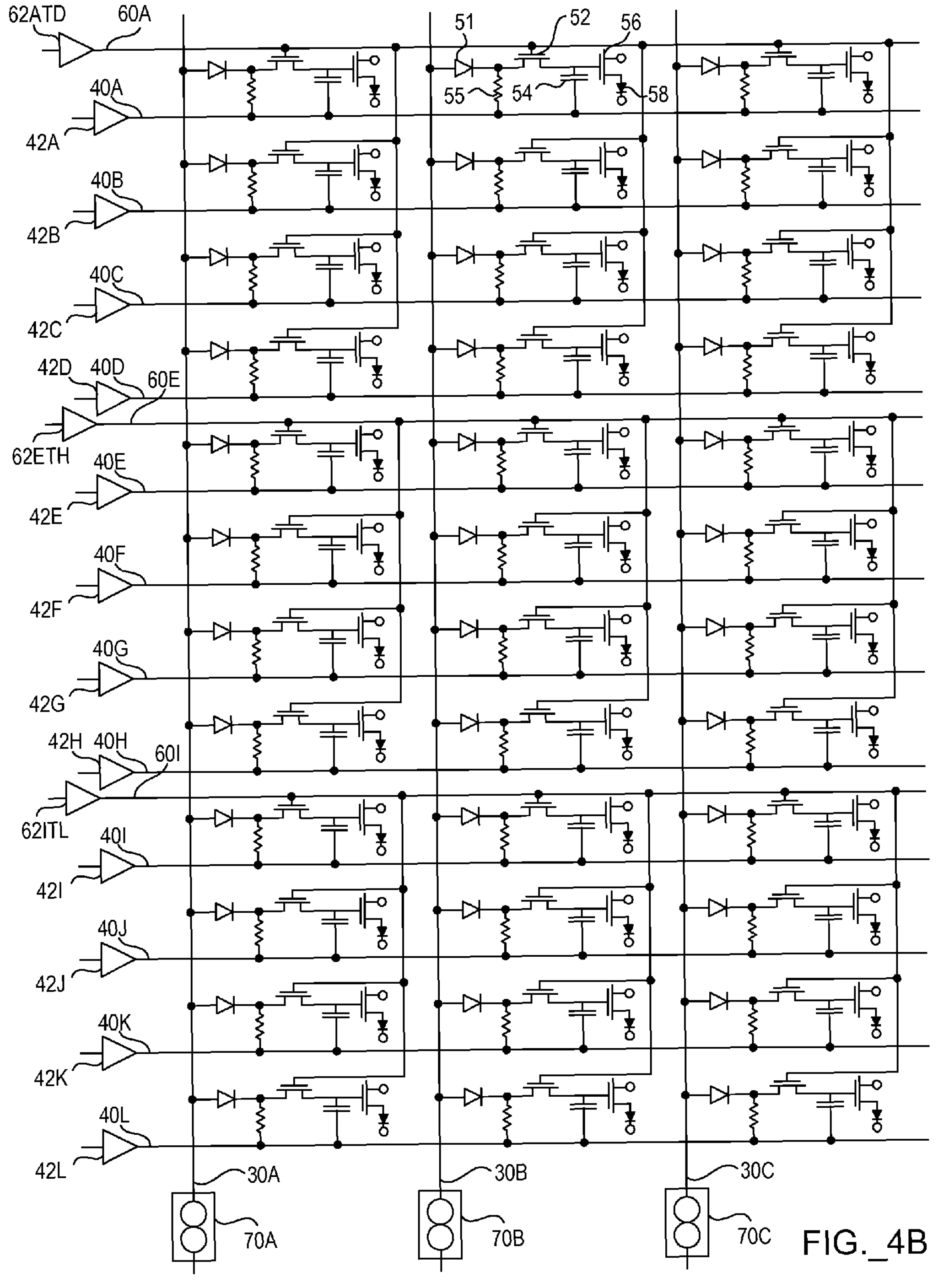

FIGS. 4A-4B are implementations of active matrix displays in which the capacitive element in a pixel element has a terminal connected to a row conducting line that is also connected to the resistive element. For example, in the pixel element 50AB, the capacitive element 54 has a first terminal electrically connected to the column conducting line 30B through both a semiconductor channel of the switching transistor 52 and the nonlinear element 51. The capacitive element 54 has a second terminal electrically connected to the row conducting line 40A that is also connected to the first terminal of the resistive element 55.

In operation, during sub-time-periods T1, the switching transistor 52 in the pixel element 50AB is in the conducting state because the first group of multiple rows of pixel elements (including pixel elements 50AA-50AC, 50BA-50BC, 50CA-50CC, and 50DA-50DC) are the enabled pixel elements. During sub-time-periods T1(1), the nonlinear elements 51 in pixel elements 50AA-50AC are also in the conducting state because pixel elements 50AA-50AC are the selected pixel elements and the nonlinear element 51 in the selected pixel elements is forward biased.

During sub-time-periods T1(1), when the data driver 70B applies a predetermined current $I_d$(AB) to the column conducting line 30B, the voltage across the capacitive element 54 in the pixel element 50AB will be of the value $R_0I_d$(AB), if it is assumed that the total leakage current by other nonlinear elements that are connected to the column conducting line 30B can be reasonably neglected. The voltage across the capacitive element 54 in the pixel element 50AB can be charged to the value $R_0I_d$(AB) even there are voltage drops on the row conducting line 40A. This voltage across the capacitive element 54 in the pixel element 50AB can be determined by the predetermined current $I_d$(AB) that is applied to the column conducting line 30B from the data driver 70B.

Similarly, during sub-time-periods T1(1), when the data driver 70A applies a predetermined current $I_d$(AA) to the column conducting line 30A, the voltage across the capacitive element 54 in the pixel element 50AA can be charged to a predetermined value $R_0I_d$(AA). When the data driver 70C applies a predetermined current $I_d$(AC) to the column conducting line 30C, the voltage across the capacitive element 54 in the pixel element 50AC can be charged to a predetermined value $R_0I_d$(AC).

Figure 5A:
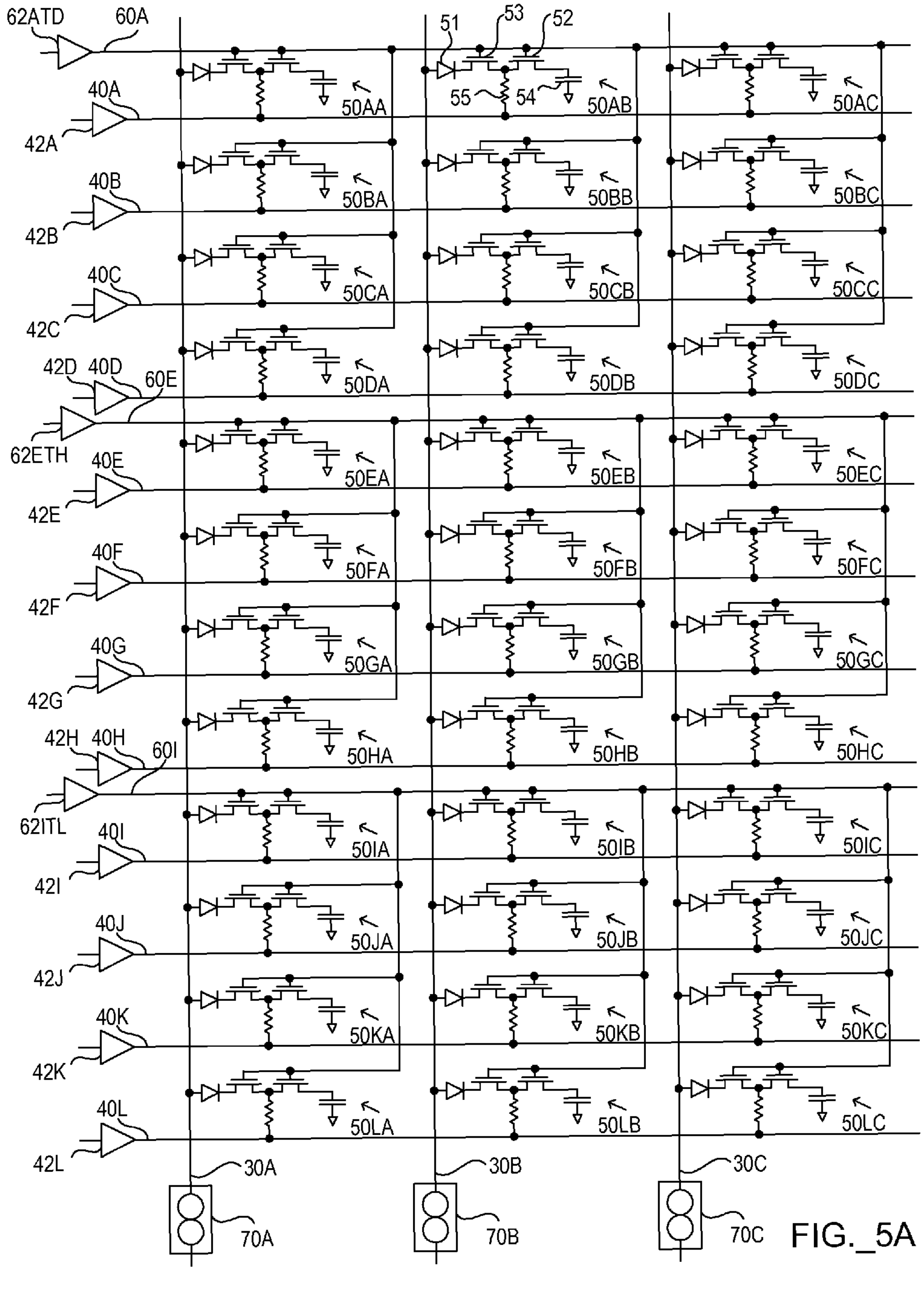
FIGS. 5A-5B and FIGS. 6A-6B are implementations of active matrix displays in which the capacitive element is electrically connected to a column conducting line through the semiconductor channel of a switching transistor, the semiconductor channel of a secondary switching transistor, and a nonlinear element.
Figure 5B:
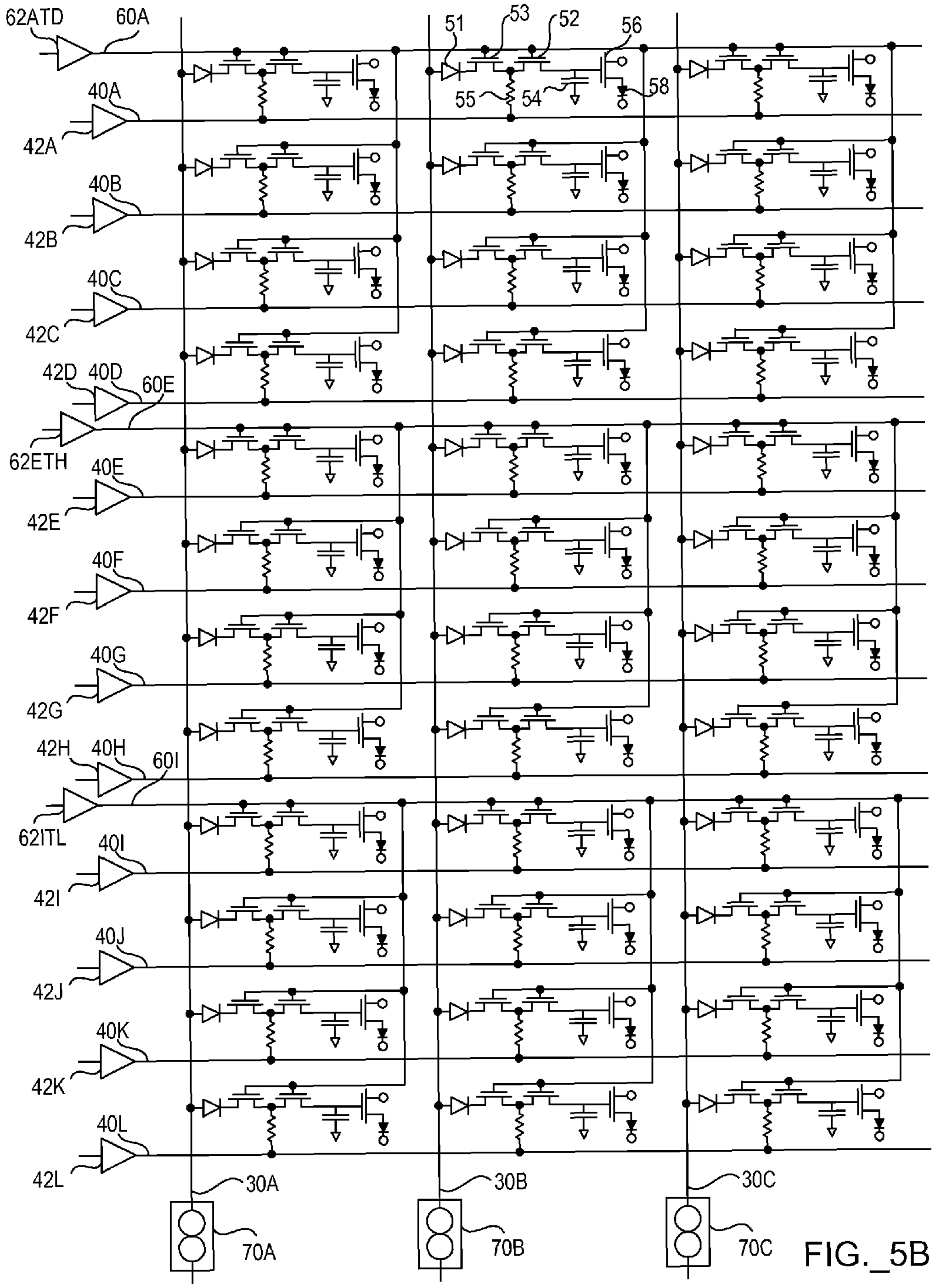
Figure 6A:
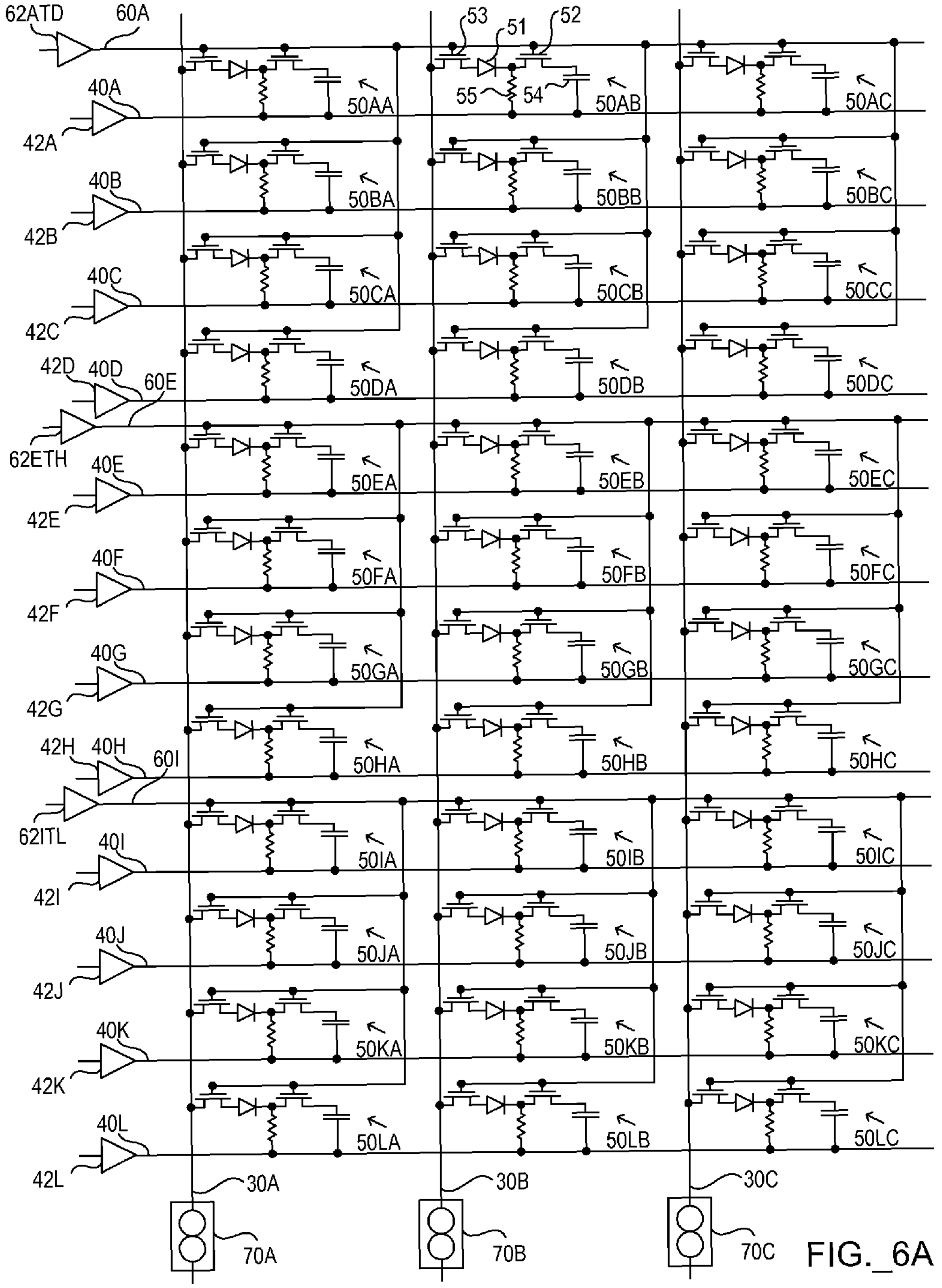
Figure 6B:
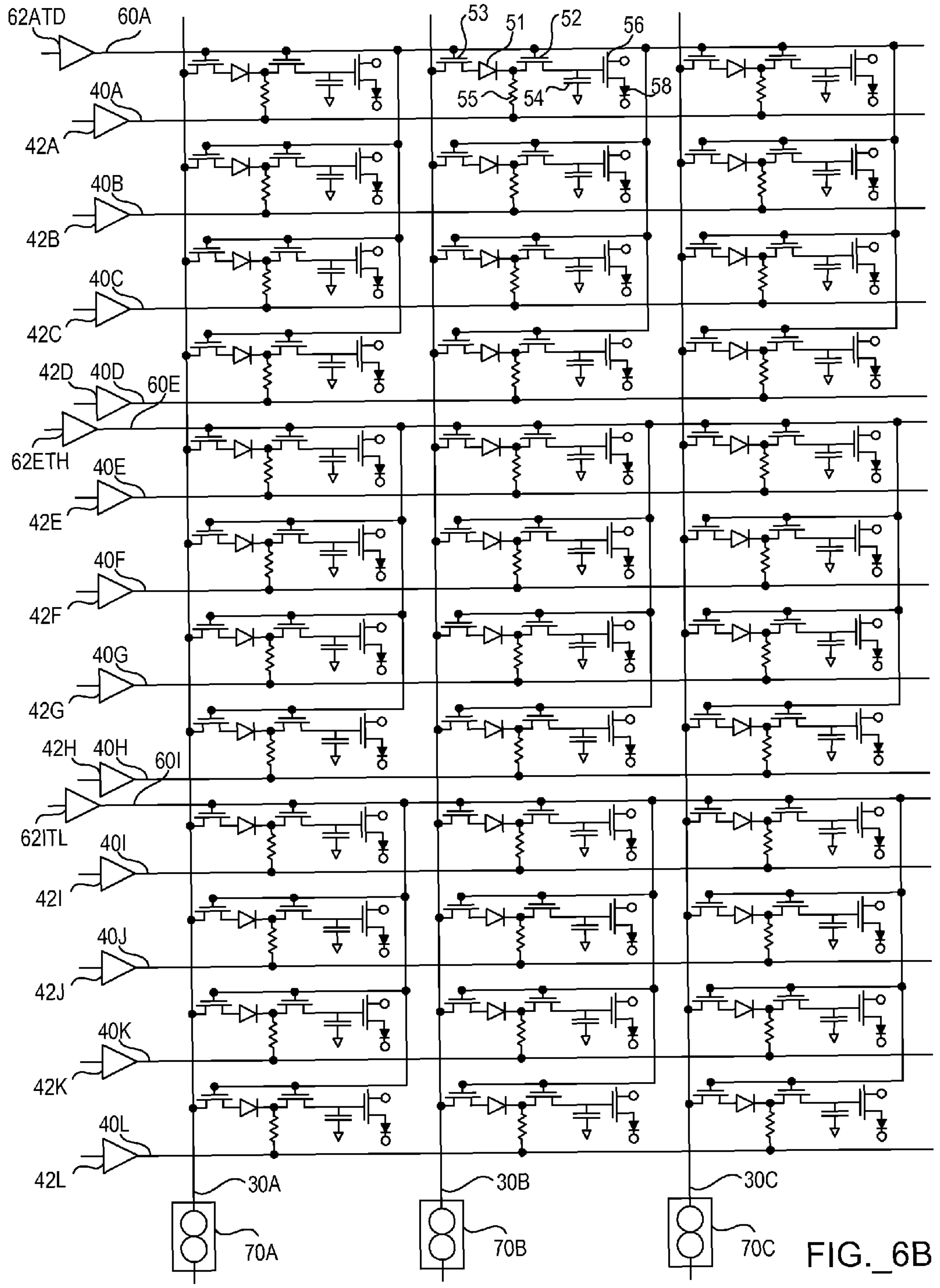

FIGS. 5A-5B and FIGS. 6A-6B are implementations of active matrix displays in which the capacitive element is electrically connected to a column conducting line through the semiconductor channel of a switching transistor, the semiconductor channel of a secondary switching transistor, and a nonlinear element. For example, in addition to the switching transistor 52, the pixel element 50AB also includes a secondary switching transistor 53. The secondary switching transistor 53 has a gate electrically connected to the enabling line 60A. The capacitive element 54 has a first terminal electrically connected to the second terminal of the resistive element 55 through a semiconductor channel of the switching transistor 52. The second terminal of the resistive element 55 is electrically connected to the column conducting line 30B through both a semiconductor channel of the secondary switching transistor 53 and the nonlinear element 51. The first terminal of the resistive element 55 is electrically connected to the row conducting line 40A. In FIG. 6A-FIG. 6B, the second terminal of the capacitive element 54 is also electrically connected to the row conducting line 40A. In FIGS. 5A-5B, in contrast, the second terminal of the capacitive element 54 is electrically connected to a common voltage. In still other implementations, the second terminal of the capacitive element 54 can be electrically connected to a row conducting line that is different from the row conducting line 40A.

In the implementations as shown in FIGS. 5A-5B and FIGS. 6A-6B, the gate of the secondary switching transistor 53 and the gate of the switching transistor 52 are connected to a same enabling line 60A. In other implementations, the gate of the secondary switching transistor 53 and the gate of the switching transistor 52 can be connected to different enabling lines.

In operation, during the first predetermined time period T1, when an enabling signal is applied to the enabling line 60A, the first group of multiple rows of pixel elements (including pixel elements 50AA-50AC, 50BA-50BC, 50CA-50CC, and 50DA-50DC) are enabled as the enabled pixel elements, and the switching transistors 52 and the secondary switching transistors 53 in these enabled pixel elements are in the conducting state. During sub-time-periods T1(1), a selection voltage $V_{on}$ is applied to the row conducting line 40A to drive the nonlinear element 51 in pixel elements 50AA-50AC into the conducting state.

During sub-time-periods T1(1), when the data driver 70B applies a predetermined current $I_d$(AB) to the column conducting line 30B, only the leakage currents by the nonlinear elements in the enabled pixel elements 50BB, 50CB, and 50DB can influence the current passing through the nonlinear element 51 in the selected pixel element 50AB, because the non-enabled pixel elements are essentially isolated from the column conducting line 30B by the secondary switching transistors 53 in the non-enabled pixel elements. If the total leakage current by the nonlinear elements in the enabled pixel elements 50BB, 50CB, and 50DB can be reasonably neglected, the predetermined current $I_d$(AB) as supplied by the data driver 70B will essentially all pass through the nonlinear element 51 in the pixel element 50AB.

In FIGS. 5A-5B, during sub-time-periods T1(1), when the data driver 70B applies a predetermined current $I_d$(AB) to the column conducting line 30B, a voltage of the value $V_{on}+R_0I_d$ (AB) can be applied to the first terminal of the capacitive element 54 in the pixel element 50AB. Similarly, when the data driver 70B applies a predetermined current $I_d$(AA) to the column conducting line 30A, a voltage of the value $V_{on}+R_0I_d$(AA) can be applied to the first terminal of the capacitive element 54 in the pixel element 50AA. When the data driver 70C applies a predetermined current $I_d$(AC) to the column conducting line 30C, a voltage of the value $V_{on}+R_0I_d$(AC) can be applied to the first terminal of the capacitive element 54 in the pixel element 50AC. In the above, it is assumed that the voltage drops on the row conducting lines can be neglected and the leakage currents by the nonlinear elements in the enabled pixel elements can be neglected.

In FIGS. 6A-6B, during sub-time-periods T1(1), when the data driver 70B applies a predetermined current $I_d$(AB) to the column conducting line 30B, a voltage of the value $R_0I_d$(AB) can be applied across the capacitive element 54 in the pixel element 50AB. Similarly, when the data driver 70A applies a predetermined current $I_d$(AA) to the column conducting line 30A, a voltage of the value $R_0I_d$(AA) can be applied across the capacitive element 54 in the pixel element 50AA. When the data driver 70C applies a predetermined current $I_d$(AC) to the column conducting line 30C, a voltage of the value $R_0I_d$(AC) can be applied across the capacitive element 54 in the pixel element 50AC. In the above, it is assumed that the leakage currents by the nonlinear elements in the enabled pixel elements can be neglected.

Figure 7A:
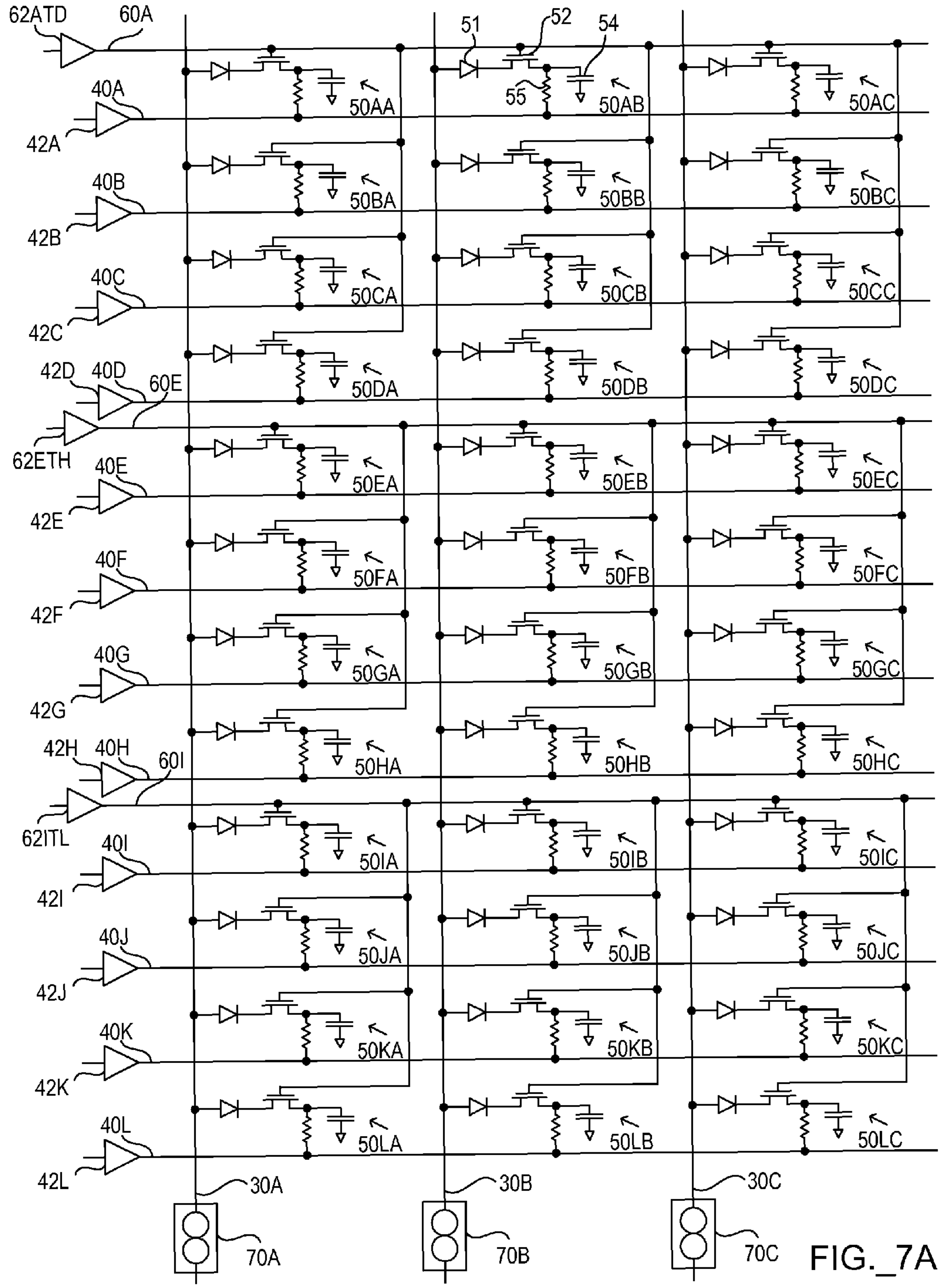
FIGS. 7A-7B are implementations of active matrix displays in which the first terminal of the capacitive element is electrically connected to the second terminal of resistive element.
Figure 7B:
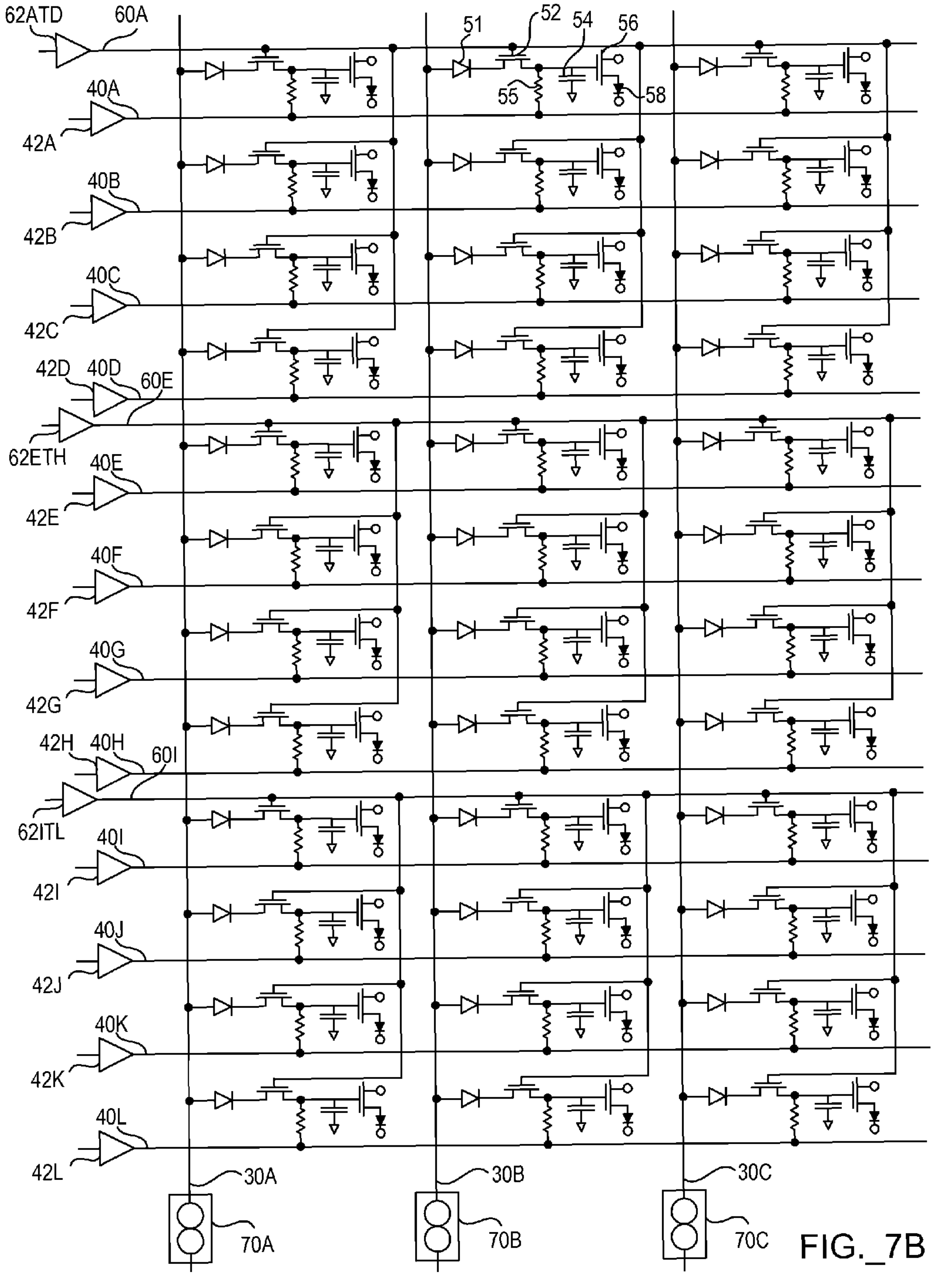

FIGS. 7A-7B are implementations of active matrix displays in which the first terminal of the capacitive element is electrically connected to the second terminal of resistive element. In FIGS. 7A-7B, the second terminal of the capacitive element 54 is electrically connected to a common voltage. In other implementations, the second terminal of the capacitive element 54 can be electrically connected to a row conducting line. This row conducting line can be the same row conducting line that is connected to the first terminal of the resistive element 55. This row conducting line can be a different row conducting line.

Figure 8A:
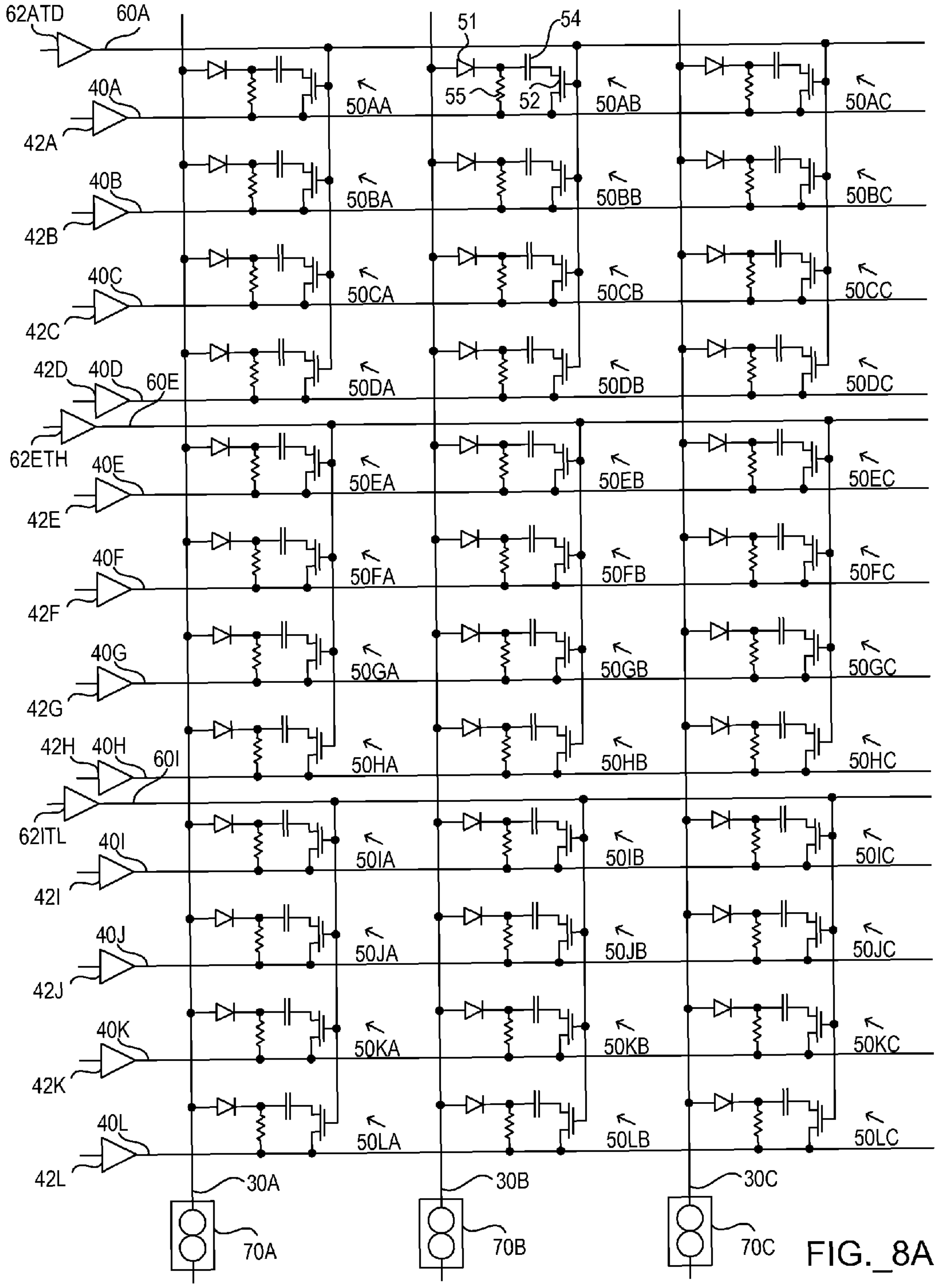
FIGS. 8A-8B are implementations of active matrix displays in which the second terminal of the capacitive element is electrically connected to the semiconductor channel of the switching transistor.
Figure 8B:
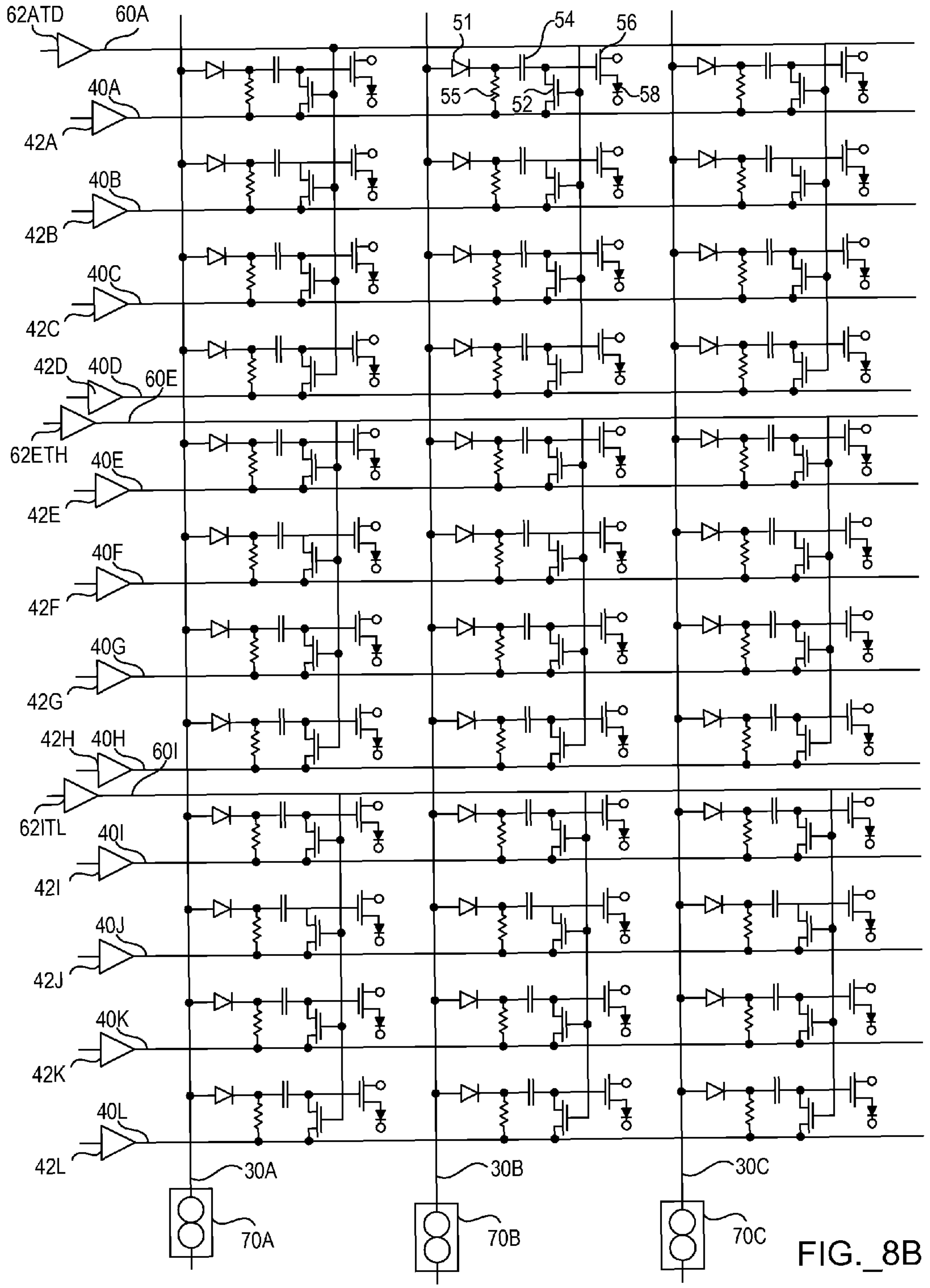

FIGS. 8A-8B are implementations of active matrix displays in which the second terminal of the capacitive element is electrically connected to the semiconductor channel of the switching transistor. For example, in the pixel element 50AB, the second terminal of the capacitive element 54 is electrically connected to the row conducting line 40A through the semiconductor channel of the switching transistor 52. In operation, the capacitive element 54 in a pixel element can be charged when that pixel element is both an enabled pixel element and a selected pixel element. For example, when the pixel element 50AB is an enabled pixel element, the switching transistor 52 in the pixel element 50AB is in a conducting state. When the pixel element 50AB is also a selected pixel element, the nonlinear element 51 in the pixel element 50AB is also in a conducting state. If a predetermined current $I_d$(AB) passes through both the nonlinear element 51 and the resistive element 55 and if a selection voltage $V_{on}$ is applied to the first terminal of the resistive element 55, then, the voltage at the second terminal of the resistive element 55 can become $V_{on}+R_0I_d$(AB). After the capacitive element 54 is charged to the voltage of the value $R_0I_d$(AB), if a deselect voltage $V_{off}$ is applied to the first terminal of the resistive element 55 in the pixel element 50AB to drive the nonlinear element 51 into a non-conducting state and if the pixel element 50AB also becomes a non-enabled pixel element such that the switching transistor 52 is also changed into a non-conducting state, then, the voltage across the capacitive element 54 can be maintained at $R_0I_d$(AB). In addition, the voltage at the second terminal of the capacitive element 54 can be maintained at $V_{off}-R_0I_d$(AB).

Figure 9A:
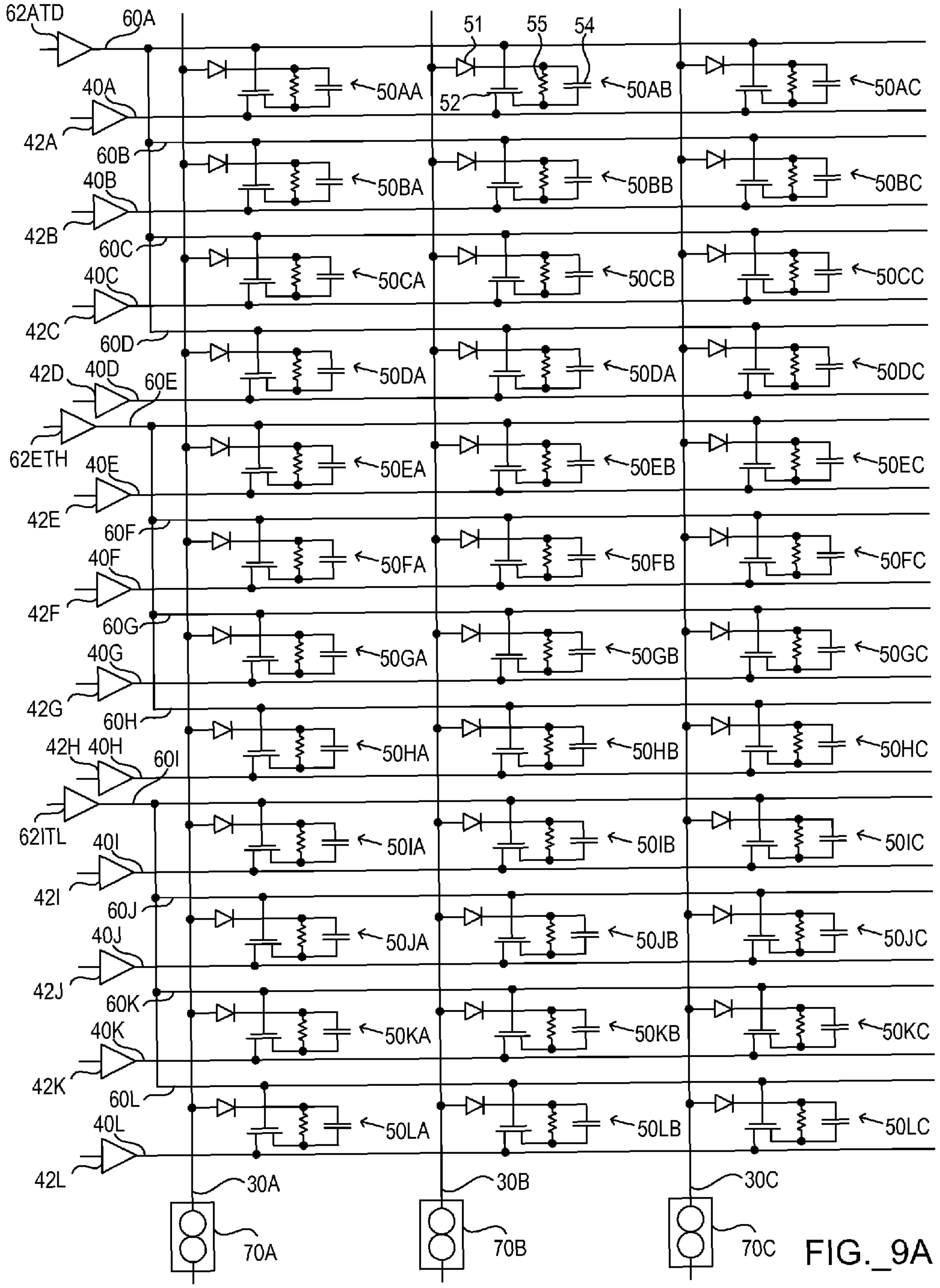
FIGS. 9A-9B are implementations of active matrix displays in which the second terminal of the capacitive element is electrically connected to the semiconductor channel of the switching transistor and the first terminal of the resistive element is electrically connected to the row conducting line through the semiconductor channel of the switching transistor.
Figure 9B:
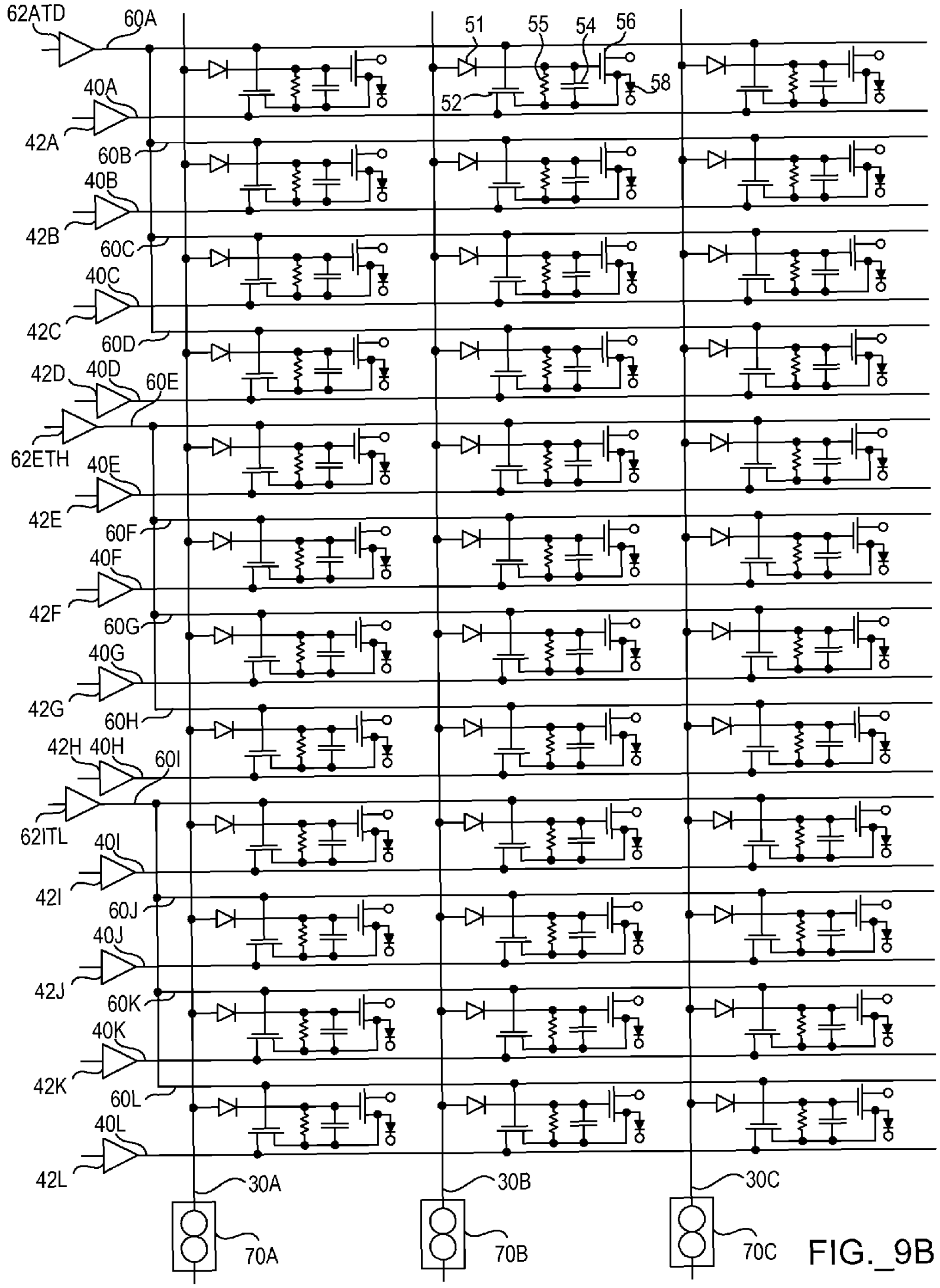

FIGS. 9A-9B are implementations of active matrix displays in which the second terminal of the capacitive element is electrically connected to the semiconductor channel of the switching transistor and the first terminal of the resistive element is electrically connected to the row conducting line through the semiconductor channel of the switching transistor. For example, in the pixel element 50AB, the second terminal of the capacitive element 54 is electrically connected to the semiconductor channel of the switching transistor 52. The first terminal of the resistive element 55 is electrically connected to the row conducting line 40A through the semiconductor channel of the switching transistor 52. In operation, the capacitive element 54 in a pixel element can be charged when that pixel element is both an enabled pixel element and a selected pixel element. For example, when the pixel element 50AB is an enabled pixel element, the switching transistor 52 in the pixel element 50AB is in a conducting state. When the pixel element 50AB is also a selected pixel element, the nonlinear element 51 in the pixel element 50AB is also in a conducting state. If a predetermined current $I_d$(AB) passes through both the nonlinear element 51 and the resistive element 55, then, the capacitive element 54 can be charged to the voltage of the value $R_0I_d$(AB). This voltage across the capacitive element 54 can be maintained if the pixel element 50AB becomes a non-enabled pixel element such that the switching transistor 52 is changed into a non-conducting state.

In the previously described implementations for driving active matrix displays (e.g., as shown in FIGS. 2A-2D, 3A-3D, 4A-4B, 5A-5B, 6A-6B, 7A-7B, 8A-8B, and 9A-9B), the data driver (e.g., 70B) generally applies a predetermined current (e.g., $I_d$(AB)) to the column conducting line (e.g., 30B) for charging the capacitive element 54 in a pixel element (e.g., 50AB). In other implementations, the data driver 70B generally applies a predetermined voltage to the column conducting line (e.g., 30B) for charging the capacitive element 54 in a pixel element (e.g., 50AB). When the data driver 70B applies a predetermined voltage instead of a predetermined current, the voltage applied to the first terminal of the capacitive element 54 may depend on the voltage drop on the nonlinear element 51 in the pixel element (e.g., 50AB). In one implementation, the voltage drop on the nonlinear element 51 can be compensated by (1) measuring the characteristics of each pixel element, (2) storing the measured characteristics of each pixel element in a calibrating memory, and (3) using the characteristics of each pixel element stored in the calibrating memory to determine the correct predetermined voltage to be applied to each pixel element. The active matrix displays can include electric circuitry for compensating the voltage drop on the nonlinear element 51.

Figure 10A:
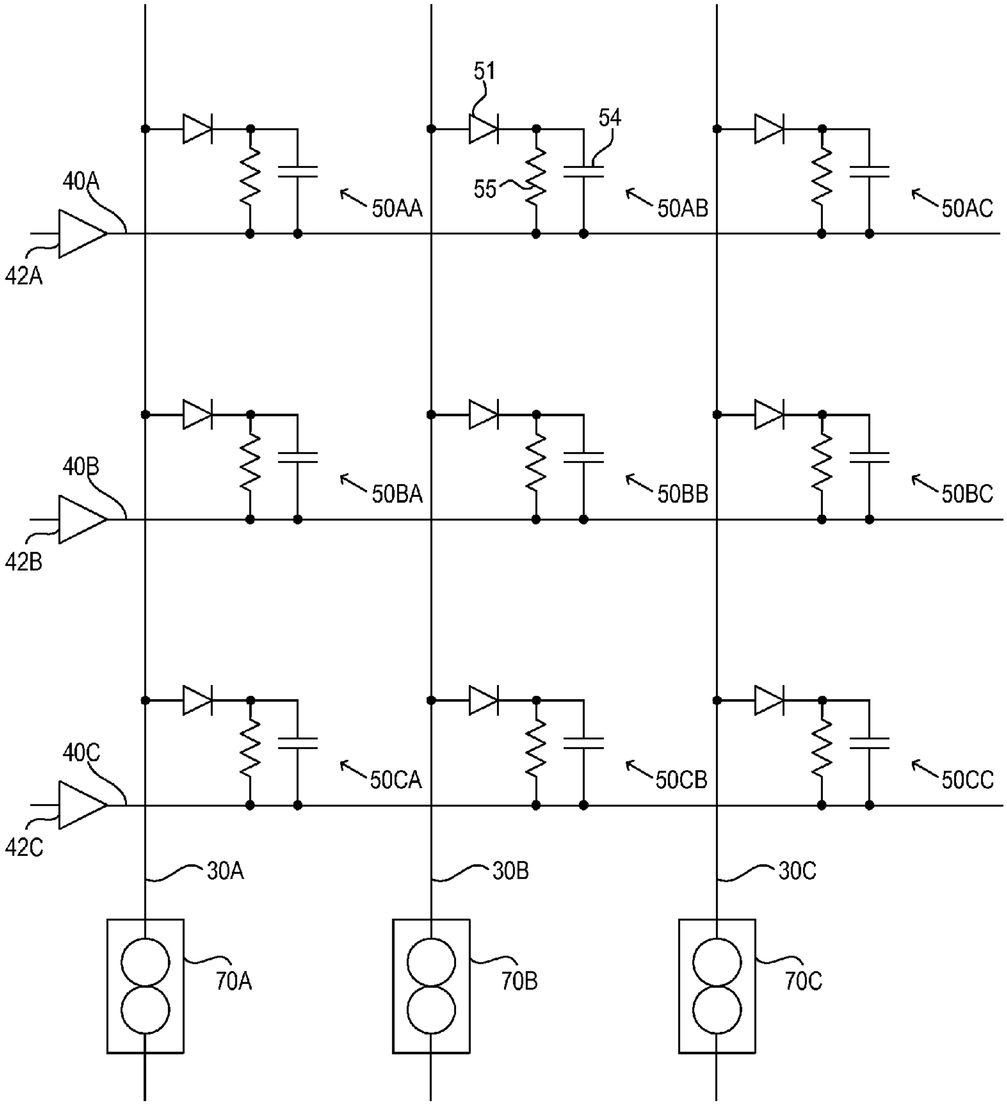
FIGS. 10A-10B are implementations of active matrix displays that have nonlinear elements in pixel elements and data drivers to provide predetermined currents to column conducting lines.
Figure 10B:
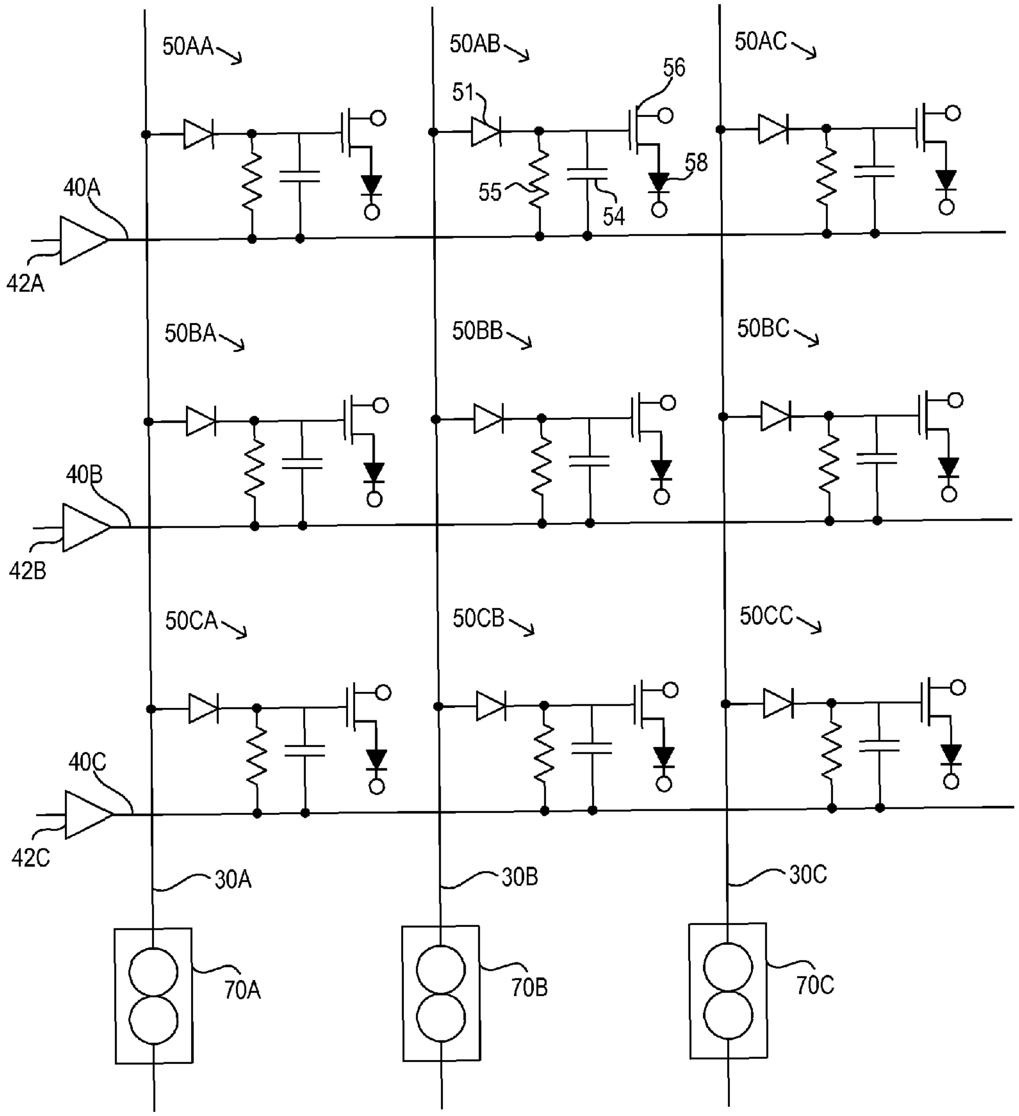

FIGS. 10A-10B are implementations of active matrix displays that have nonlinear elements in pixel elements and data drivers to provide predetermined currents to column conducting lines. In FIGS. 10A-10B, the section of the active matrix display includes a matrix of pixel elements (e.g., 50AA, 50AB, 50AC, 50BA, 50BB, 50BC, 50CA, 50CB, and 50CC), an array of column conducting lines (e.g., 30A, 30B, and 30C), an array of row conducting lines crossing the array of column conducting lines (e.g., 40A, 40B, and 40C), and a plurality of data drivers (e.g., 70A, 70B, and 70C). A pixel element (e.g., 50AB) includes a resistive element 55, a nonlinear element 51, and a capacitive element 54. The capacitive element 54 has a first terminal and a second terminal. The nonlinear element 51 has a first terminal electrically connected to a column conducting line (e.g, 30B) and has a second terminal electrically connected to the first terminal of the capacitive element 54. The resistive element 55 has a first terminal electrically connected to a row conducting line (e.g., 40A) and has a second terminal electrically connected to the first terminal of the capacitive element 54. In the implementations as shown in FIGS. 10A-10B, the second terminal of the capacitive element 54 is electrically connected to the first terminal of the resistive element 55. The data driver (e.g, 70B) can apply a predetermined current to a column conducting line (e.g., 30B). In FIGS. 10A-10B, the active matrix display also includes a plurality of selection drivers (e.g., 42A, 42B, and 42C). A selection driver (e.g., 42A) can apply a predetermined voltage to a row conducting line (e.g., 40A).

In operation, during a first predetermined time period T1, a first row of pixel elements 50AA-50AC is selected as the selected pixels for charging. During a second predetermined time period T2, a second row of pixel elements 50BA-50BC is selected for charging. During a third predetermined time period T3, a third row of pixel elements 50CA-50CC is selected for charging.

During the first predetermined time period T1, a selection voltage $V_{on}$ is applied to the row conducting line 40A to provide a forward biasing voltage for the nonlinear elements in the selected pixel elements 50AA-50AC and these nonlinear elements are driven into the conducting state. Deselect voltages are applied to the row conducting lines 40B and 40C to provide reverse biasing voltages for the nonlinear elements in the non-selected pixel elements (i.e., 50BA-50BC and 50CA-50CC) and these non-selected pixel elements are maintained at the non-conducting state. During the first predetermined time period T1, the capacitive elements 54 in the selected pixel elements 50AA, 50AB, and 50AC are charged respectively with data drivers 70A, 70B, and 70C.

For charging the selected pixel element 50AB, the data driver 70B applies a predetermined current $I_d$(AB) to the column conducting line 30B. If the total leakage current by the nonlinear elements in the non-selected pixel elements (i.e., 50BB and 50CB) can be reasonably neglected, the voltage across the capacitive element 54 in the pixel element 50AB can be charged to the value $R_0I_d$(AB) even there are voltage drops on the row conducting line 40A.

Similarly, for charging the selected pixel element 50AA, the data driver 70A applies a predetermined current $I_d$(AA) to the column conducting line 30A, the voltage across the capacitive element 54 in the pixel element 50AA can be charged to a predetermined value $R_0I_d$(AA). For charging the selected pixel element 50AC, the data driver 70C applies a predetermined current $I_d$(AC) to the column conducting line 30C, the voltage across the capacitive element 54 in the pixel element 50AC can be charged to a predetermined value $R_0I_d$ (AC).

After the capacitive element 54 in a pixel element (e.g., 50AB) is charged to a target value, the nonlinear element 51 in the pixel element (e.g., 50AB) is driven into a non-conducting state and the voltage across the capacitive element 54 in the pixel element (e.g., 50AB) may change with time. Such voltage change over time, however, can follow a well defined function of time that essentially depends on some design parameters of the pixel element. When the voltage across the capacitive element 54 follows a well defined function of time, the total luminosity of a pixel element during a frame time period can be determined by the initial voltage across the capacitive element 54.

With similar operation principle, during the second predetermined time period T2, when predetermined currents $I_d$(BA), $I_d$(BB), and $I_d$(BC) are respectively applied to the column conducting lines 30A, 30B, and 30C, the capacitive element 54 in the pixel elements 50BA, 50BB, and 50BC can be respectively charged to the voltages of the values $R_0I_d$ (BA), $R_0I_d$(BB), and $R_0I_d$(BC). During the third predetermined time period T3, when predetermined currents $I_d$(CA), $I_d$(CB), and $I_d$(CC) are respectively applied to the column conducting lines 30A, 30B, and 30C, the capacitive element 54 in the pixel elements 50CA, 50CB, and 50CC can be respectively charged to the voltages of the values $R_0I_d$(CA), $R_0I_d$(CB), and $R_0I_d$(CC).

Figure 11A:
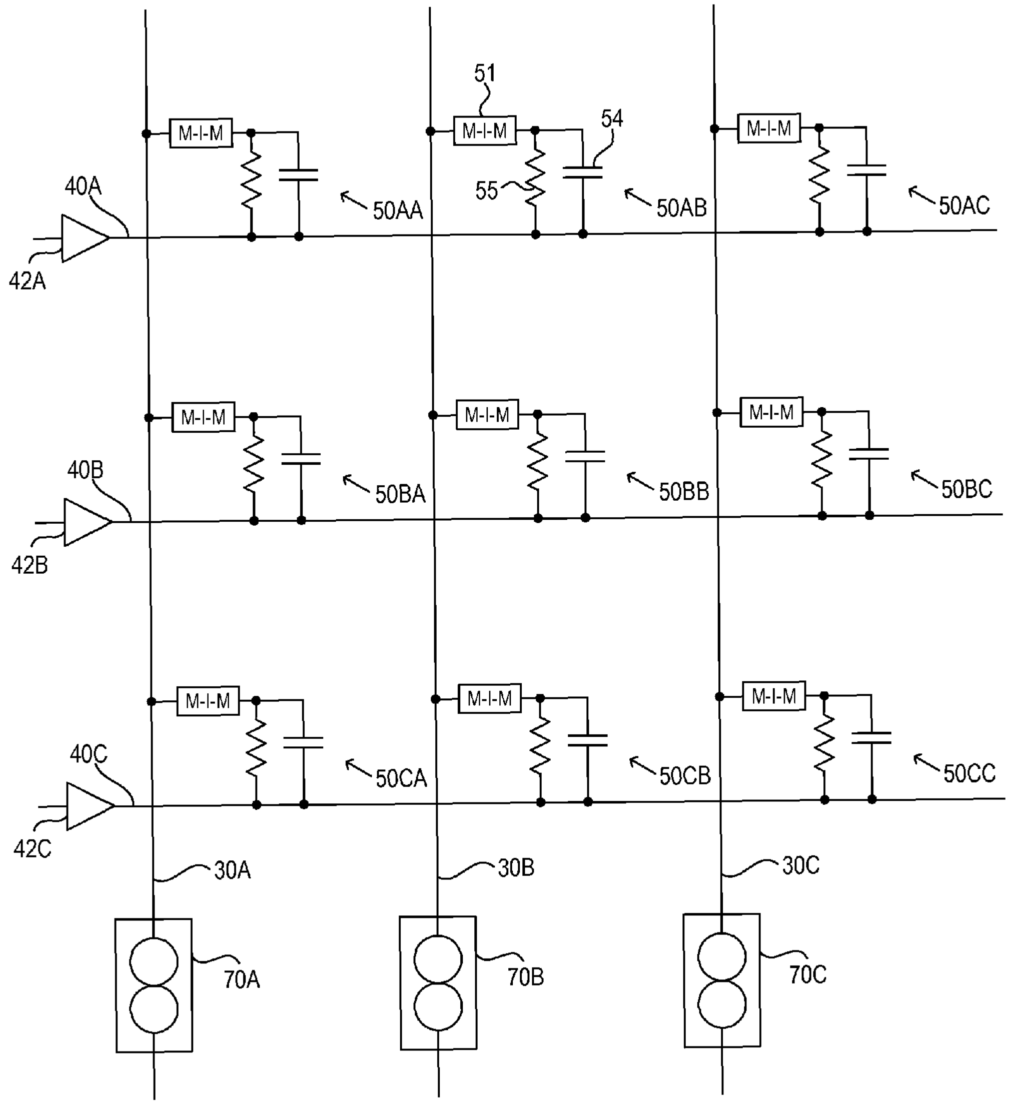
FIGS. 11A-11B shows that the nonlinear elements 51 in the pixel elements in the active matrix display can be metal-insulator-metal diodes.
Figure 11B:
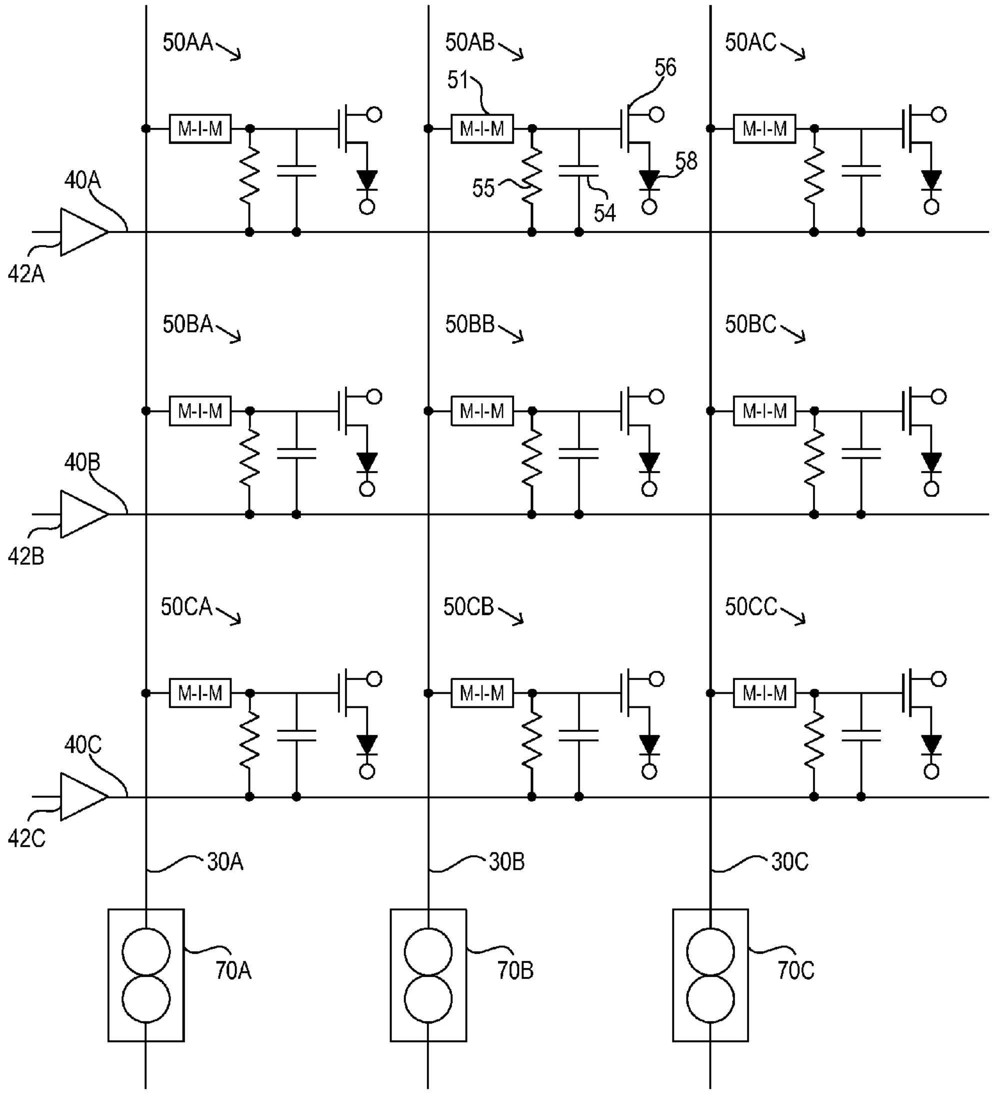

FIGS. 11A-11B shows that the nonlinear elements 51 in the pixel elements in the active matrix display can be metal-insulator-metal diodes. In general, the nonlinear elements 51 can be metal-insulator-metal diodes, PN diodes, PIN diodes, Schottky diodes, one or more serially connected diodes and resistors, or other kinds of two terminal non-linear devices. Certain kinds of three terminal devices can also be used as the nonlinear elements 51.

Figure 12A:
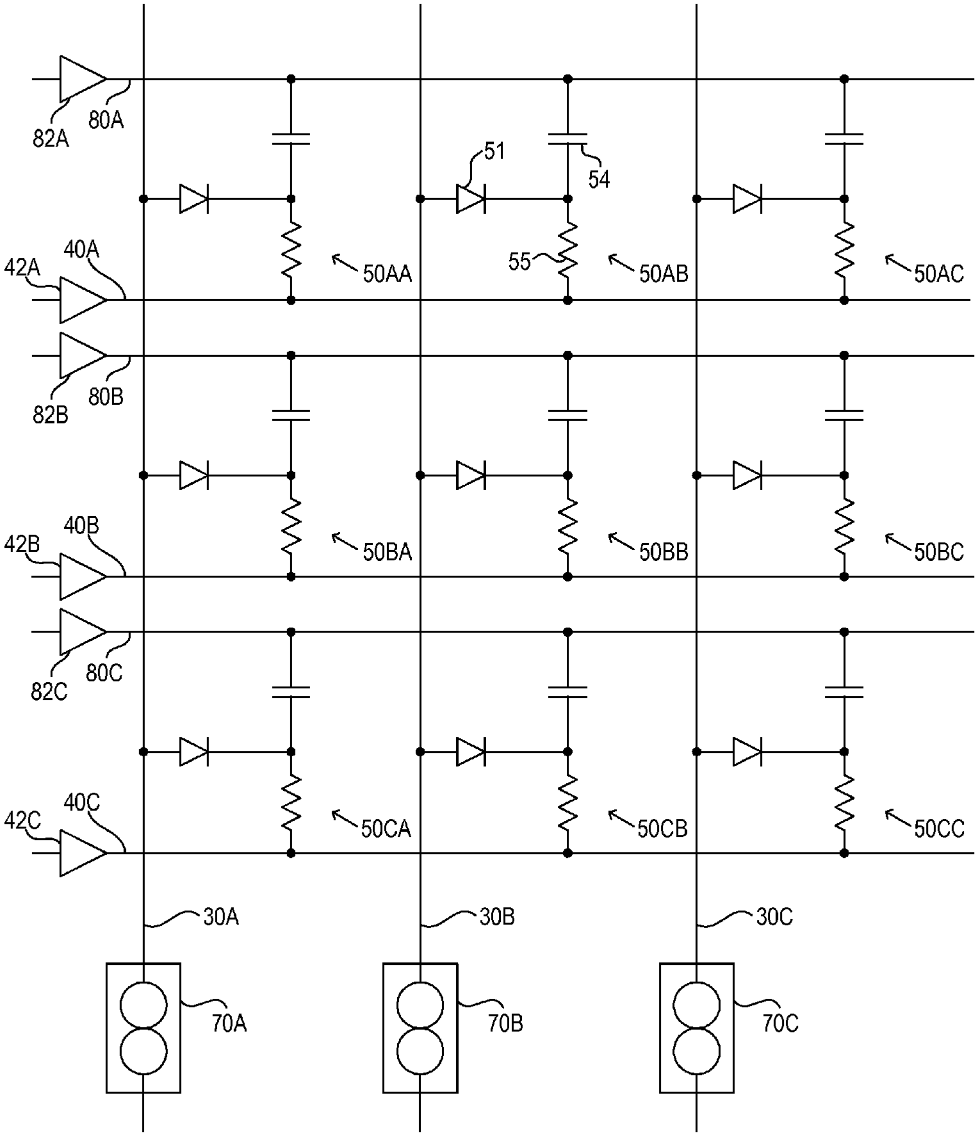
FIGS. 12A-12B are other implementations of active matrix displays that have nonlinear elements in pixel elements and data drivers to provide predetermined currents to column conducting lines.
Figure 12B:
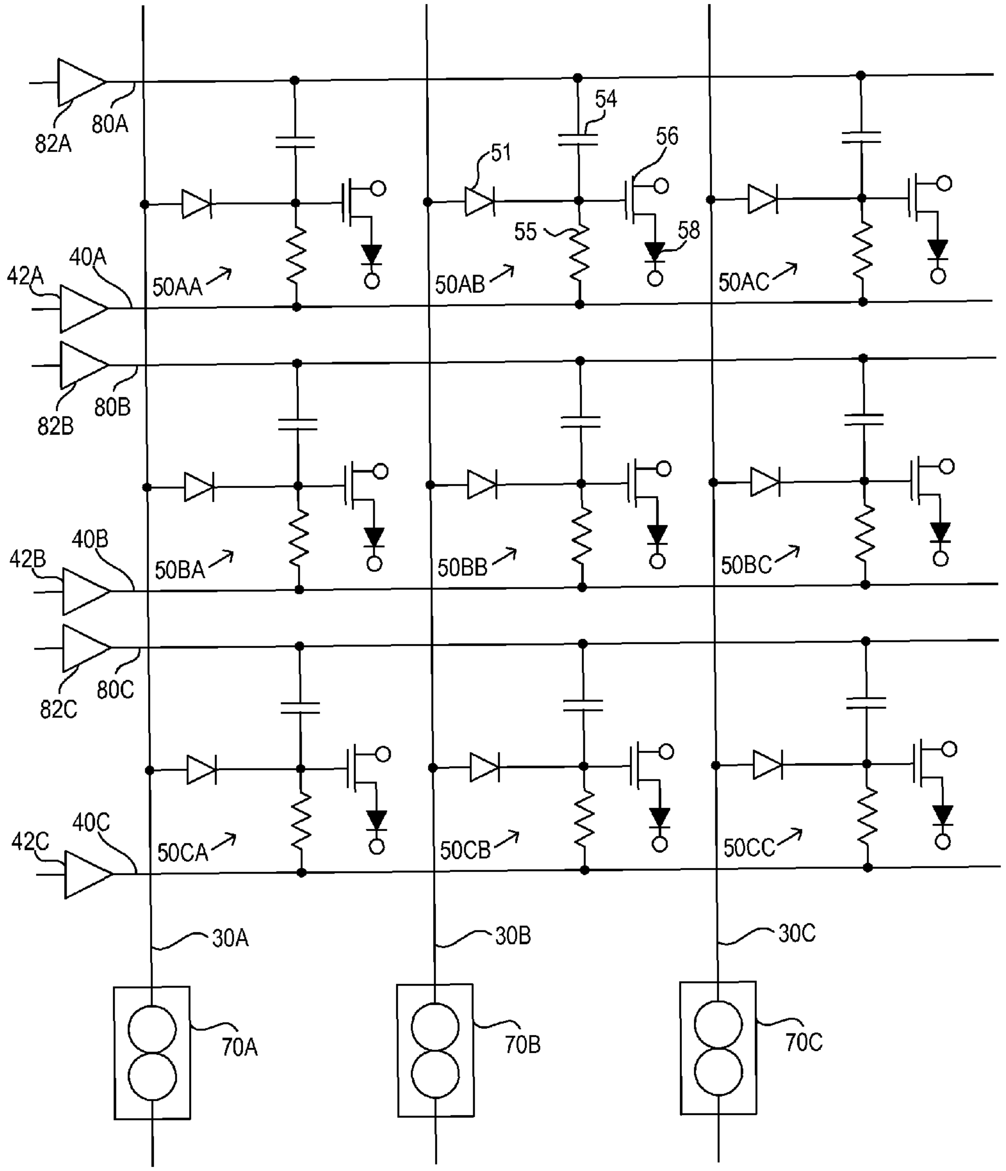

FIGS. 12A-12B are other implementations of active matrix displays that have nonlinear elements in pixel elements and data drivers to provide predetermined currents to column conducting lines. In FIGS. 12A-12B, the active matrix display includes an array of supplementary row conducting lines (e.g., 80A, 80B, and 80C) crossing the array of column conducting lines (e.g., 30A, 30B, and 30C). The second terminal of the capacitive element 54 in a pixel element (e.g., 50AB) is electrically connected to a supplementary row conducting line (e.g., 80A).

In operation, for charging the pixel element 50AB, if a predetermined current $I_d$(AB) passes through both the nonlinear element 51 and the resistive element 55 and if a selection voltage $V_{on}$ is applied to the first terminal of the resistive element 55, then, the voltage at the second terminal of the resistive element 55 can become $V_{on}+R_0I_d$(AB). If a supplementary voltage is applied to the supplementary row conducting line 80A such that the second terminal of the capacitive element 54 is set at a voltage of the value $V_{supp\_on}$, then, the capacitive element 54 can be changed to a voltage of the value $V_{on}+R_0I_d(AB)-V_{supp\_on}$. After the capacitive element 54 is charged to this target value, a deselect voltage $V_{off}$ is applied to the first terminal of the resistive element 55 to drive the nonlinear element 51 into a non-conducting state. Another supplementary voltage can also be applied to the supplementary row conducting line 80A. When the pixel element 50AB is changed to a non-selected pixel element, the voltage across the capacitive element 54 may still change with time. Such voltage change over time, however, can follow a well defined function of time that essentially depends on some design parameters of the pixel element. When the voltage across the capacitive element 54 follows a well defined function of time, the total luminosity of a pixel element during a frame time period can be determined by the initial voltage across the capacitive element 54.

Figure 13A:
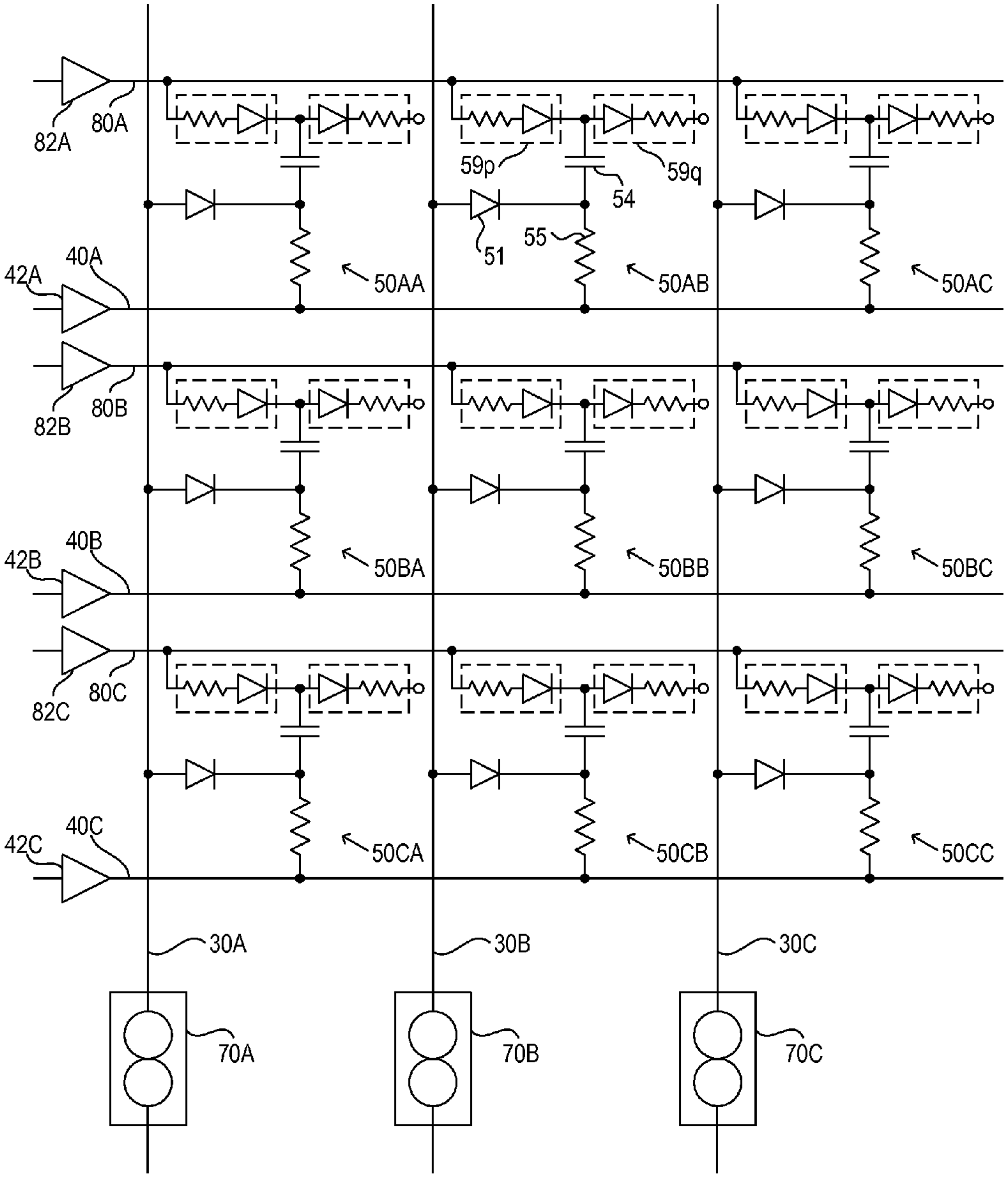
FIGS. 13A-13B are additional implementations of active matrix displays that have nonlinear elements in pixel elements and data drivers to provide predetermined currents to column conducting lines.
Figure 13B:
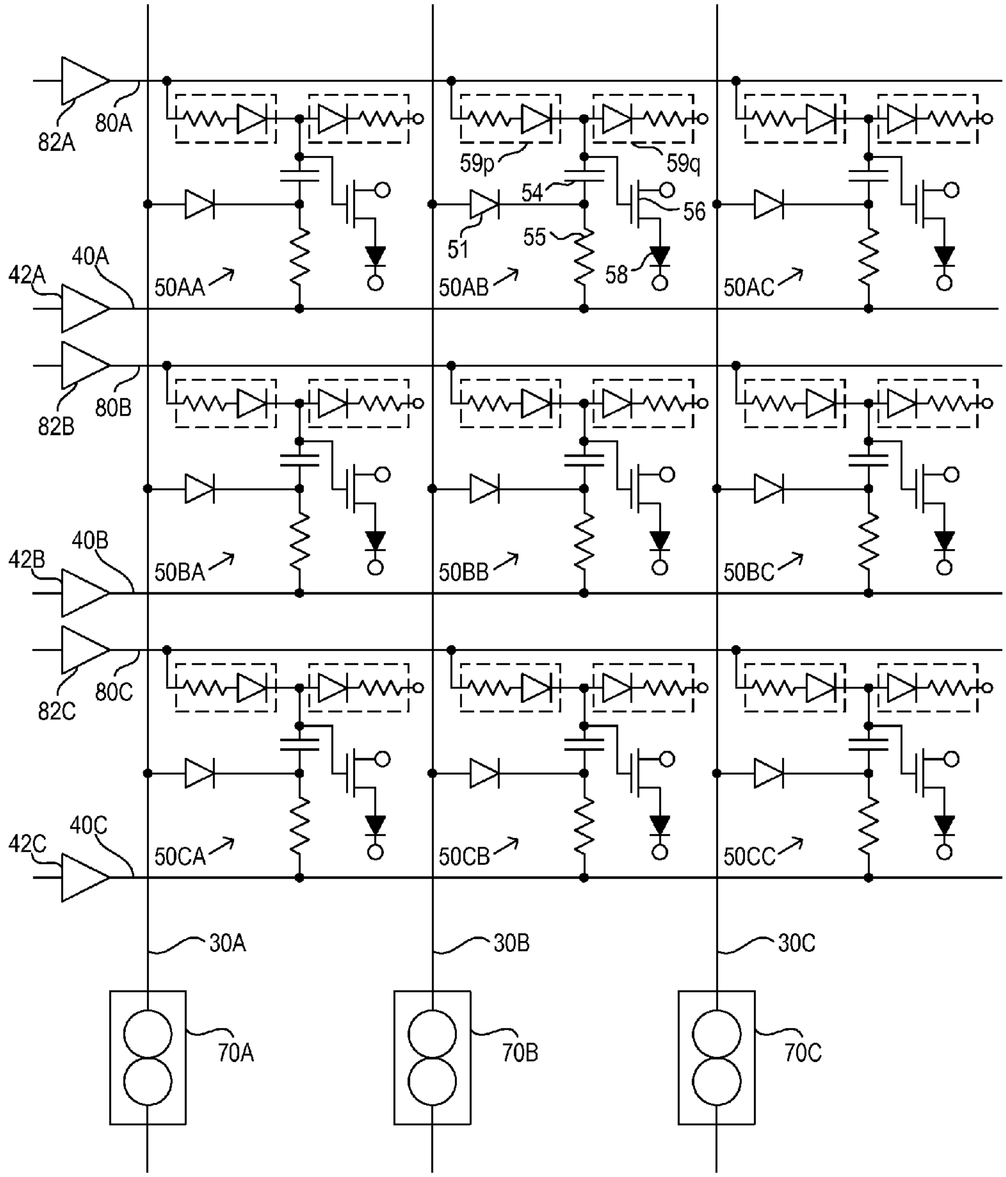
Figure 14A:
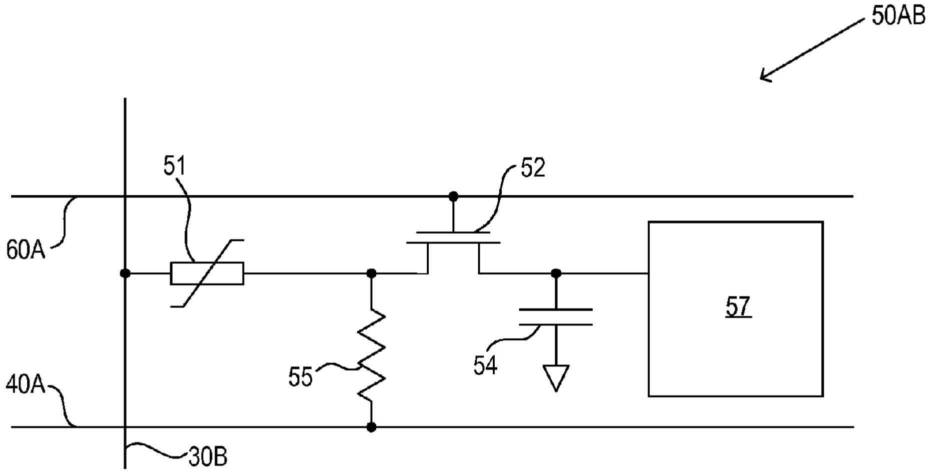
FIGS. 14A-14Q and FIGS. 15A-15D are some general implementations of the pixel elements that include one or more nonlinear elements.
Figure 14B:
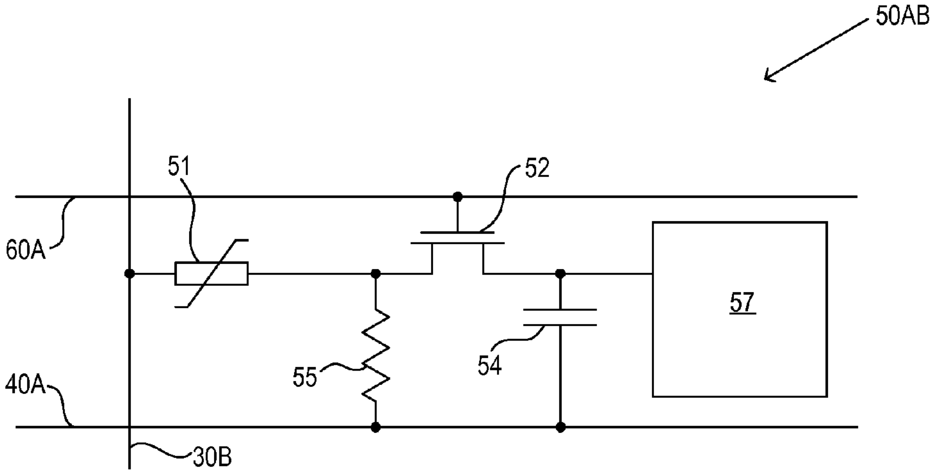
Figure 14C:
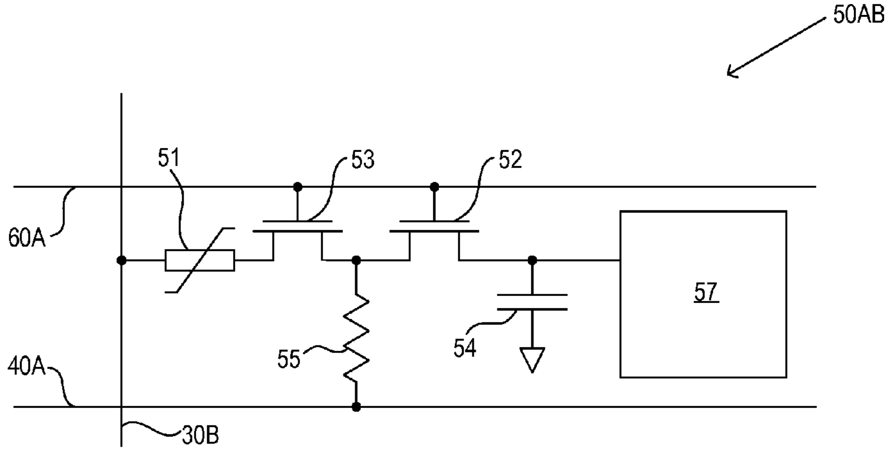
Figure 14D:
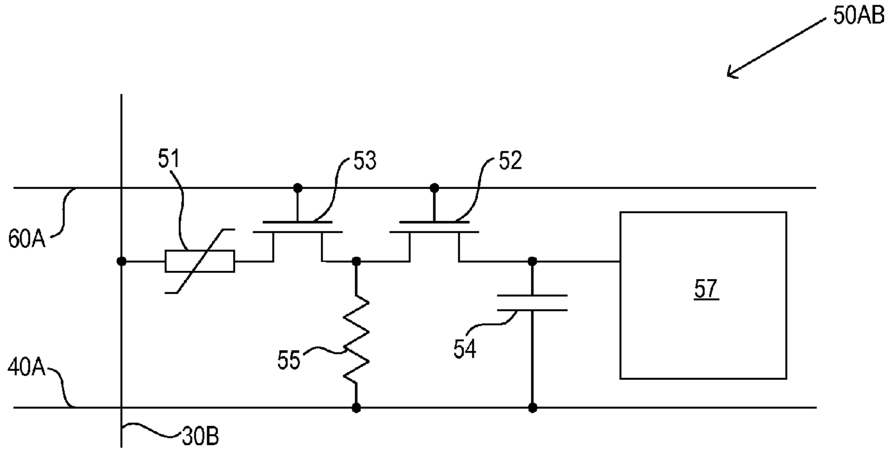
Figure 14E:
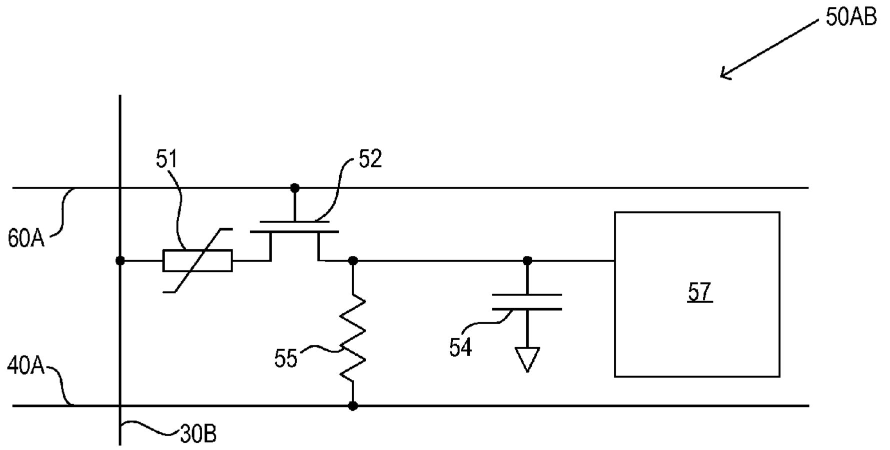
Figure 14F:
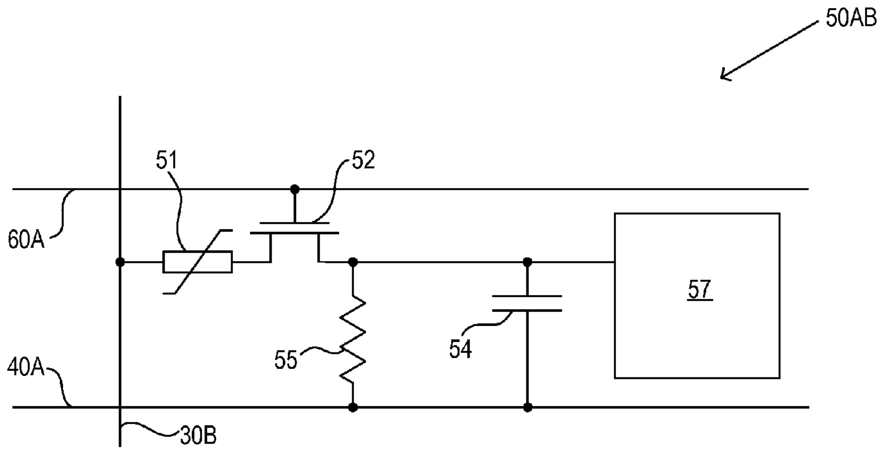
Figure 14G:
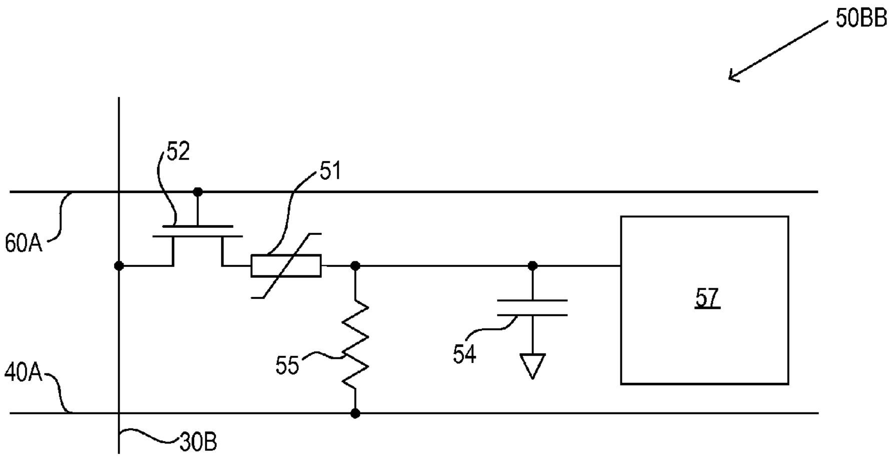
Figure 14H:
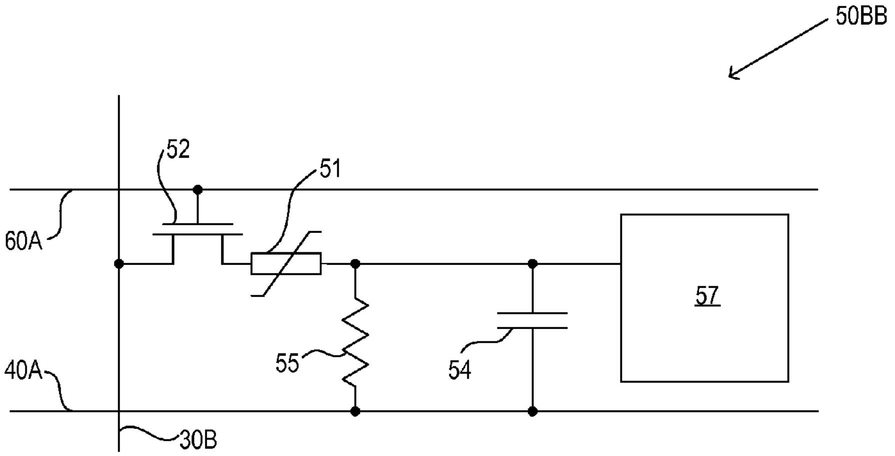
Figure 14I:
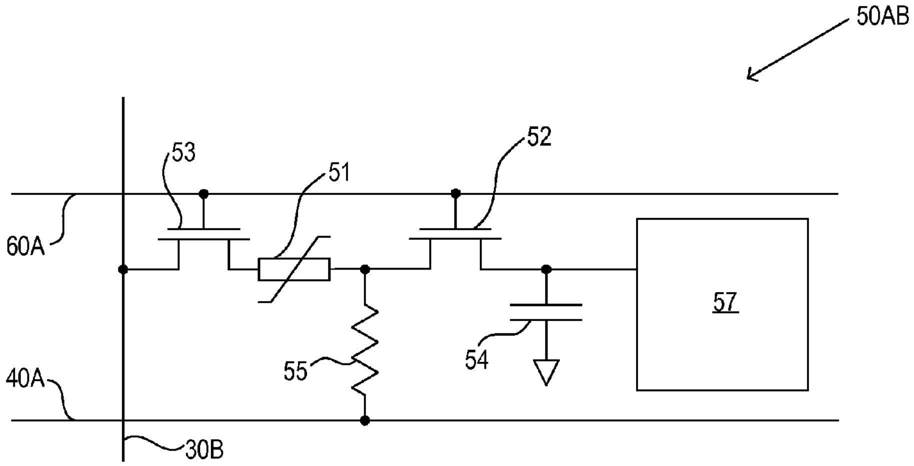
Figure 14J:
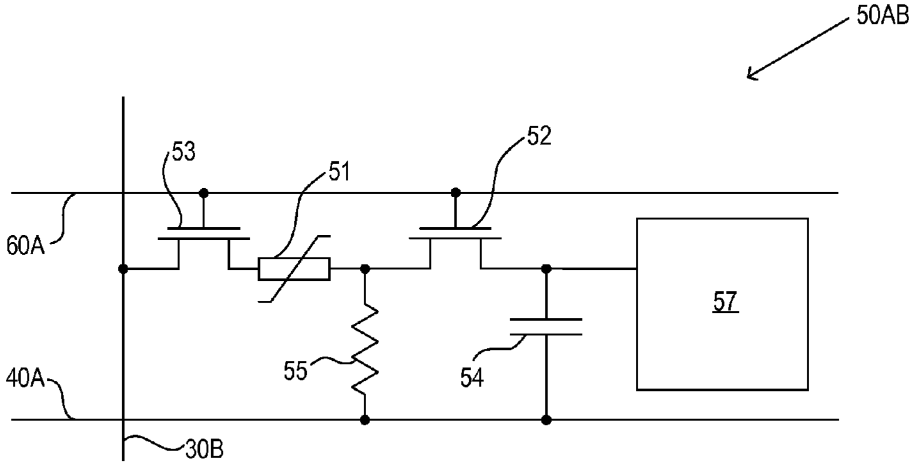
Figure 14K:
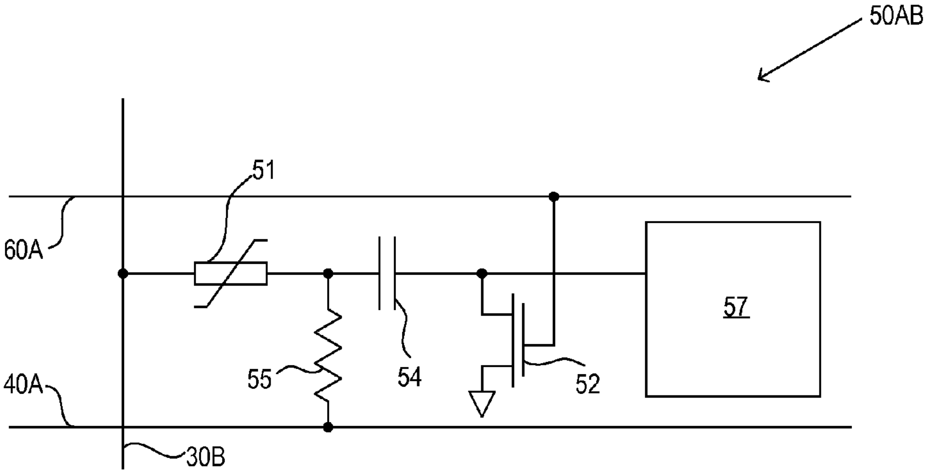
Figure 14L:
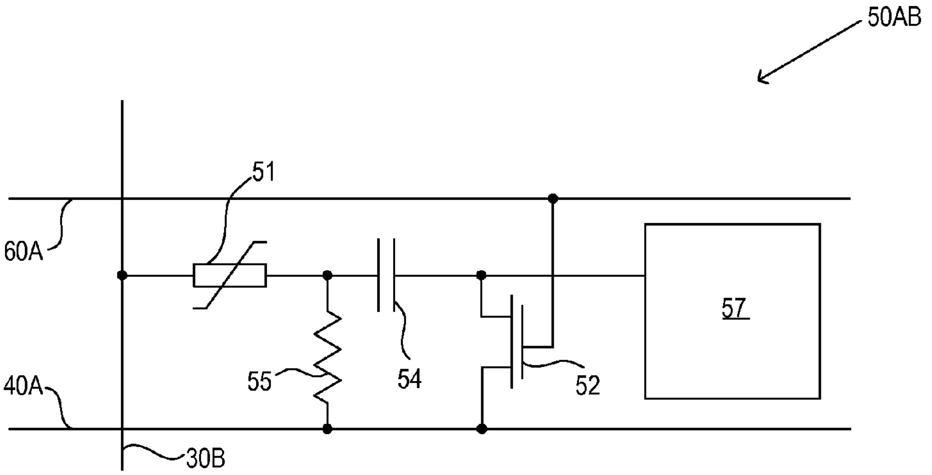
Figure 14M:
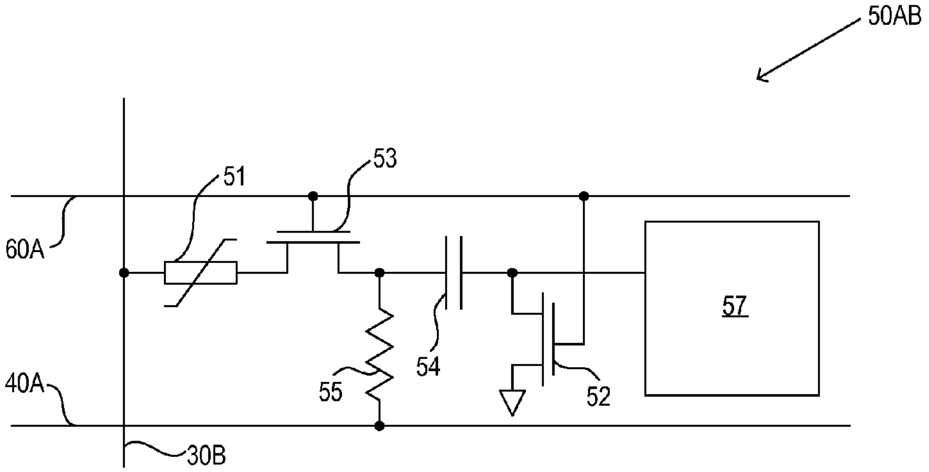
Figure 14N:
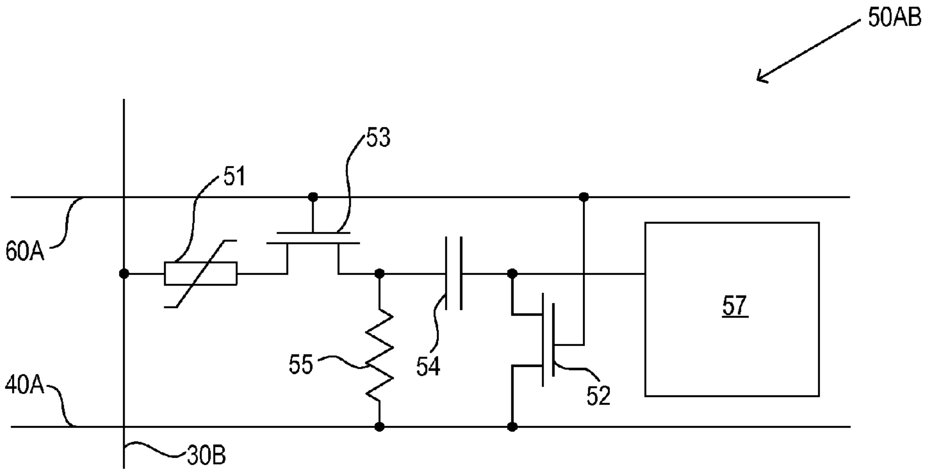
Figure 14O:
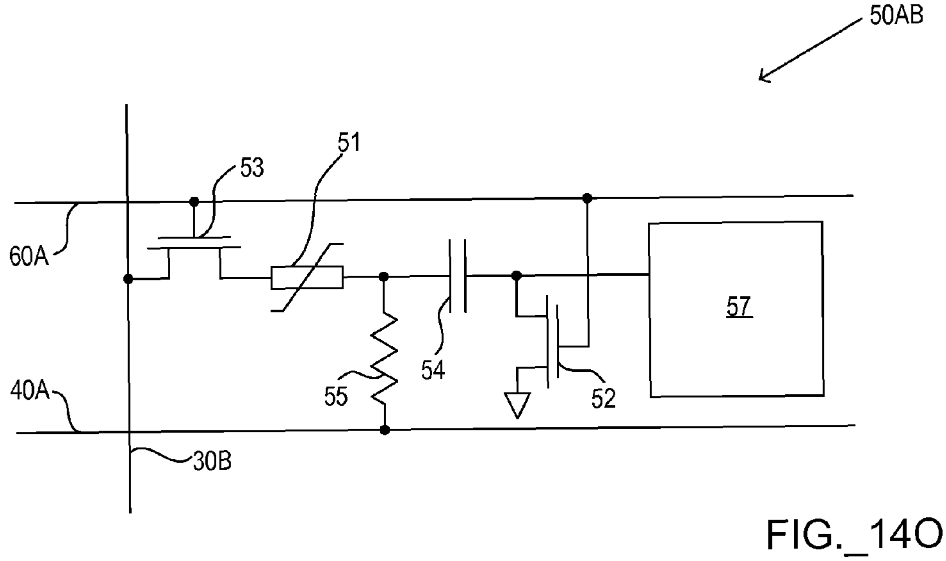
Figure 14P:
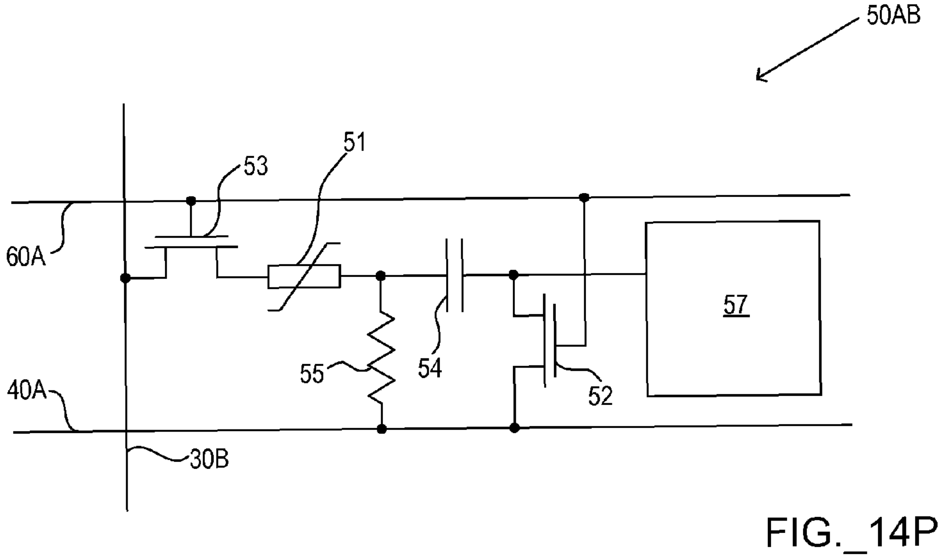
Figure 14Q:
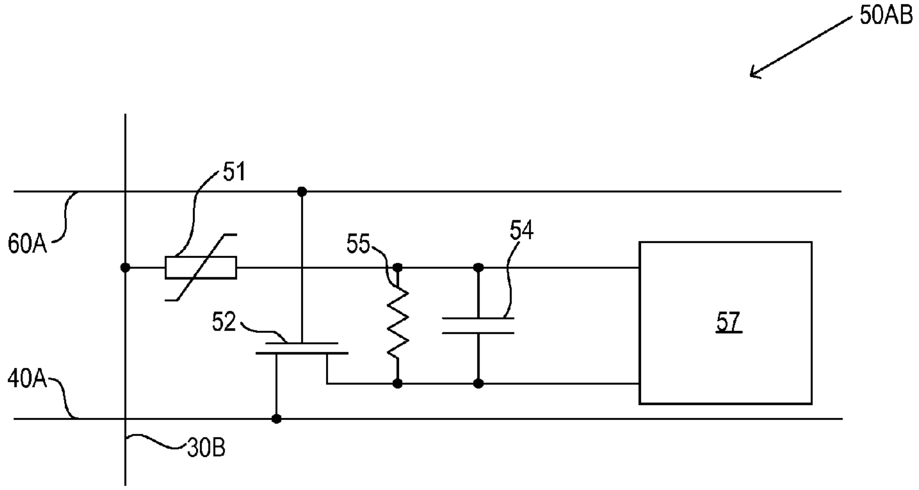
Figure 15A:
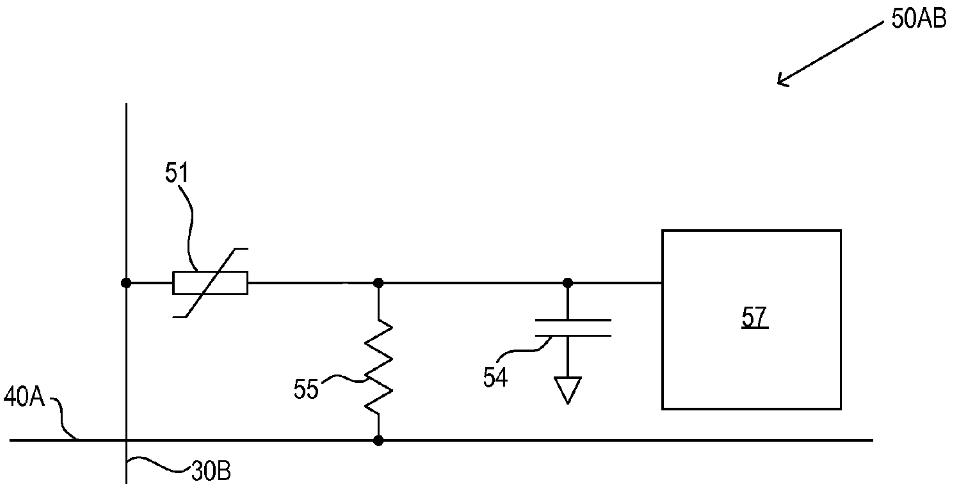
Figure 15B:
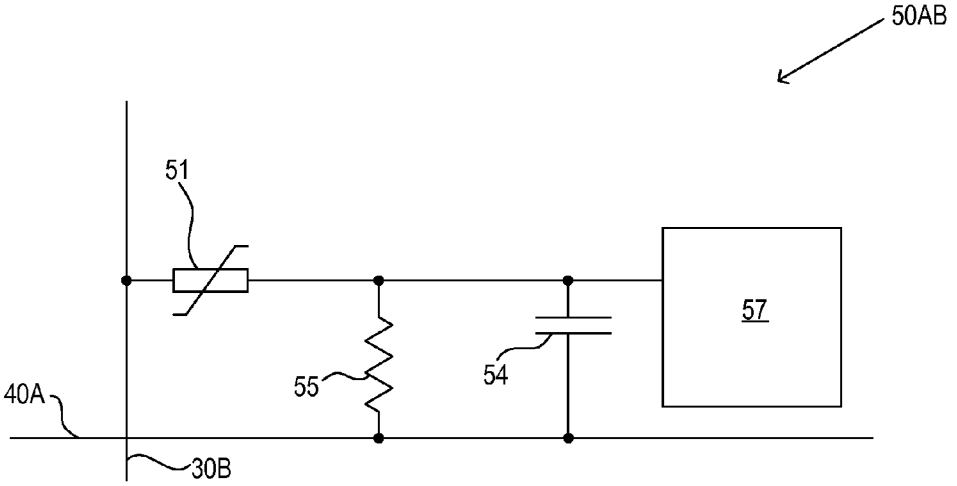
Figure 15C:
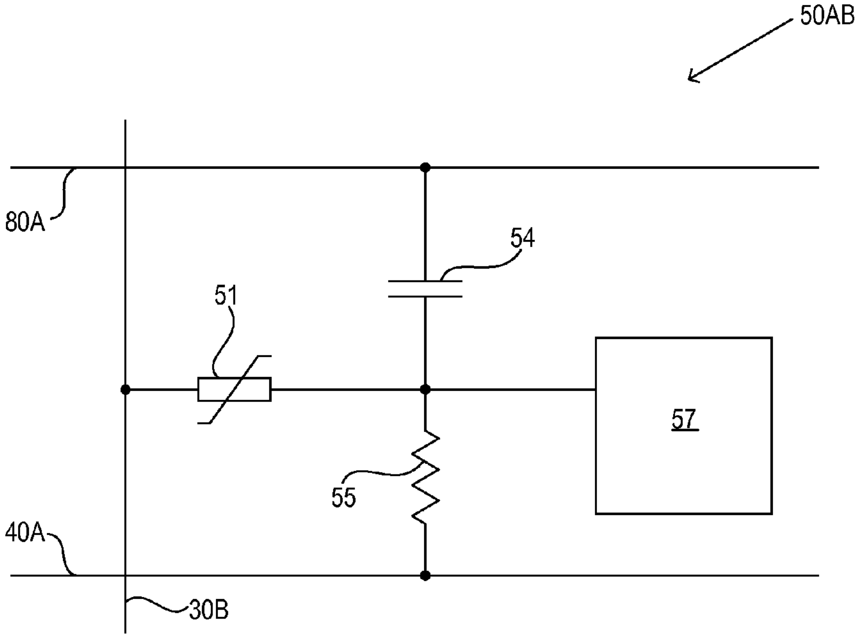
Figure 15D:
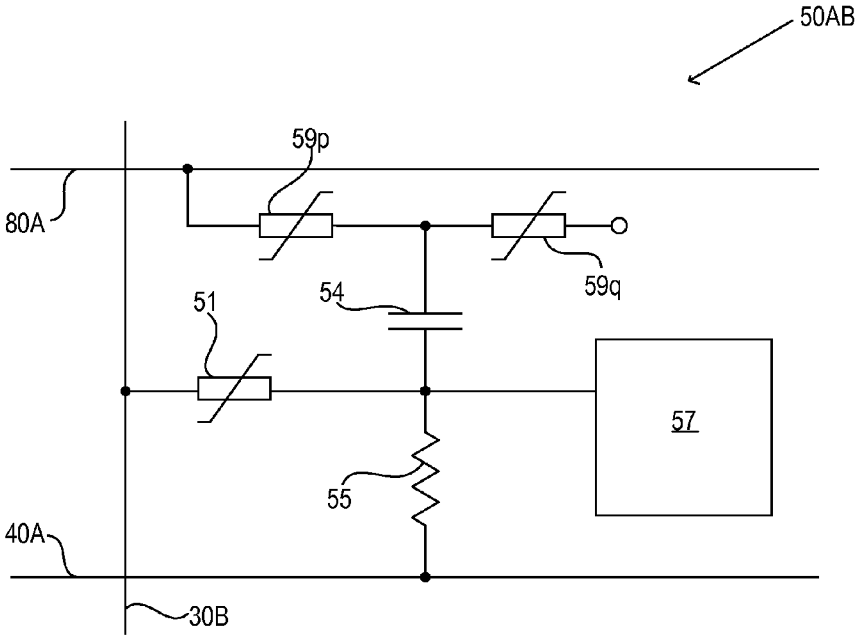

FIGS. 13A-13B are additional implementations of active matrix displays that have nonlinear elements in pixel elements and data drivers to provide predetermined currents to column conducting lines. In FIGS. 13A-13B, the active matrix display includes an array of supplementary row conducting lines (e.g., 80A, 80B, and 80C) crossing the array of column conducting lines (e.g., 30A, 30B, and 30C). The second terminal of the capacitive element 54 in a pixel element (e.g., 50AB) is electrically connected to a mid-terminal of a nonlinear element complex that includes a first nonlinear element 59*p* and a second nonlinear element 59*q*. The first nonlinear 59*p* element has a first terminal electrically connected to a supplementary row conducting line (e.g., 80A). The first nonlinear element 59*p* has a second terminal serving as the mid-terminal of the nonlinear element complex. The second nonlinear element 59$q$ element has a first terminal electrically connected to the second terminal of the first nonlinear element 59$p$. The second nonlinear element 59$q$ element has a second terminal electrically connected to a common voltage. In other implementations, the second nonlinear element 59$q$ element can have a second terminal electrically connected to an additional supplementary row conducting line. In one implementation, the first nonlinear element 59$p$ and the second nonlinear element 59$q$ each include a PN diode serially connected with a resistor. In another implementation, the first nonlinear element 59$p$ and the second nonlinear element 59$q$ can be MIM diodes or other kinds of diodes.

In operation, for charging the pixel element 50AB, the nonlinear element 51 in the pixel element 50AB is drive into a conducting state. Both the first nonlinear element 59$p$ and the second nonlinear element 59$q$ of the nonlinear element complex in the pixel element 50AB are also drive into a conducting state. For charging the pixel element 50AB, if a predetermined current $I_d$(AB) passes through both the nonlinear element 51 and the resistive element 55 and if a selection voltage $V_{on}$ is applied to the first terminal of the resistive element 55, then, the voltage at the second terminal of the resistive element 55 can become $V_{on}+R_0I_d$(AB). If the voltage at the mid-terminal of the nonlinear element complex is $V_{mid}$, then, the capacitive element 54 can be changed to a voltage of the value $V_{on}+R_0I_d(AB)-V_{mid}$. After the capacitive element 54 is charged to a target value, the nonlinear element 51 is driven into a non-conducting state; both the first nonlinear element 59$p$ and the second nonlinear element 59$q$ of the nonlinear element complex are also driven into non-conducting states. After the pixel element 50AB is changed to a non-selected pixel element, the voltage across the capacitive element 54 in the pixel element 50AB can be essentially maintained if leakage currents through the first nonlinear element 59$p$ and the second nonlinear element 59$q$ in the pixel element 50AB can be neglected.

FIGS. 14A-14Q and FIGS. 15A-15D are some general implementations of the pixel elements that include one or more nonlinear elements. In FIGS. 14A-14Q and FIGS. 15A-15D, a pixel element 50AB includes a resistive element 55, a nonlinear element 51, and a capacitive element 54. The capacitive element 54 has a first terminal and a second terminal. The nonlinear element 51 has a first terminal electrically connected to a column conducting line 30B and has a second terminal electrically connected to the first terminal of the capacitive element 54. The resistive element 55 has a first terminal electrically connected to a row conducting line 40A and has a second terminal electrically connected to the first terminal of the capacitive element 54. In some implementations, the pixel element 50AB also includes a switching transistor 52. In some implementations, the pixel element 50AB also includes a secondary switching transistor 53. In some implementations, the pixel element 50AB also includes additional nonlinear elements 59$p$ and 59$q$.

Figure 16A:
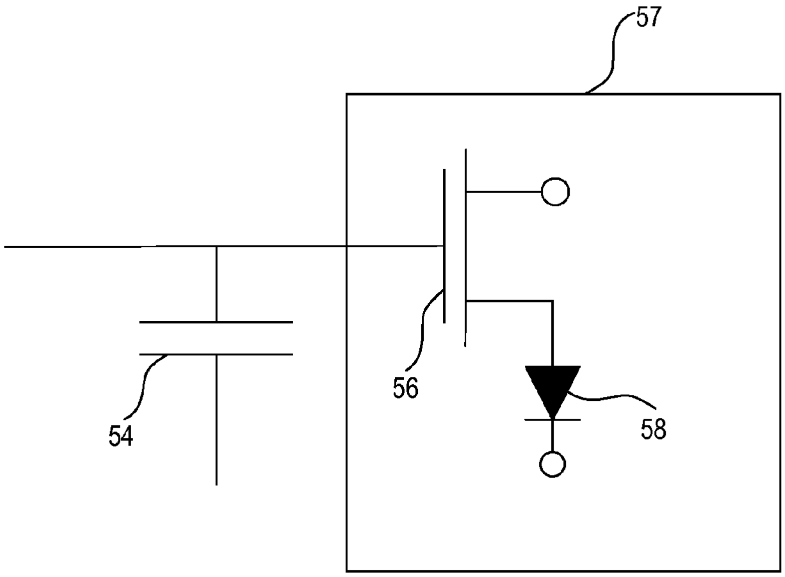
FIGS. 16A-16B are implementations of the pixel-sub-circuit that includes a driving transistor and a light emitting diode.
Figure 16B:
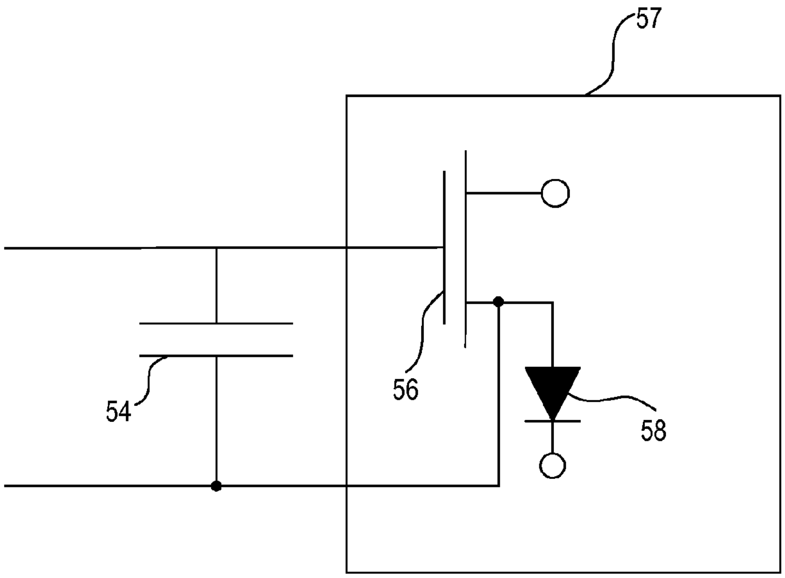

In FIGS. 14A-14Q and FIGS. 15A-15D, the pixel element 50AB also includes a pixel-sub-circuit 57 that is electrically connected to the capacitive element 54. In some implementations, the pixel-sub-circuit 57 is electrically connected to the first terminal of the capacitive element 54. In some implementations, the pixel-sub-circuit 57 is electrically connected to the second terminal of the capacitive element 54. In some implementations, both the first terminal and the second terminal of the capacitive element 54 are electrically connected to the pixel-sub-circuit 57. In some implementations, as shown in FIGS. 16A-16B, the pixel-sub-circuit 57 can include a driving transistor 56 and a light emitting diode 58. In other implementations, the pixel-sub-circuit 57 can include other and additional electronic components.

In the implementations of active matrix displays as described previously, an active matrix display that has nonlinear elements in pixel elements generally can be driven by data drivers configured to supply predetermined currents to column conducting lines. In one implementation, a data driver can include a current source having certain compliance voltage. The current source can supply a constant current to a column conducting line when the voltage on that column conducting line is less than the compliance voltage. In another implementation, for supplying a predetermined current to a column conducting, a voltage can be applied to the column conducting line through a high impedance element. The value of the predetermined current can be changed either by changing the value of the voltage applied to the column conducting line or by changing the value of the high impedance element.

Figure 17A:
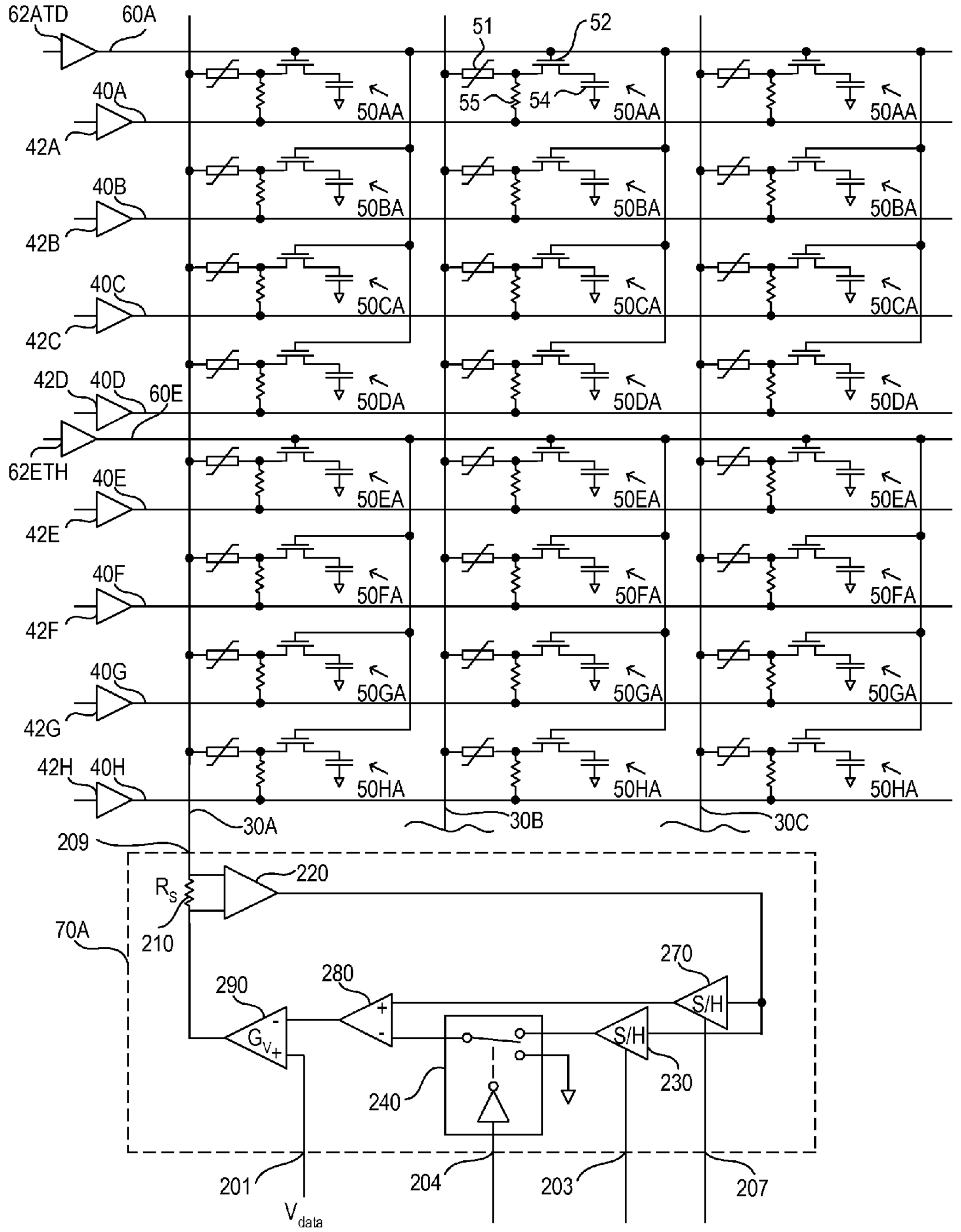
FIGS. 17A-17B illustrate an implementation of the data driver that can supply a predetermined current to a column conducting line in an active matrix display having nonlinear elements in pixel elements.
Figure 17B:
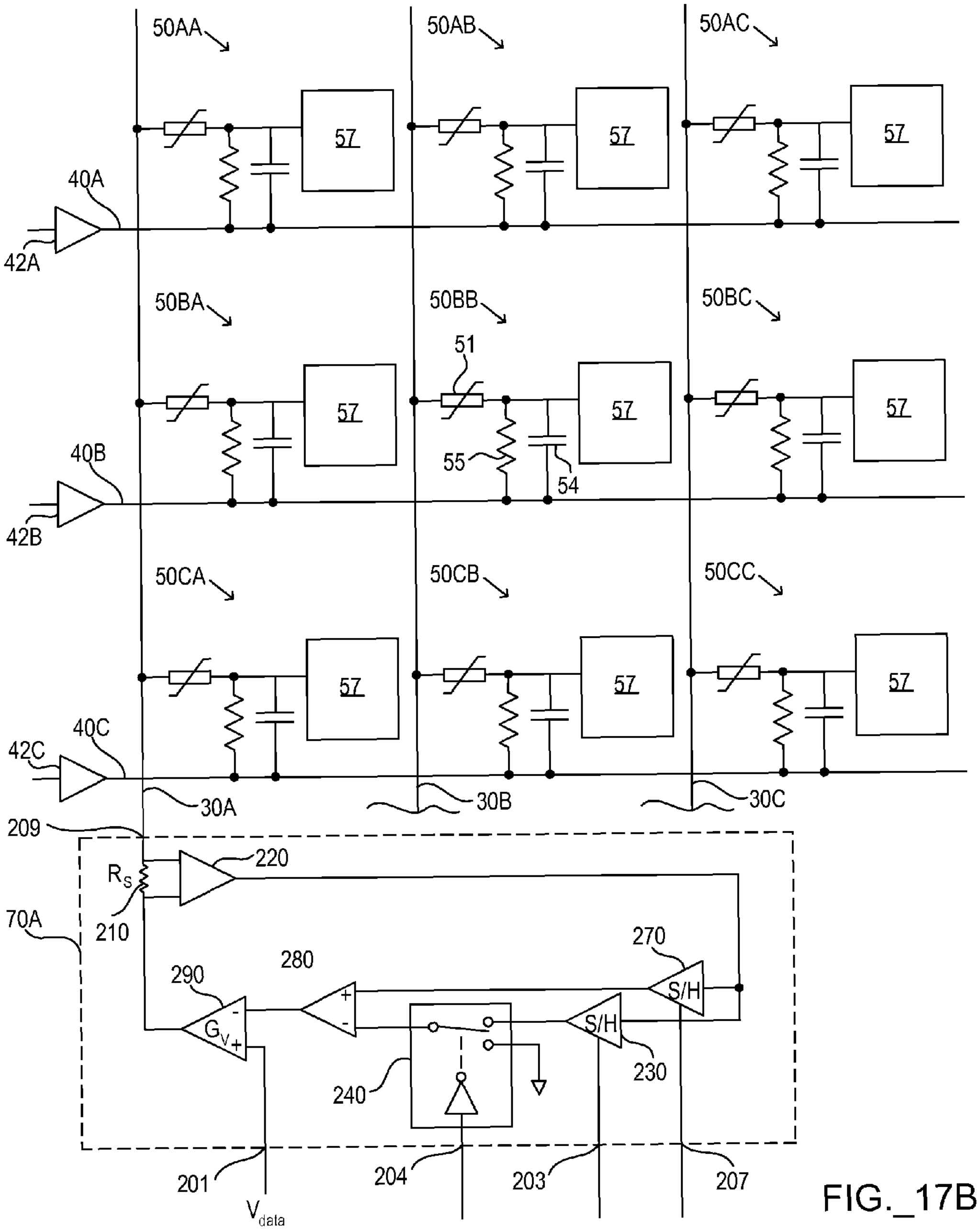

FIGS. 17A-17B illustrate an implementation of the data driver that can supply a predetermined current to a column conducting line in an active matrix display having nonlinear elements in pixel elements. In FIGS. 17A-17B, the data driver 70A is electrically connected a column conducting line 30A. The column conducting line 30A is electrically connected to a column of pixel elements (e.g., 50AA, 50BA, 50CA, . . . ). The data driver 70A can supply a predetermined current to the column conducting line 30A while making some corrections about the leakage currents due to the nonlinear elements in those non-selected pixel elements.

The data driver 70A includes a current sensing resistor 210, an instrumentation amplifier 220, a first sample-and-hold circuit 230, a switch circuit 240, a second sample-and-hold circuit 270, a first differential amplifier 280, and a second differential amplifier 290. The current sensing resistor 210 has a resistive value Rs. The data driver 70A also includes a data input 201, a data output 209, a switch control input 204, a first circuit-mode input 203 for setting the first sample-and-hold circuit 230 into either the sample mode or the hold mode, and a second circuit-mode input 207 for setting the second sample-and-hold circuit 270 into either the sample mode or the hold mode.

In operation, during a first time period $T_S$, the second sample-and-hold circuit 270 is set to the sampling mode. A signal is applied to the switch control input 204 to enable the switch circuit 240 to connect the inverting input of the first differential amplifier 280 to a zero voltage. During the first time period $T_S$, the current sensing resistor 210, the instrumentation amplifier 220, the second sample-and-hold circuit 270, the first differential amplifier 280, and the second differential amplifier 290 can complete a negative feedback loop. When a data voltage V(AA) is applied to the data input 201 of the data driver 70A after the pixel element 50AA is selected as the selected element, a predetermined current of the value $I_d(AA)=V(AA)/RsGv$ is applied to the column conducting line 30A. Here, Gv is the voltage gain of the second differential amplifier 290. This predetermined current may not completely pass through the nonlinear element 51 in the selected pixel element 50AA if there are significant amount of leakage currents by the nonlinear elements in the non-selected pixel elements (e.g., 50BA, 50CA, . . . ).

To measure the total amount of the leakage currents, during a second time period $T_M$, the first sample-and-hold circuit 230 is set to the sampling mode while the second sample-and-hold circuit 270 is set to the holding mode. During the second time period $T_M$, the output voltage of the second differential amplifier 290 is essentially held at a constant voltage. At the end of the second time period $T_M$, when the pixel element 50AA is also changed to a non-selected pixel element along with the other non-selected pixel elements (e.g., 50BA, 50CA, . . . ), the total leakage current $I_{leak}$ by the nonlinear elements in all non-selected pixel elements can be measured by measuring a voltage across the current sensing resistor 210. After this measurement, if the first sample-and-hold circuit 230 is changed to the holding mode, the measured total leakage current $I_{leak}$ can be essentially memorized by a voltage held in the first sample-and-hold circuit 230.

During a third time period $T_C$, the pixel element 50AA is selected as the selected element, the first sample-and-hold circuit 230 is set to the holding mode while the second sample-and-hold circuit 270 is set to the sampling mode, and a signal is applied to the switch control input 204 to enable the switch circuit 240 to connect the inverting input of the first differential amplifier 280 to the output of the first sample-and-hold circuit. During the third time period $T_C$, the current sensing resistor 210, the instrumentation amplifier 220, the second sample-and-hold circuit 270, the first differential amplifier 280, and the second differential amplifier 290 can complete a negative feedback loop. When the second differential amplifier 290 receives a data voltage V(AA), a predetermined current of the value $I_d(AA)=V(AA)/RsGv+I_{leak}$ is applied to the column conducting line 30A. If the total amount of leakage currents by the nonlinear elements in the non-selected pixel elements (e.g., 50BA, 50CA, . . . ) is almost equal to $I_{leak}$ (which includes additional leakage current if the pixel element 50AA is also a non-selected pixel element), then, the current passing through the nonlinear element 51 in the selected pixel element 50AA is almost equal to V(AA)/RsGv. Consequently, the voltage applied to the first terminal of the capacitive element 54 is almost equal to $R_0V(AA)/RsGv+V_{on}$. Here, $V_{on}$ is the voltage at the first terminal of the resistive element 55.

For those implementations of active matrix displays in which the second terminal of the capacitive element 54 is connected to the first terminal of the resistive element 55, the voltage applied across the capacitive element 54 in a selected pixel element (e.g., 50AA) can be almost equal to $R_0V(AA)/RsGv$. Thus, the voltage applied across the capacitive element 54 can be almost entirely determined by a data voltage (e.g., the input voltage V(AA) applied to the data driver 70A) and a few circuit parameters (e.g., $R_0$, Rs, and Gv).

The data driver 70A in FIGS. 17A-17B is just one sample implementation of the data driver that can apply a predetermined current to a column conducting line while making some corrections about the leakage currents due to the non-selected pixel elements. Many other implementations are possible.

For those implementations of active matrix displays in which the second terminal of the capacitive element 54 is not connected to the first terminal of the resistive element 55, and the voltage applied on the first terminal of the resistive element 55 also depends on some voltage drops on a row conducting line, it may still possible to correct the voltage drops. For example, in a simple model in which the resistance of the row conducting line between two adjacent pixel elements is uniformly ΔR, the voltage on the second terminal of the resistive element 55 in the pixel elements 50AA, 50AB, and 50AC is respectively given by the following equations:

$$V_{AA}=V_{on}+R_0I_d(AA)+\Delta R[Id(AA)+Id(AB)+Id(AC)];$$

$$V_{AB}=V_{on}+R_0I_d(AB)+\Delta R[Id(AA)+2Id(AB)+2Id(AC)];$$

and $$V_{AC}=V_{on}+R_0I_d(AC)+\Delta R[Id(AA)+2Id(AB)+3Id(AC)].$$

Here, the current Id(AA), Id(AB), and Id(AC) is respectively the current passing through the resistive element 55 in the pixel elements 50AA, 50AB, and 50AC. By solving above linear equations, the required current Id(AA), Id(AB), and Id(AC) for creating the desired target voltage values can be calculated.

Figure 18:
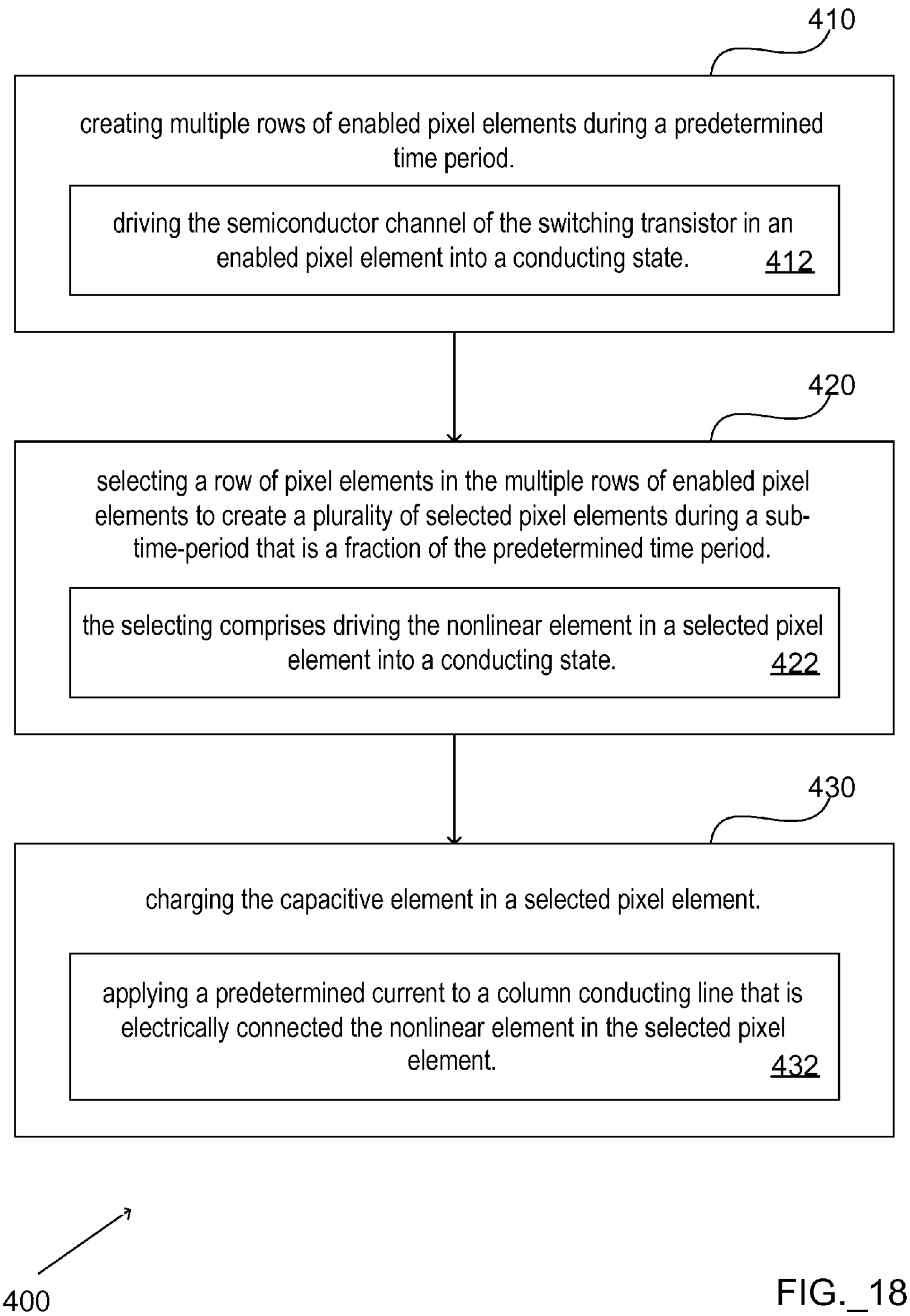
FIG. 18 shows an example method of driving an active matrix display that includes enabling lines and nonlinear elements in pixel elements.

FIG. 18 shows an example method 400 of driving an active matrix display that includes enabling lines and nonlinear elements in pixel elements. The method 400 includes blocks 410, 420, and 430.

The block 410 includes creating multiple rows of enabled pixel elements during a predetermined time period. The block 410 further includes a block 412 which includes driving the semiconductor channel of the switching transistor in an enabled pixel element into a conducting state.

As examples, when the block 410 is applied to the active matrix display as shown FIGS. 2A-2D, a group of multiple rows of pixel elements 50AA-50AC, 50BA-50BC, 50CA-50CC, and 50DA-50DC can be enabled as the enabled pixel elements during a predetermined time period T1. The semiconductor channel of the switching transistor 52 in each of these enabled pixel elements can be driven into a conducting state by an enabling signal applied to the gate of the switching transistor 52. In one implementation, the enabling signal is provided by the enabling driver 62ATD.

The block 420 includes selecting a row of pixel elements in the multiple rows of enabled pixel elements to create a plurality of selected pixel elements during a sub-time-period that is a fraction of the predetermined time period. The block 420 further includes a block 422 which includes driving the nonlinear element in a selected pixel element into a conducting state.

As examples, when the block 420 is applied to the active matrix display as shown FIGS. 2A-2D, if the enabled pixel elements include pixel elements 50AA-50AC, 50BA-50BC, 50CA-50CC, and 50DA-50DC during the predetermined time period T1, the block 420 can include selecting a row of pixel elements 50AA-50AC as the selected pixel elements during a sub-time-period T1(1). In one implementation, this sub-time-period T1(1) can be about one fourth of the predetermined time period T1, and the nonlinear element 51 in each of these selected pixel element is driven into a conducting state. In one implementation, a selection voltage is applied to the row conducting line 40A to drive the nonlinear element 51 in each of the pixel elements 50AA-50AC into a conducting state.

The block 430 includes charging the capacitive element in a selected pixel element. In one implementation, the block 430 includes a block 432 which includes applying a predetermined current to a column conducting line that is electrically connected the nonlinear element in the selected pixel element. In other implementations, the block 430 can includes a block 432 which includes applying a predetermined voltage to a column conducting line.

As examples, when the block 430 is applied to the active matrix display as shown FIGS. 2A-2D, if the selected pixel elements include the pixel elements 50AA, 50AB, and 50AC, the block 430 can include charging the capacitive element 54 in the selected pixel element 50AA, the selected pixel element 50AB, or the selected pixel element 50AC. In one implementation, predetermined currents $I_d(AA)$, $I_d(AB)$, and $I_d(AD)$ can be respectively applied to the column conducting lines 30A, 30B, and 30C for charging respectively the capacitive element 54 in the pixel elements 50AA, 50AB, and 50AC. In other implementations, predetermined voltages can be respectively applied to the column conducting lines 30A, 30B, and 30C for charging respectively the capacitive element 54 in the pixel elements 50AA, 50AB, and 50AC.

Figure 19:
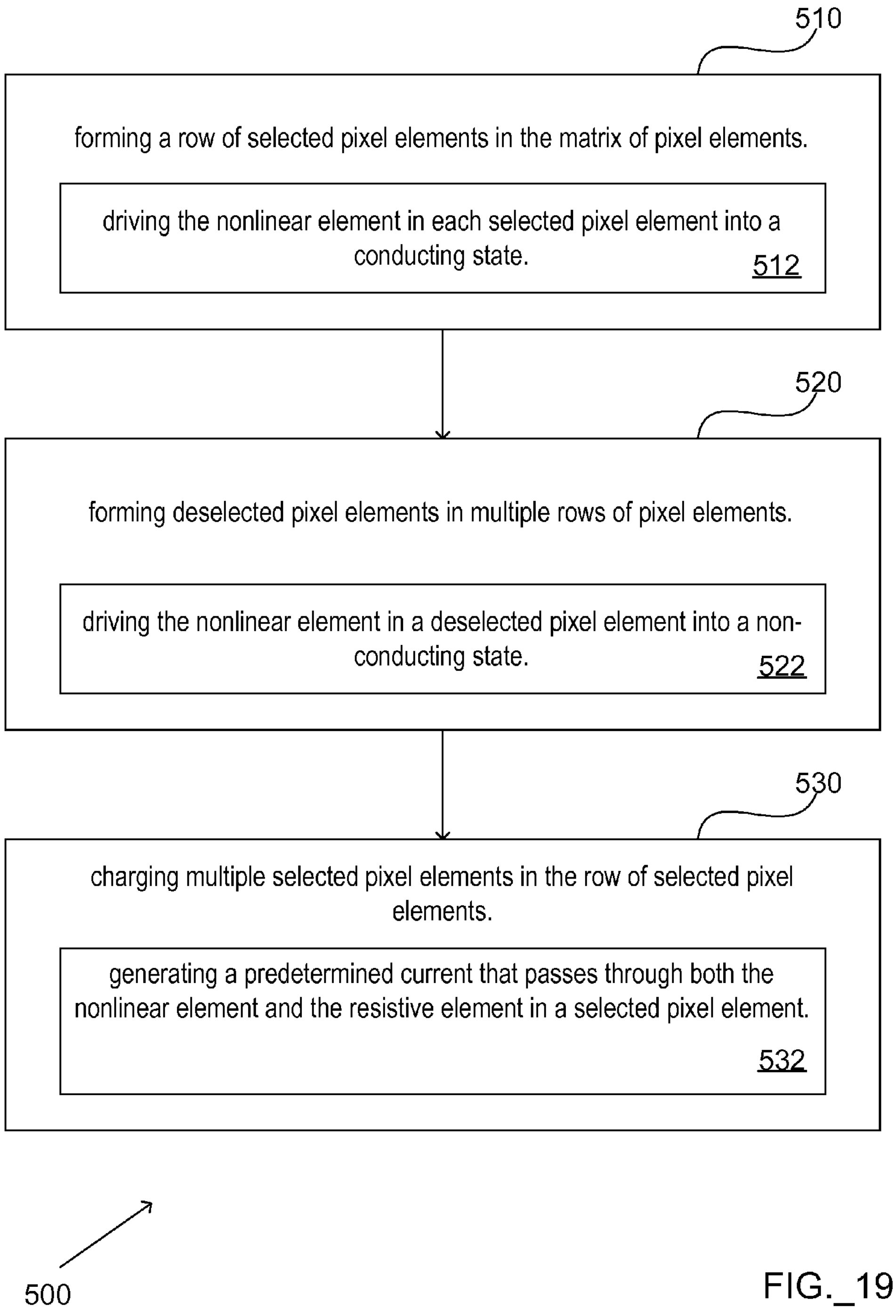
FIG. 19 shows an example method of driving an active matrix display that includes nonlinear elements in pixel elements.

FIG. 19 shows an example method 500 of driving an active matrix display that includes nonlinear elements in pixel elements. The method 500 includes blocks 510, 520, and 530.

The block 510 includes forming a row of selected pixel elements in the matrix of pixel elements. The block 510 further includes a block 512 which includes driving the nonlinear element in each selected pixel element into a conducting state.

As examples, when the block 510 is applied to the active matrix display as shown FIGS. 2A-2D and FIGS. 10A-10B, a row of pixel elements 50AA-50AC can be selected as the selected pixel elements. The nonlinear element 51 in each of these selected pixel element is driven into a conducting state. In one implementation, a selection voltage is applied to the row conducting line 40A to drive the nonlinear element 51 in each of the selected pixel elements 50AA-50AC into a conducting state.

The block 520 includes forming non-selected pixel elements in multiple rows of pixel elements. The block 520 further includes a block 522 which includes driving the nonlinear element in a non-selected pixel element into a non-conducting state.

As examples, when the block 520 is applied to the active matrix display as shown FIGS. 2A-2D and, the non-selected pixel elements can include the pixel elements 50BA-50LA, 50BB-50LB, and 50BC-50LC. In one implementation, deselect voltages are applied to the row conducting lines 40B-40L to drive the nonlinear element 51 in the pixel elements 50BA-50LA, 50BB-50LB, and 50BC-50LC into a non-conducting state.

As examples, when the block 520 is applied to the active matrix display as shown FIGS. 5A-5B and FIGS. 6A-6B, when the enabled pixel elements include the pixel elements 50AA-50AC, 50BA-50BC, 50CA-50CC, and 50DA-50DC, the non-selected pixel elements can include pixel elements 50BA-50BC, 50CA-50CC, and 50DA-50DC. In one implementation, deselect voltages are applied to the row conducting lines 40B-40D to drive the nonlinear element 51 in pixel elements 50BA-50BC, 50CA-50CC, and 50DA-50DC into a non-conducting state.

As examples, when the block 520 is applied to the active matrix display as shown FIGS. 10A-10B, the non-selected pixel elements can include pixel elements 50BA-50BC and 50CA-50CC. In one implementation, deselect voltages are applied to the row conducting lines 40B and 40C to drive the nonlinear element 51 in pixel elements 50BA-50BC and 50CA-50CC into a non-conducting state.

The block 530 includes charging multiple selected pixel elements in the row of selected pixel elements. The block 530 further includes a block 532 which includes generating a predetermined current that passes through both the nonlinear element and the resistive element in a selected pixel element.

As examples, when the block 530 is applied to the active matrix display as shown FIGS. 2A-2D and FIGS. 10A-10B, if the selected pixel elements include the pixel elements 50AA, 50AB, and 50AC, the block 530 can include charging the capacitive element 54 in the selected pixel elements 50AA, 50AB, and 50AC. In one implementation, predetermined currents $I_d$(AA), $I_d$(AB), and $I_d$(AD) can be respectively applied to the column conducting lines 30A, 30B, and 30C for charging respectively the capacitive element 54 in the pixel elements 50AA, 50AB, and 50AC.

The present invention has been described in terms of a number of implementations. The invention, however, is not limited to the implementations depicted and described. Rather, the scope of the invention is defined by the appended claims. A matrix of pixel elements as claimed can include all pixel elements or only a portion of all pixel elements in an active matrix display. When an element A is electrically connected to an element B, generally, the element A can be physically connected to the element B directly, or the element A can be physically connected to the element B through one or more intermediate elements. Any element in a claim that does not explicitly state "means for" performing a specific function, or "step for" performing a specific function, is not to be interpreted as a "means" or "step" clause as specified in 35 U.S.C. §112, ¶6.

What is claimed is:

1. An active matrix display comprising:

an array of column conducting lines;

an array of row conducting lines crossing the array of column conducting lines;

an array of enabling lines crossing the array of column conducting lines;

a matrix of pixel elements, wherein a pixel element is connected to at least a row conducting line, at least a column conducting line, and at least an enabling line, and wherein the pixel element comprises, a resistive element having a first terminal and a second terminal, a capacitive element having a first terminal and a second terminal, a nonlinear element having a first terminal and a second terminal, the nonlinear element being functionally a nonlinear diode, and a switching transistor having a gate and a semiconductor channel; within the pixel element, the nonlinear element and the resistive element are electrically connected in serial between the column conducting line and the row conducting line, the gate of switching transistor is configured to receive an electric signal from the enabling line, the nonlinear element is electrically connected between the column conducting line and the second terminal of the resistive element, the resistive element is electrically connected between the row conducting line and the second terminal of the nonlinear element; and wherein the nonlinear element, the semiconductor channel of the switching transistor, and the capacitive element are all electrically connected in serial between the column conducting line and a voltage contact to allow the capacitive element be charged by the column conducting line only if both the nonlinear element and the semiconductor channel of the switching transistor are in conducting state.

2. The active matrix display of claim 1, and within the pixel element:

the semiconductor channel of the switching transistor is electrically connected between the column conducting line and the first terminal of the nonlinear element.

3. The active matrix display of claim 1, and within the pixel element:

the semiconductor channel of the switching transistor is electrically connected between the second terminal of the nonlinear element and the second terminal of the resistive element.

4. The active matrix display of claim 1, and within the pixel element:

the semiconductor channel of the switching transistor is electrically connected between the second terminal of the resistive element and first terminal of the capacitive element.

5. The active matrix display of claim 4, wherein a pixel element further comprises a secondary switching, and within the pixel element:

the secondary switching transistor has a gate electrically connected to an enabling line and has a semiconductor channel electrically connected between the second terminal of the nonlinear element and the second terminal of the resistive element.

6. The active matrix display of claim 4, wherein a pixel element further comprises a secondary switching, and within the pixel element:

the secondary switching transistor has a gate electrically connected to an enabling line and has a semiconductor channel electrically connected between the column conducting line and the first terminal of the nonlinear element.

7. The active matrix display of claim 1, wherein a pixel element further comprises a pixel-sub-circuit and within the pixel element: the pixel-sub-circuit is electrically connected to the first terminal of the capacitive element.

8. The active matrix display of claim 1, and within the pixel element: the second terminal of the capacitive element in the pixel element is electrically connected to a common voltage.

9. The active matrix display of claim 1, and within the pixel element: the second terminal of the capacitive element in the pixel element is electrically connected to the first terminal of the resistive element.

10. The active matrix display of claim 1, and within the pixel element: the second terminal of the capacitive element in the pixel element is electrically connected to a row conducting line.

11. The active matrix display of claim 1, wherein a pixel element further comprises:

a liquid crystal cell associated with the capacitive element.

12. The active matrix display of claim 1, wherein an enabling line in the array of enabling lines is electrically connected to multiple pixel elements positioned in a plurality of rows.

13. The active matrix display of claim 1, further comprising:

an array of enabling drivers, wherein an enabling driver is operable to apply an enabling signal to an enabling line.

14. The active matrix display of claim 1, further comprising:

an array of enabling drivers, wherein an enabling driver is operable to apply an enabling signal to multiple pixel elements positioned in a plurality of rows.

15. The active matrix display of claim 1, further comprising:

an array of selection drivers, wherein a selection driver is operable to apply a predetermined voltage to a row conducting line.

16. The active matrix display of claim 1, further comprising:

electronic circuitry for applying a predetermined voltage to a row conducting line.

17. The active matrix display of claim 1, further comprising:

an array of data drivers, wherein a data driver is operable to apply a predetermined current to a column conducting line.

18. The active matrix display of claim 1, further comprising:

electronic circuitry for applying a predetermined current to a column conducting line.

19. The active matrix display of claim 1, further comprising:

means for applying a predetermined current to a column conducting line.

20. The active matrix display of claim 1, further comprising:

means for applying a predetermined voltage to a column conducting line.

21. The active matrix display of claim 1, wherein the nonlinear element in the pixel element comprises any one of a metal-insulator-metal diode, a PN diode, a PIN diode, a Schottky diode, and a thin film diode.

22. The active matrix display of claim 1, wherein the nonlinear element, the semiconductor channel of the switching transistor, and the capacitive element are electrically connected in serial between the column conducting line and a common voltage.

23. The active matrix display of claim 1, wherein the nonlinear element, the semiconductor channel of the switching transistor, and the capacitive element are electrically connected in serial between the column conducting line and the first terminal of the resistive element.

24. The active matrix display of claim 1, wherein the nonlinear element, the semiconductor channel of the switching transistor, and the capacitive element are electrically connected in serial between the column conducting line and a row conducting line.

25. A active matrix display comprising:

an array of column conducting lines, wherein a column conducting line is electrically connected to a column of pixel elements;

an array of row conducting lines crossing the array of column conducting lines, wherein a row conducting line is electrically connected to a row of pixel elements; and an array of enabling lines crossing the array of column conducting lines; and a matrix of pixel elements, wherein a pixel element is connected to at least a row conducting line, at least a column conducting line, and at least an enabling line, and wherein the pixel element comprises, a capacitive element, a nonlinear element electrically connected the capacitive element, the nonlinear element substantially preventing a voltage across the capacitive element from being changed by a signal on the column conducting line when the nonlinear element is driven into a non-conducting state by a signal on the row conducting line, a switching transistor having a gate configured to receive an electric signal from the enabling line and having a semiconductor channel electrically connected to the capacitive element, the switching transistor substantially preventing a voltage across the capacitive element from being changed by a signal on the column conducting line when the semiconductor channel of the switching transistor is in a non-conducting state, and wherein the capacitive element, the nonlinear element, and the semiconductor channel of the switching transistor are all electrically connected in serial to allow the capacitive element be charged by the column conducting line only if both the nonlinear element and the semiconductor channel of the switching transistor are in conducting state.

26. The active matrix display of claim 25, wherein:

the nonlinear element in the pixel element is configured to receive a signal from a column conducting line.

27. The active matrix display of claim 25, wherein a pixel element further comprises a resistive element, and within the pixel element:

the resistive element is electrically connected to the nonlinear element and configured to receive a signal from a row conducting line.

28. The active matrix display of claim 25, wherein a pixel element further comprises:

a liquid crystal cell associated with the capacitive element.

29. The active matrix display of claim 25, comprising:

an array of enabling drivers, wherein an enabling driver is operable to apply an enabling signal to an enabling line.

30. The active matrix display of claim 25, further comprising:

an array of enabling drivers, wherein an enabling driver is operable to apply an enabling signal to multiple pixel elements positioned in a plurality of rows.

31. The active matrix display of claim 25, further comprising:

an array of selection drivers, wherein a selection driver is operable to apply a predetermined voltage to a row conducting line.

32. The active matrix display of claim 25, further comprising:

an array of data drivers, wherein a data driver is operable to apply a predetermined current to a column conducting line.

33. The active matrix display of claim 25, further comprising:

means for applying a predetermined current to a column conducting line.

34. The active matrix display of claim 25, further comprising:

means for applying a predetermined voltage to a column conducting line.

35. The active matrix display of claim 25, wherein the nonlinear element in the pixel element comprises any one of a metal-insulator-metal diode, a PN diode, a PIN diode, a Schottky diode, and a thin film diode.

36. The active matrix display of claim 25, wherein the nonlinear element, the semiconductor channel of the switching transistor, and the capacitive element are electrically connected in serial between the column conducting line and a common voltage.

37. The active matrix display of claim 25, wherein the nonlinear element, the semiconductor channel of the switching transistor, and the capacitive element are electrically connected in serial between the column conducting line and the first terminal of the resistive element.

38. The active matrix display of claim 25, wherein the nonlinear element, the semiconductor channel of the switching transistor, and the capacitive element are electrically connected in serial between the column conducting line and a row conducting line.

39. The active matrix display of claim 25, further comprising:

means for applying at least one of an enabling signal and a disabling signal to multiple pixel elements positioned in a plurality of rows.

40. A pixel element in an active matrix display, the active matrix display comprising a matrix of the pixel elements, an array of column conducting lines, an array of row conducting lines crossing the array of column conducting lines, and an array of enabling lines crossing the array of column conducting lines, the pixel element the being directly connected to at least a row conducting line, at least a column conducting line, and at least an enabling line, and the pixel element comprising:

a resistive element having a first terminal and a second terminal, a capacitive element having a first terminal and a second terminal, a nonlinear element having a first terminal and a second terminal, the nonlinear element being functionally a nonlinear diode, and a switching transistor having a gate and a semiconductor channel;

within the pixel element, the nonlinear element and the resistive element are electrically connected in serial between the column conducting line and the row conducting line, the gate of switching transistor is configured to receive an electric signal from the enabling line, the nonlinear element is electrically connected between the column conducting line and the second terminal of the resistive element, the resistive element is electrically connected between the row conducting line the second terminal of the nonlinear element; and wherein the nonlinear element, the semiconductor channel of the switching transistor, and the capacitive element are all electrically connected in serial between the column conducting line and a voltage contact to allow the capacitive element be charged by the column conducting line only if both the nonlinear element and the semiconductor channel of the switching transistor are in conducting state.

41. The pixel element of claim 40, further comprising:

a liquid crystal cell associated with the capacitive element.

42. The pixel element of claim 40, and within the pixel element:

the capacitive element is electrically connected to the nonlinear element through the semiconductor channel of the switching transistor.

43. The pixel element of claim 40, and within the pixel element:

the capacitive element is connected to the semiconductor channel of the switching transistor through the nonlinear element.

44. The pixel element of claim 40, and within the pixel element:

the capacitive element is electrically connected to the resistive element through the semiconductor channel of the switching transistor.

45. The pixel element of claim 44, further comprising a secondary switching transistor, and within the pixel element:

the secondary switching transistor has a gate electrically connected to an enabling line; and the resistive element is electrically connected to the column conducting line through both a semiconductor channel of the secondary switching transistor and the nonlinear element.

46. The pixel element of claim 40, wherein the nonlinear element in the pixel element comprises any one of a metal-insulator-metal diode, a PN diode, a PIN diode, a Schottky diode, and a thin film diode.

47. The pixel element of claim 40, wherein the nonlinear element, the semiconductor channel of the switching transistor, and the capacitive element are electrically connected in serial between the column conducting line and a common voltage.

48. The pixel element of claim 40, wherein the nonlinear element, the semiconductor channel of the switching transistor, and the capacitive element are electrically connected in serial between the column conducting line and the first terminal of the resistive element.

49. The pixel element of claim 40, wherein the nonlinear element, the semiconductor channel of the switching transistor, and the capacitive element are electrically connected in serial between the column conducting line and a row conducting line.

* * * * *